(12) United States Patent
Lee et al.

(10) Patent No.: US 12,250,444 B2
(45) Date of Patent: Mar. 11, 2025

(54) CAMERA DEVICE COMPRISING A STRUCTURE FOR DISPOSITION OF A GYRO SENSOR

(71) Applicant: LG INNOTEK CO., LTD., Seoul (KR)

(72) Inventors: Jun Taek Lee, Seoul (KR); Kyoung Ho Yoo, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 18/019,884

(22) PCT Filed: Aug. 24, 2021

(86) PCT No.: PCT/KR2021/011310
§ 371 (c)(1),
(2) Date: Feb. 6, 2023

(87) PCT Pub. No.: WO2022/080650
PCT Pub. Date: Apr. 21, 2022

(65) Prior Publication Data
US 2023/0291990 A1  Sep. 14, 2023

(30) Foreign Application Priority Data

Oct. 14, 2020 (KR) .................. 10-2020-0132516
Jan. 4, 2021 (KR) .................. 10-2021-0000157

(51) Int. Cl.
*H04N 5/335* (2011.01)
*G03B 5/00* (2021.01)
(Continued)

(52) U.S. Cl.
CPC .............. *H04N 23/57* (2023.01); *G03B 5/00* (2013.01); *H04N 23/54* (2023.01); *H04N 23/6812* (2023.01); *G03B 2205/0069* (2013.01)

(58) Field of Classification Search
CPC .............................................. G03B 2205/0069
See application file for complete search history.

(56) References Cited

U.S. PATENT DOCUMENTS 10,163,210 B2 * 12/2018 Kim .................... G06T 7/30
10,197,887 B2 *  2/2019 Enta ................... G03B 5/00
(Continued)

FOREIGN PATENT DOCUMENTS

JP  2017-009998   1/2017
JP  2017-015772   1/2017
(Continued)

OTHER PUBLICATIONS

International Search Report dated Dec. 6, 2021 issued in Application No. PCT/KR2021/011310.
(Continued)

*Primary Examiner* — Gary C Vieaux
(74) *Attorney, Agent, or Firm* — KED & Associates LLP

(57) ABSTRACT

The present embodiment relates to a camera device comprising a printed circuit board, a gyro sensor, and a first lens driving device, wherein the first lens driving device includes a cover member, a bobbin, a magnet, a coil and a substrate, the gyro sensor is arranged to be closest to a first lateral plate from among first to fourth lateral plates of the cover member, the substrate includes a first terminal unit and a plurality of terminals, which are arranged at the first terminal unit and are electrically connected to the printed circuit board, and the first terminal unit of the substrate is arranged at a location corresponding to the first lateral plate of the cover member.

20 Claims, 41 Drawing Sheets

(51) Int. Cl.
*H04N 23/54* (2023.01)
*H04N 23/57* (2023.01)
*H04N 23/68* (2023.01)

(56) References Cited

U.S. PATENT DOCUMENTS

| | | | | |
|---|---|---|---|---|
| 11,555,978 | B2* | 1/2023 | Lim | H04N 23/54 |
| 11,627,384 | B2* | 4/2023 | Zhang | H04N 23/57 |
| | | | | 348/262 |
| 11,785,321 | B2* | 10/2023 | Kimura | G03B 5/00 |
| | | | | 396/55 |
| 2013/0141541 | A1* | 6/2013 | Jung | H04N 13/00 |
| | | | | 348/46 |
| 2017/0034442 | A1* | 2/2017 | Kim | H04N 23/55 |
| 2017/0094183 | A1* | 3/2017 | Miller | H04N 23/45 |
| 2018/0113378 | A1* | 4/2018 | Wang | G03B 17/12 |
| 2018/0188474 | A1* | 7/2018 | Enta | H04N 23/00 |
| 2019/0204532 | A1* | 7/2019 | Konuma | G02B 27/646 |
| 2020/0033551 | A1* | 1/2020 | Lee | G03B 5/00 |
| 2020/0057233 | A1* | 2/2020 | Chang | G02B 13/0085 |
| 2020/0200994 | A1* | 6/2020 | Park | H04N 23/687 |

FOREIGN PATENT DOCUMENTS

| | | |
|---|---|---|
| KR | 10-2018-0023172 | 3/2018 |
| KR | 10-2019-0136270 | 12/2019 |
| KR | 20200076377 | 6/2020 |
| KR | 10-2020-0111508 | 9/2020 |
| WO | WO 2020076029 | 4/2020 |

OTHER PUBLICATIONS

Extended European Search Report dated Oct. 15, 2024 issued in Application No. 21880298.1.

* cited by examiner

CAMERA DEVICE COMPRISING A STRUCTURE FOR DISPOSITION OF A GYRO SENSOR

CROSS-REFERENCE TO RELATED PATENT APPLICATIONS

This application is a U.S. National Stage Application under 35 U.S.C. § 371 of PCT Application No. PCT/KR2021/011310, filed Aug. 24, 2021, which claims priority to Korean Patent Application No. 10-2020-0132516, filed Oct. 14, 2020 and 10-2021-0000157, filed Jan. 4, 2021, whose entire disclosures are hereby incorporated by reference.

TECHNICAL FIELD

The present embodiment relates to a camera device.

BACKGROUND ART

As the spread of various portable terminals is widely generalized and wireless Internet services are commercialized, the demands of consumers related to portable terminals are also diversifying, so that various types of additional devices are being installed in the portable terminals.

Among them, a typical example is a camera module that photographs a picture or video of a subject. Meanwhile, an auto focus function for automatically adjusting a focus according to a distance of a subject is applied to a recent camera module. In addition, a handshake correction function for compensating the user's handshake is also applied.

However, in the prior art, when the portion for soldering the terminal of the lens driving device on the printed circuit board and the gyro sensor are being disposed adjacent to each other, since the soldering work becomes difficult, as the gyro sensor is displaced to be spaced apart from the lens actuator, there is a problem in that the size of the printed circuit board increases.

DETAILED DESCRIPTION OF THE INVENTION

Technical Subject

A first embodiment of the present embodiment is intended to provide a camera device securing a space for disposing a gyro sensor by driving a terminal at one side of a lens driving device to a corner at one side thereof.

A second embodiment of the present embodiment is intended to provide a camera device arranged so that the terminal of the lens driving device and the gyro sensor do not interfere.

Technical Solution

A camera device according to a first embodiment of present embodiment comprises: a printed circuit board; a gyro sensor being disposed on a first surface of the printed circuit board; and a first lens driving device being disposed on the first surface of the printed circuit board, wherein the first lens driving device comprises: a cover member comprising an upper plate and a lateral plate being extended from the upper plate; a bobbin being disposed inside the cover member; a magnet being disposed inside the cover member; a coil for moving the bobbin; and a substrate being electrically connected to the coil, wherein the lateral plate of the cover member comprises a first lateral plate and a second lateral plate being disposed at an opposite side to each other, and a third lateral plate and a fourth lateral plate being disposed at an opposite side to each other, wherein the gyro sensor is disposed closest to the first lateral plate among the first to fourth lateral plates, wherein the substrate comprises a first terminal unit and a plurality of terminals being disposed in the first terminal unit and electrically connected to the printed circuit board, and wherein the first terminal unit of the substrate may be disposed at a position corresponding to the first lateral plate of the cover member.

The first lens driving device may comprise a base being coupled to the lateral plate of the cover member and a housing being disposed between the bobbin and the cover member, wherein the substrate may be disposed in the base.

The first terminal unit may not be overlapped with the gyro sensor in a direction in which the second lateral plate faces the first lateral plate.

The substrate may comprise a second terminal unit being disposed at an opposite side of the first terminal unit, and the second terminal unit of the substrate may be disposed at a position corresponding to the second lateral plate of the cover member.

The length of the first terminal unit may be shorter than the length of the second terminal unit in a direction in which the third lateral plate faces the fourth lateral plate.

Seven or less terminals are disposed in the first terminal unit, and ten or more terminals may be disposed in the second terminal unit.

The first lateral plate of the cover member comprises a first region close to one corner among corners at both sides, and a second region close to the other corner among corners at both sides, wherein the first terminal unit is disposed in a position corresponding to the first region of the first lateral plate, and wherein the gyro sensor may be disposed at a position corresponding to the second region of the first lateral plate.

The first terminal unit of the substrate may be omitted at a position corresponding to the gyro sensor.

The gyro sensor may be spaced apart from the cover member, the base, and the substrate.

The first terminal unit of the substrate may be disposed closest to the first lateral plate among the first to fourth lateral plates.

The coil may comprise a first coil for moving the bobbin in an optical axis direction and a second coil for moving the bobbin in a direction perpendicular to the optical axis direction.

It comprises a second lens driving device being disposed on the first surface of the printed circuit board is comprised, wherein the second lens driving device may be disposed closest to the third lateral plate among the first to fourth lateral plates.

The first lens driving device comprises a dummy member being disposed at a position corresponding to the third lateral plate, wherein the magnet comprises a first magnet being disposed at a position corresponding to the first lateral plate, a second magnet being disposed at a position corresponding to the second lateral plate, and a third magnet being disposed at a position corresponding to the fourth lateral plate, and wherein the dummy member has a weight corresponding to that of the third magnet and may have a magnetic force weaker than or no magnetic force.

The first terminal unit may be disposed between the gyro sensor and the second lens driving device.

The printed circuit board comprises: a first portion on which the first lens driving device is disposed; a second portion on which a connector is disposed; and a third portion connecting the first portion and the second portion, wherein the third portion may be disposed closest to the second lateral plate among the first to fourth lateral plates.

The camera device may comprise: an image sensor being disposed on the printed circuit board; and a lens being coupled to the bobbin.

An optical device according to a first embodiment of present embodiment comprises: a main body; the camera device of claim 1 being disposed in the main body; and a display being disposed in the main body and outputting an image by the camera device.

The camera device according to the first embodiment of the present embodiment comprises: a printed circuit board; an image sensor being disposed in the printed circuit board; a gyro sensor being disposed on a first surface of the printed circuit board; a first lens driving device being disposed on the first surface of the printed circuit board; and a second lens driving device being disposed on the first surface of the printed circuit board. wherein the first lens driving device comprises: a cover member comprising an upper plate and a lateral plate being extended from the upper plate; a magnet being disposed inside the cover member; a coil being disposed inside the cover member; and a substrate being electrically connected to the coil, wherein the lateral plate of the cover member may comprise a first lateral plate and a second lateral plate being disposed at an opposite side to each other, and a third lateral plate and a fourth lateral plate being disposed at an opposite side to each other, wherein the second lens driving device is disposed closest to the third lateral plate among the first to fourth lateral plates, wherein the gyro sensor is disposed closest to the first lateral plate among the first to fourth lateral plates, and wherein the substrate may comprise a first terminal unit being disposed closest to the first lateral plate among the first to fourth lateral plates.

The lens driving device according to the first embodiment of the present embodiment comprises: a cover member comprising an upper plate and a lateral plate being extended from the upper plate; a magnet being disposed inside the cover member; a coil being disposed inside the cover member; and a substrate being electrically connected to the coil, wherein the lateral plate of the cover member comprises a first lateral plate and a second lateral plate being disposed at an opposite to each other, wherein the substrate comprises a first terminal unit being disposed at a position corresponding to the first lateral plate and a second terminal unit being disposed at a position corresponding to the second lateral plate, wherein the width of the first terminal unit in the first direction is smaller than the width of the second terminal unit in the first direction, and wherein the first terminal unit may be disposed closer to one corner of both sides of the first lateral plate.

The camera device according to the second embodiment of the present embodiment comprises: a printed circuit board; a first lens driving device being disposed on the printed circuit board; and a second lens driving device being disposed on the printed circuit board, wherein the first lens driving device comprises a first cover, a first base being coupled to the first cover, and a first substrate being disposed in the first base, wherein the second lens driving device comprises a second cover, wherein the first lateral plate of the first cover is disposed facing the first lateral plate of the second cover, wherein the first substrate comprises a terminal unit comprising a terminal being coupled to the printed circuit board, and wherein the terminal unit of the first substrate may comprise a first terminal unit being disposed at a position corresponding to the first lateral plate of the first cover.

An outer side surface of the first terminal unit may face the second lens driving device.

The first base may comprise a first side surface being disposed at a position corresponding to the first lateral plate of the first cover, wherein the first terminal unit may be disposed on the first side surface of the first base.

The terminal unit of the first substrate may comprise a second terminal unit being disposed at an opposite side of the first terminal unit.

The second lens driving device comprises a second base coupled to the second cover, and a second substrate disposed on the second base, wherein the second substrate may comprise a first terminal unit being disposed to face the first terminal unit of the first substrate.

The second substrate may comprise a second terminal unit being disposed at an opposite side of the first terminal unit of the second substrate.

The first cover comprises a second lateral plate being disposed at an opposite side of the first lateral plate, and a third lateral plate and a fourth lateral plate being disposed at an opposite side to each other, wherein a gyro sensor may be disposed adjacent to the third lateral plate of the first cover.

The second lens driving device comprises a second base being coupled to the second cover and a second substrate being disposed in the second base, wherein the second cover comprises a first lateral plate and a second lateral plate disposed at an opposite side to each other, and a third lateral plate and a fourth lateral plate being disposed at an opposite side to each other, and wherein the second substrate may comprise a first terminal unit being disposed at a position corresponding to the third lateral plate of the second cover.

The second substrate may comprise a second terminal unit being disposed at a position corresponding to the fourth lateral plate of the second cover.

The second substrate may comprise a second terminal unit being disposed at a position corresponding to the second lateral plate of the second cover.

The first cover comprises: a second lateral plate being disposed at an opposite side of the first lateral plate; and a third lateral plate and a fourth lateral plate being disposed at an opposite side to each other, wherein the second lens driving device comprises a second base being coupled to the second cover and a second substrate being disposed in the second base, wherein the second cover comprises a first lateral plate and a second lateral plate disposed at an opposite side to each other, and a third lateral plate and a fourth lateral plate being disposed at an opposite side to each other, wherein the second substrate comprises a first terminal unit being disposed at a position corresponding to the third lateral plate of the second cover and a second terminal unit being disposed at a position corresponding to the fourth lateral plate of the second cover, and wherein a gyro sensor may be disposed to be adjacent to the second lateral plate of the second cover.

The gyro sensor may be disposed closer to the third lateral plate than to the fourth lateral plate of the second cover.

The first lens driving device comprises: a first bobbin being disposed inside the first cover; a first housing being disposed between the first bobbin and the first cover; a first coil being disposed on the first bobbin; a first magnet being disposed in the first housing; a second coil being disposed in the first substrate, wherein the second lens driving device may comprise: a second base being coupled to the second cover; a second substrate being disposed in the second base;

a second bobbin being disposed inside the second cover; a second housing being disposed between the second bobbin and the second cover; a third coil being disposed on the second bobbin; a second magnet being disposed in the second housing; and a fourth coil disposed on the second substrate.

The first magnet is not disposed between the first bobbin and the first lateral plate of the first cover, and the second magnet may not be disposed between the second bobbin and the first lateral plate of the second cover.

The optical device according to the second embodiment of the present embodiment may comprise: a main body; the camera device of claim 1 being disposed in the main body; and a display being disposed in the main body and outputting an image photographed through the camera device.

The camera device according to the second embodiment of the present embodiment comprises: a printed circuit board; a first lens driving device being disposed on the printed circuit board; and a second lens driving device being disposed on the printed circuit board, wherein the first lens driving device comprises: a first cover; a first base being coupled to the first cover; a first substrate being disposed in the first base, wherein the second lens driving device comprises: a second cover; a second base being coupled to the second cover; a second substrate being disposed in the second base, wherein each of the first cover and the second cover comprises: a first lateral plate and a second lateral plate being disposed at an opposite side to each other; a third lateral plate and a fourth lateral plate being disposed at an opposite side to each other, wherein the first lateral plate of the first cover is disposed to face the first lateral plate of the second cover, wherein each of the first substrate and the second substrate comprises a terminal unit comprising a terminal being coupled to the printed circuit board, wherein the terminal unit of the first substrate comprises: a first terminal unit being disposed at a position corresponding to the second lateral plate of the first cover; a second terminal unit being disposed at a position corresponding to the third lateral plate of the first cover, and wherein the terminal unit of the second substrate may comprise a first terminal unit being disposed at a position corresponding to the third lateral plate of the second cover.

The terminal unit of the second substrate may comprise a second terminal unit being disposed at a position corresponding to the fourth lateral plate of the second cover.

The terminal unit of the second substrate may comprise a second terminal unit being disposed at a position corresponding to the second lateral plate of the second cover.

The first lens driving device comprises: a first bobbin being disposed inside the first cover; a first housing being disposed between the first bobbin and the first cover; a first coil being disposed on the first bobbin; a first magnet being disposed in the first housing; and a second coil being disposed in the first substrate, wherein the first magnet may not be disposed between the first bobbin and the first lateral plate of the first cover.

A camera device according to a second embodiment of the present embodiment comprises: a printed circuit board; a first lens driving device being disposed on the printed circuit board; and a second lens driving device being disposed on the printed circuit board, wherein the first lens driving device comprises: a first cover; a first base being coupled to the first cover; a magnet being disposed inside the first cover; a first substrate being disposed in the first base; a coil being disposed in the first substrate and facing the magnet, wherein the first substrate comprises: a body part in which the coil is disposed; a terminal unit being extended from an edge of the body part and comprising a terminal being electrically connected to the printed circuit board, wherein the coil comprises first to third coils, wherein the body part of the first substrate comprises: a first region in which the first coil is disposed; a second region in which the second coil is disposed; a third region in which the third coil is disposed; and a fourth region in which the coil is not disposed, and wherein the terminal unit of the first substrate may comprise a first terminal unit being extended from an edge of the fourth region.

Advantageous Effects

Through the first embodiment of the present embodiment, the size of the printed circuit board can be reduced as the gyro sensor is disposed adjacent to the lens driving device. That is, the space for arranging a camera device inside a smartphone can be reduced.

Through the second embodiment of the present embodiment, workability can be improved when soldering the terminal of the lens driving device to a printed circuit board. Furthermore, since the lens driving device and the gyro sensor can be disposed adjacent to each other on the printed circuit board, the size of the printed circuit board can be reduced. That is, the space for arranging a camera device in a smartphone can be reduced.

BEST MODE

Figure 1:
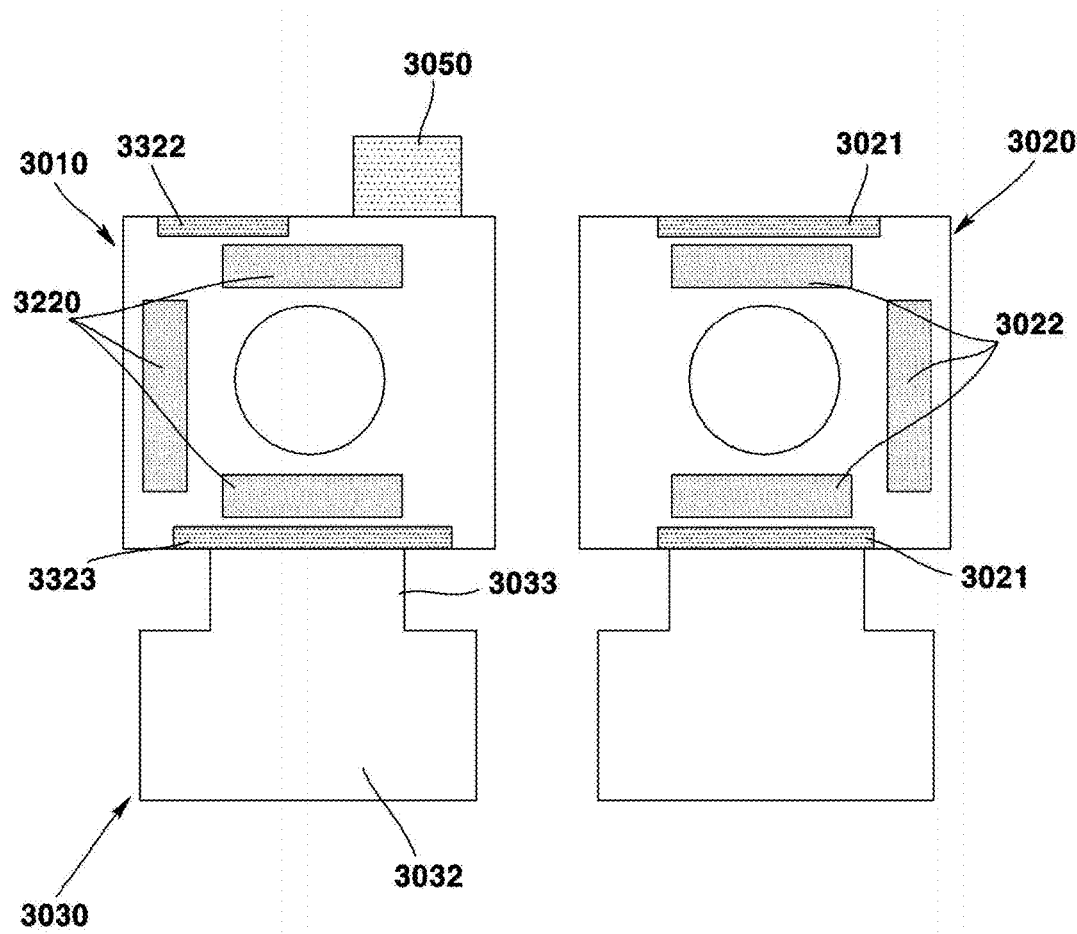
FIG. 1 is a schematic diagram of a camera device according to a first embodiment of the present embodiment.

Hereinafter, preferred embodiments of the present invention will be described in detail with reference to the accompanying drawings.

However, the technical idea of the present invention is not limited to some embodiments to be described, but may be implemented in various forms, and inside the scope of the technical idea of the present invention, one or more of the constituent elements may be selectively combined or substituted between embodiments.

In addition, the terms (comprising technical and scientific terms) used in the embodiments of the present invention, unless explicitly defined and described, can be interpreted as a meaning that can be generally understood by a person skilled in the art, and commonly used terms such as terms defined in the dictionary may be interpreted in consideration of the meaning of the context of the related technology.

In addition, terms used in the present specification are for describing embodiments and are not intended to limit the present invention.

In the present specification, the singular form may comprise the plural form unless specifically stated in the phrase, and when described as "at least one (or more than one) of A and B and C", it may comprise one or more of all combinations that can be combined with A, B, and C.

In addition, in describing the components of the embodiment of the present invention, terms such as first, second, A, B, (a), and (b) may be used. These terms are merely intended to distinguish the components from other components, and the terms do not limit the nature, order or sequence of the components.

And, when a component is described as being 'connected', 'coupled' or 'interconnected' to another component, the component is not only directly connected, coupled or interconnected to the other component, but may also comprise cases of being 'connected', 'coupled', or 'interconnected' due that another component between that other components.

In addition, when described as being formed or arranged in "on (above)" or "below (under)" of each component, "on (above)" or "below (under)" means that it comprises not only the case where the two components are directly in contact with, but also the case where one or more other components are formed or arranged between the two components. In addition, when expressed as "on (above)" or "below (under)", the meaning of not only an upward direction but also a downward direction based on one component may be comprised.

An 'optical axis direction' used hereinafter is defined as an optical axis direction of a lens and/or an image sensor being coupled to a lens driving device.

The 'vertical direction' used hereinafter may be a direction parallel to the optical axis direction. The vertical direction may correspond to the 'z-axis direction'. The 'horizontal direction' used hereinafter may be a direction perpendicular to the vertical direction. That is, the horizontal direction may be a direction perpendicular to the optical axis. Accordingly, the horizontal direction may comprise an 'x-axis direction' and a 'y-axis direction'.

The 'auto focus (AF) function' used hereinafter is defined as a function that automatically focuses on a subject by adjusting the distance to the image sensor by moving the lens in an optical axis direction according to the distance of the subject so that a clear image of the subject can be obtained on the image sensor. In addition, 'closed-loop auto focus (CLAF) control' is defined as real-time feedback control of the position of the lens by detecting the distance between the image sensor and the lens to improve the accuracy of focusing.

The 'optical image stabilization (OIS) function' used hereinafter is defined as a function of offsetting the shaking by moving the lens in an opposite direction to the movement of the portable terminal detected by the gyro sensor. When the handshake correction function is driven, the lens may be moved or tilted in a direction perpendicular to the optical axis direction.

Hereinafter, a configuration of the camera device according to a first embodiment of the present embodiment will be described with reference to the drawings.

Figure 2:
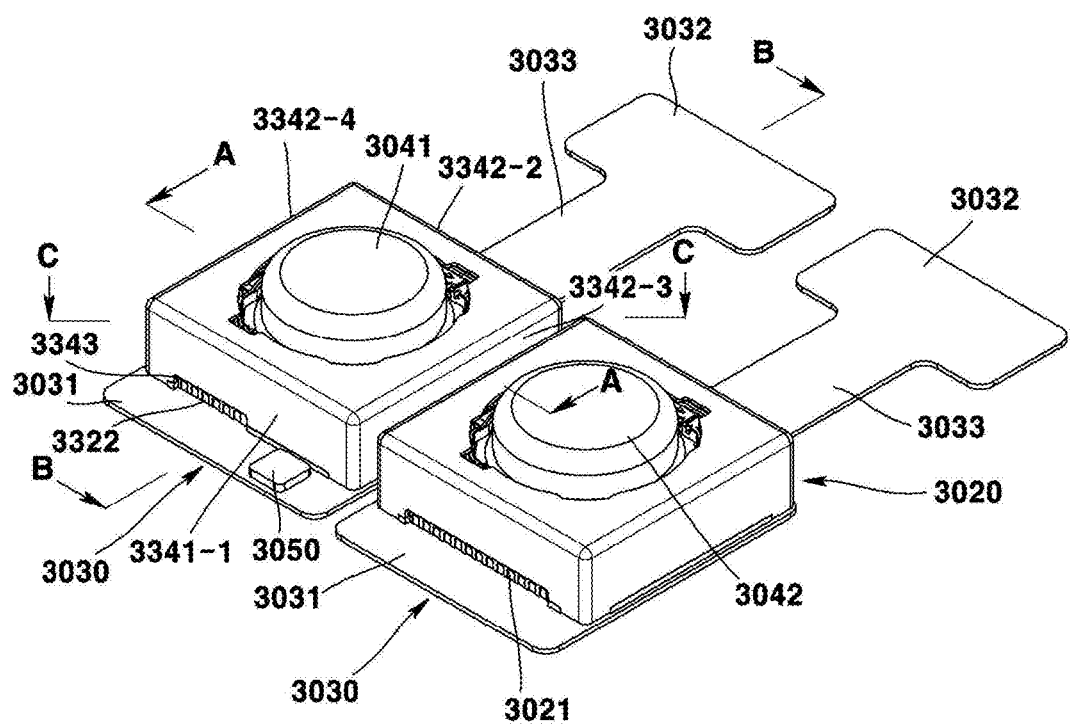
FIG. 2 is a perspective view of a camera device according to a first embodiment of the present embodiment.
Figure 3:
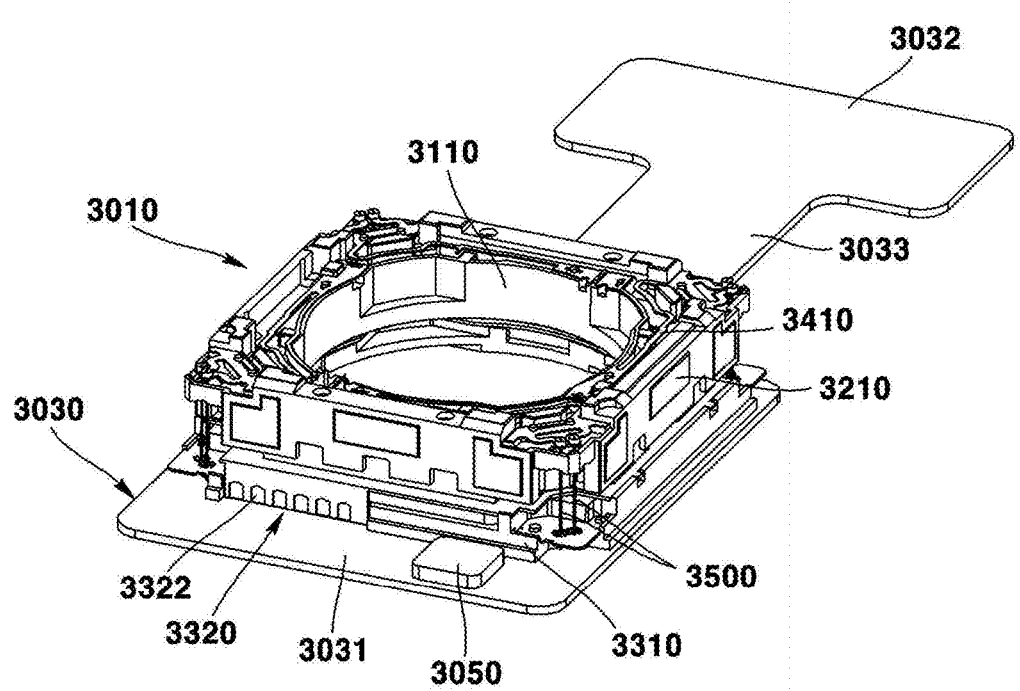
FIG. 3 is a perspective view of a part of a camera device according to a first embodiment of the present embodiment.
Figure 4:
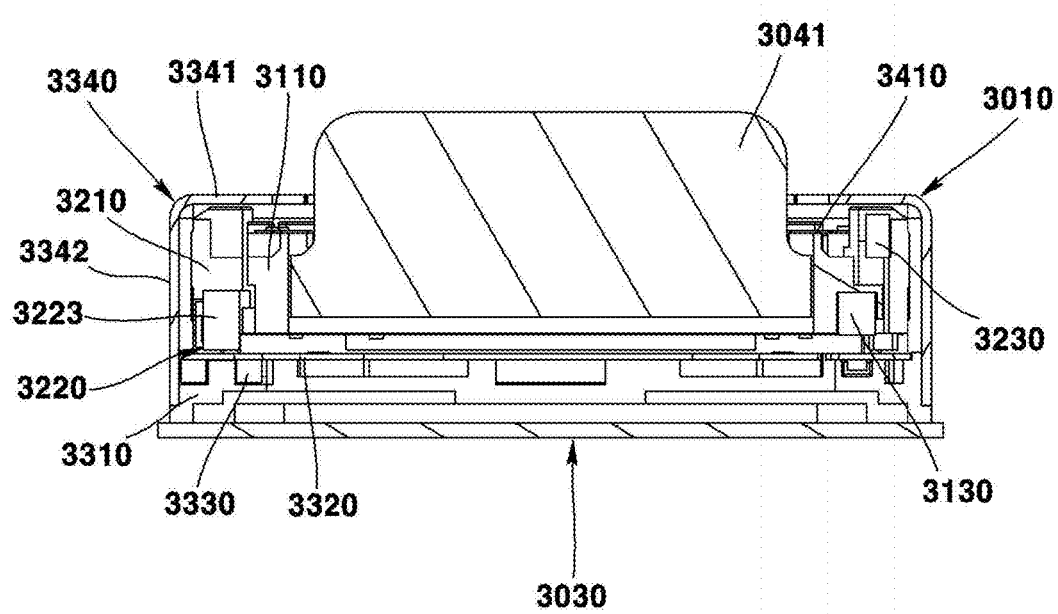
FIG. 4 is a cross-sectional view viewed from A-A in FIG. 2.
Figure 5:
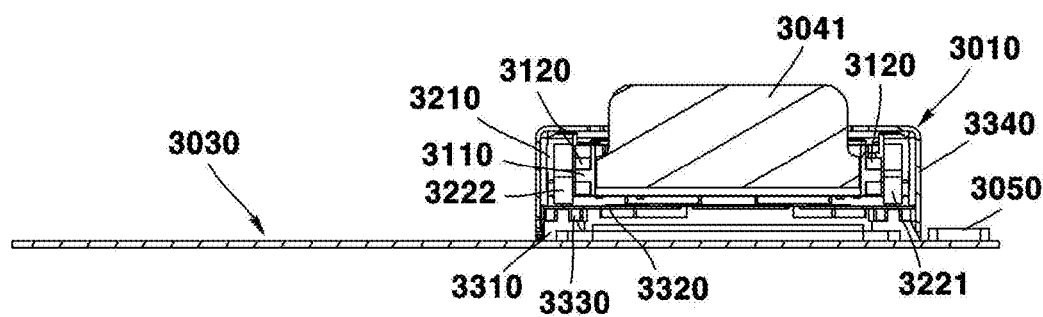
FIG. 5 is a cross-sectional view viewed from line B-B of FIG. 2.
Figure 6:
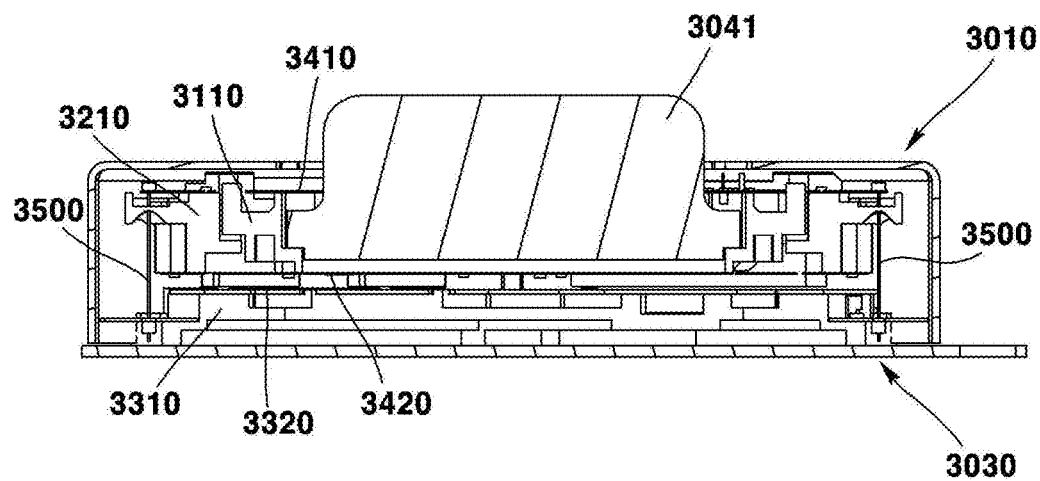
FIG. 6 is a cross-sectional view viewed from C-C in FIG. 2.
Figure 7:
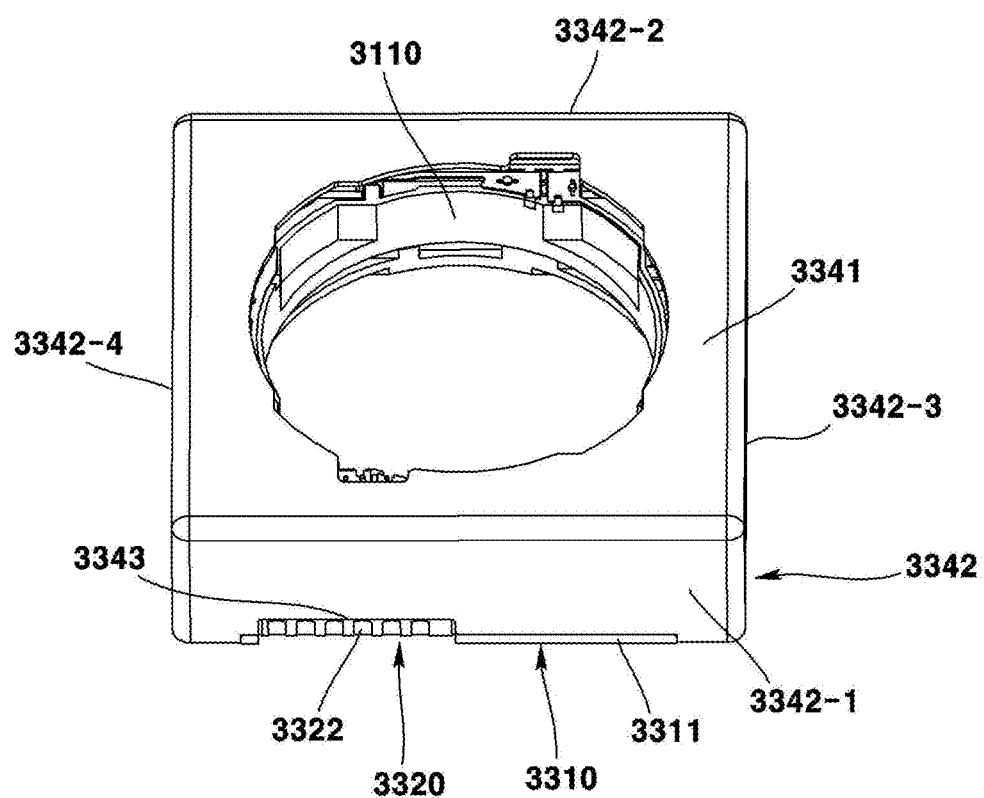
FIG. 7 is a perspective view of a first lens driving device according to a first embodiment of the present embodiment.
Figure 8:
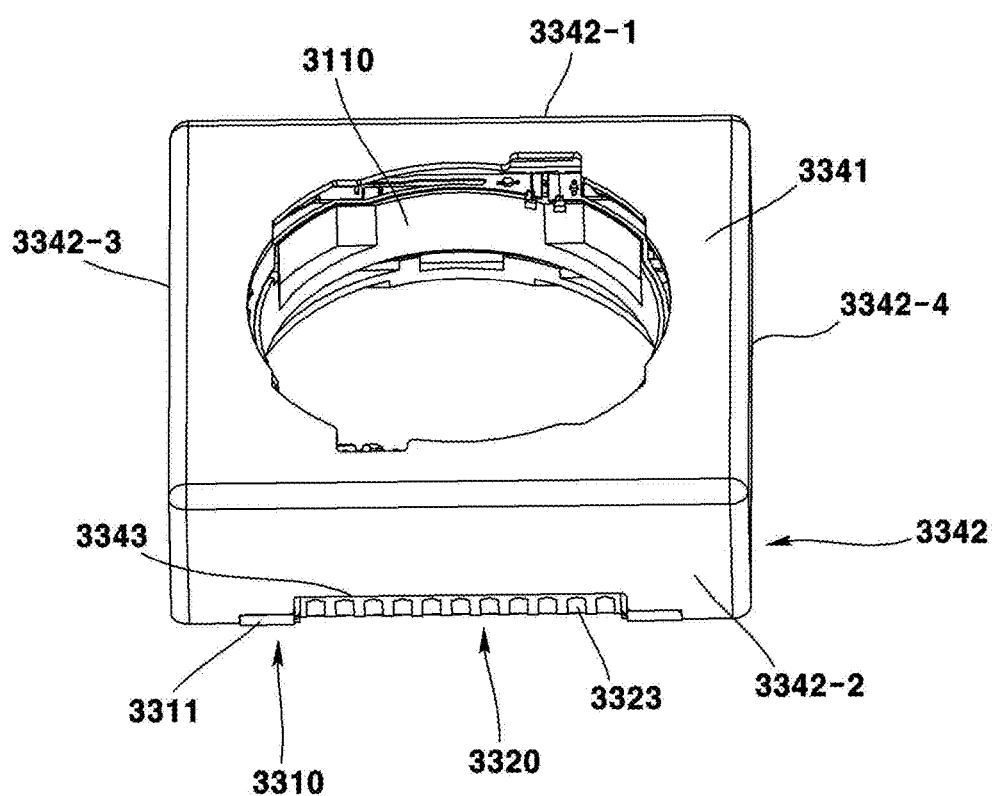
FIG. 8 is a perspective view of a first lens driving device according to a first embodiment of the present embodiment viewed from a direction different from FIG. 7.
Figure 9:
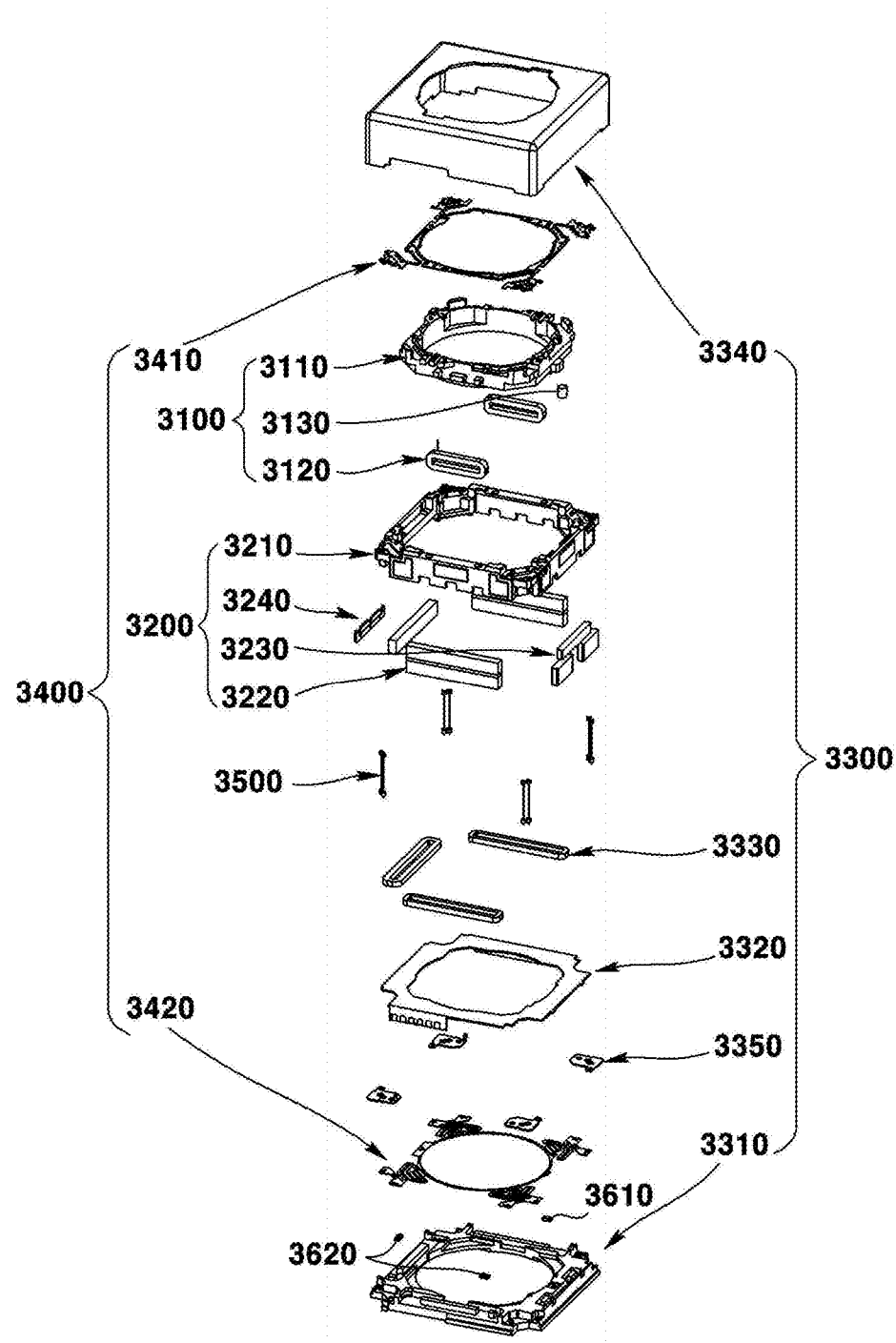
FIG. 9 is an exploded perspective view of a first lens driving device according to a first embodiment of the present embodiment.
Figure 10:
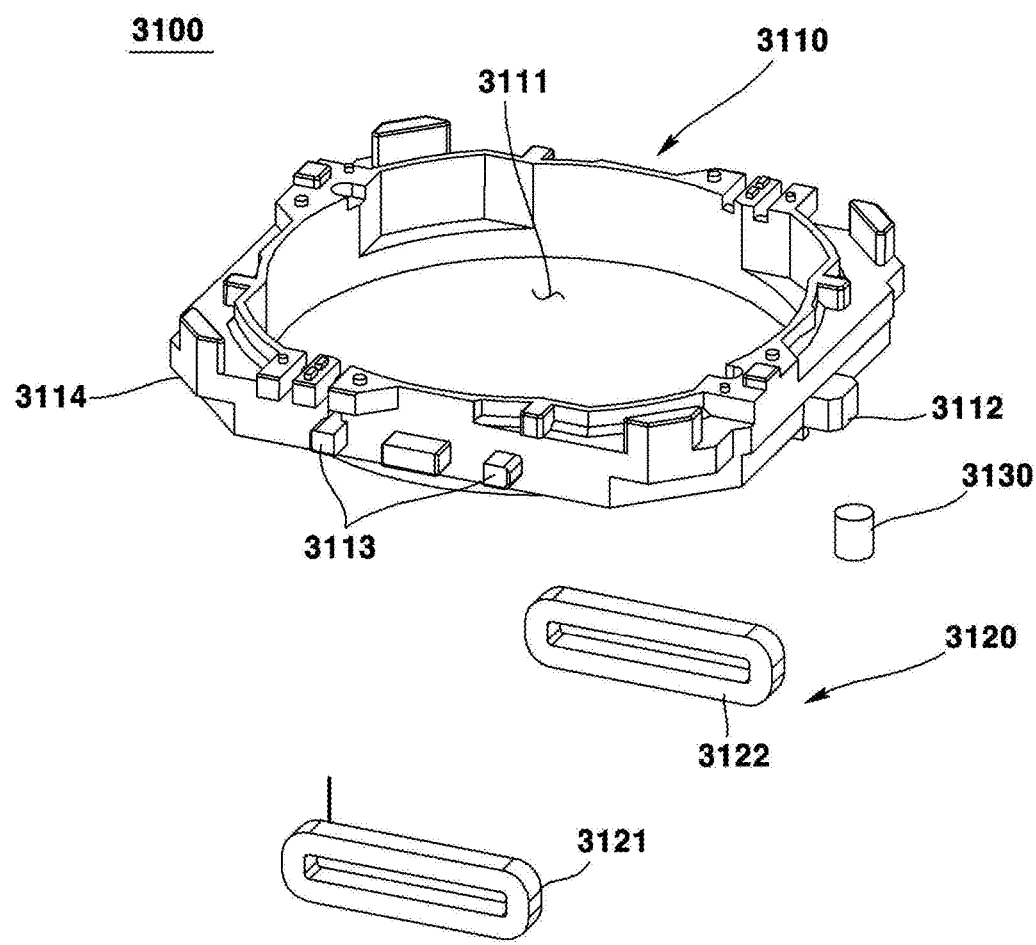
FIG. 10 is an exploded perspective view of a first mover of a first lens driving device according to a first embodiment of the present embodiment.
Figure 11:
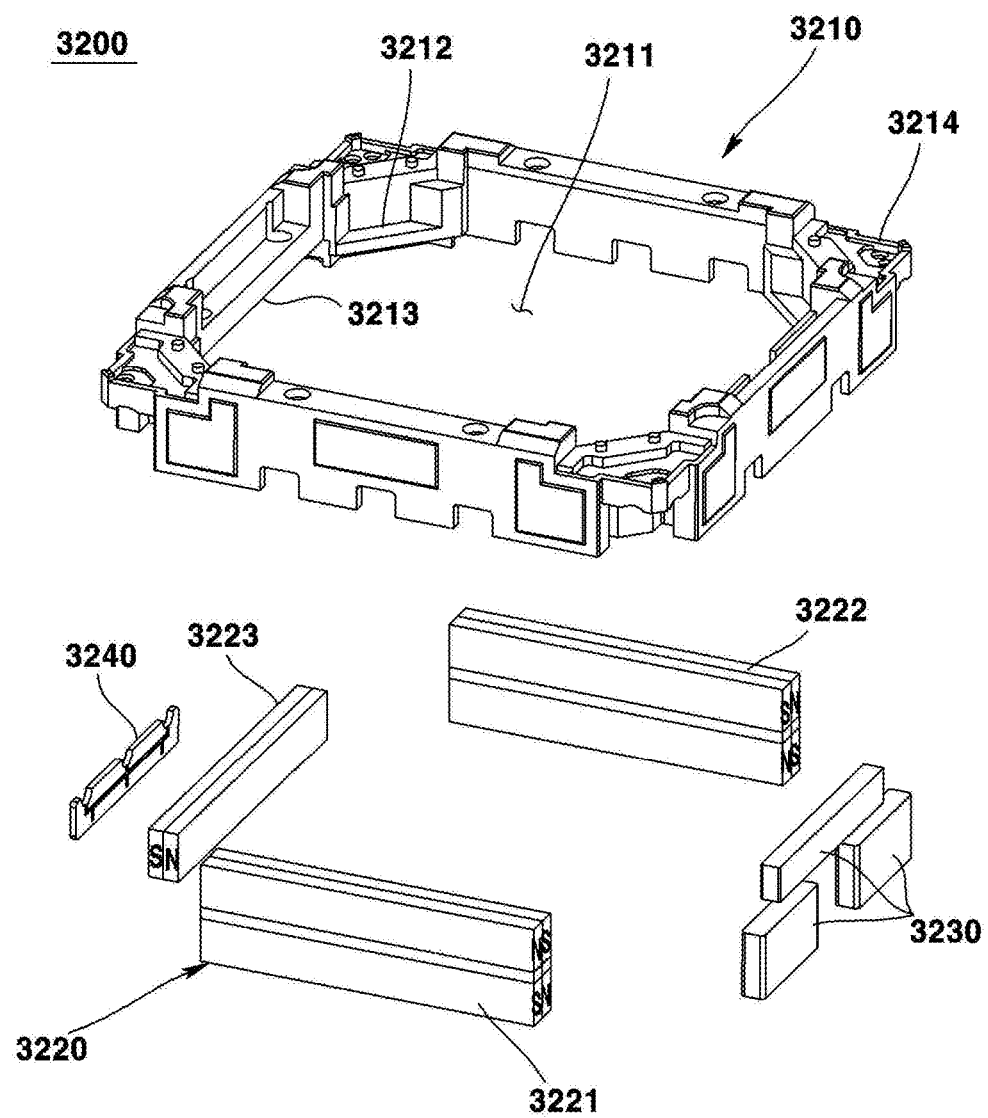
FIG. 11 is an exploded perspective view of a second mover of a first lens driving device according to a first embodiment of the present embodiment.
Figure 12:
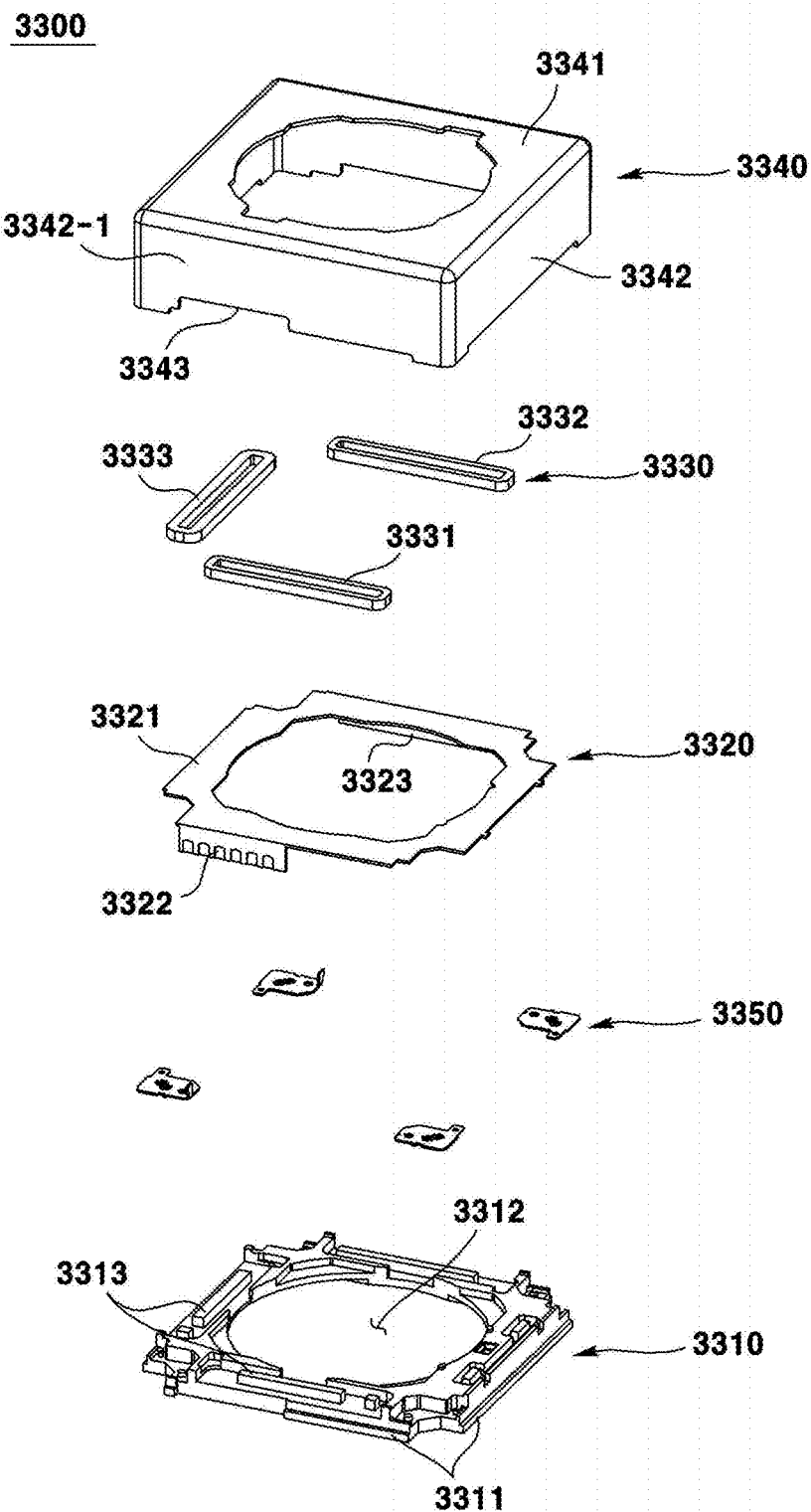
FIG. 12 is an exploded perspective view of a stator of a first lens driving device according to a first embodiment of the present embodiment.
Figure 13:
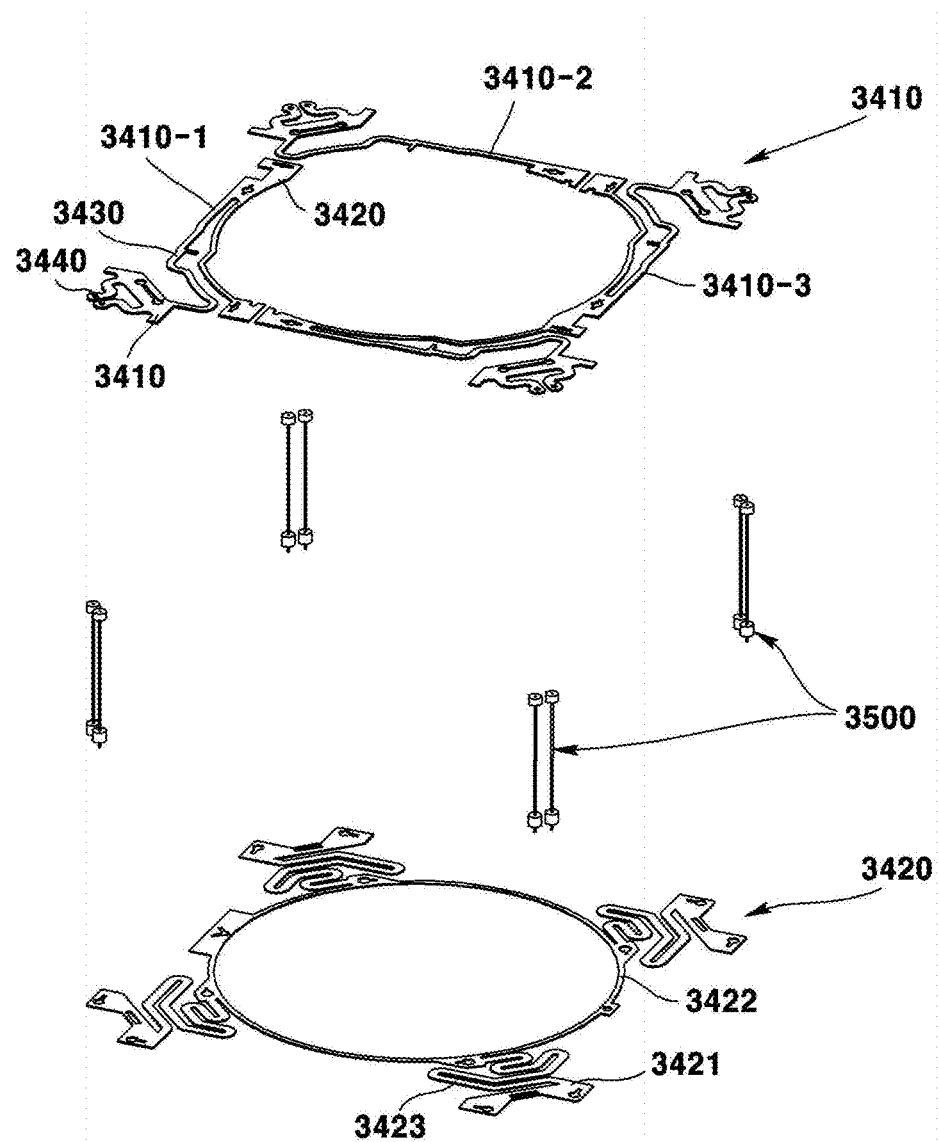
FIG. 13 is an exploded perspective view of an elastic member and a support member of a first lens driving device according to a first embodiment of the present embodiment.
Figure 14:
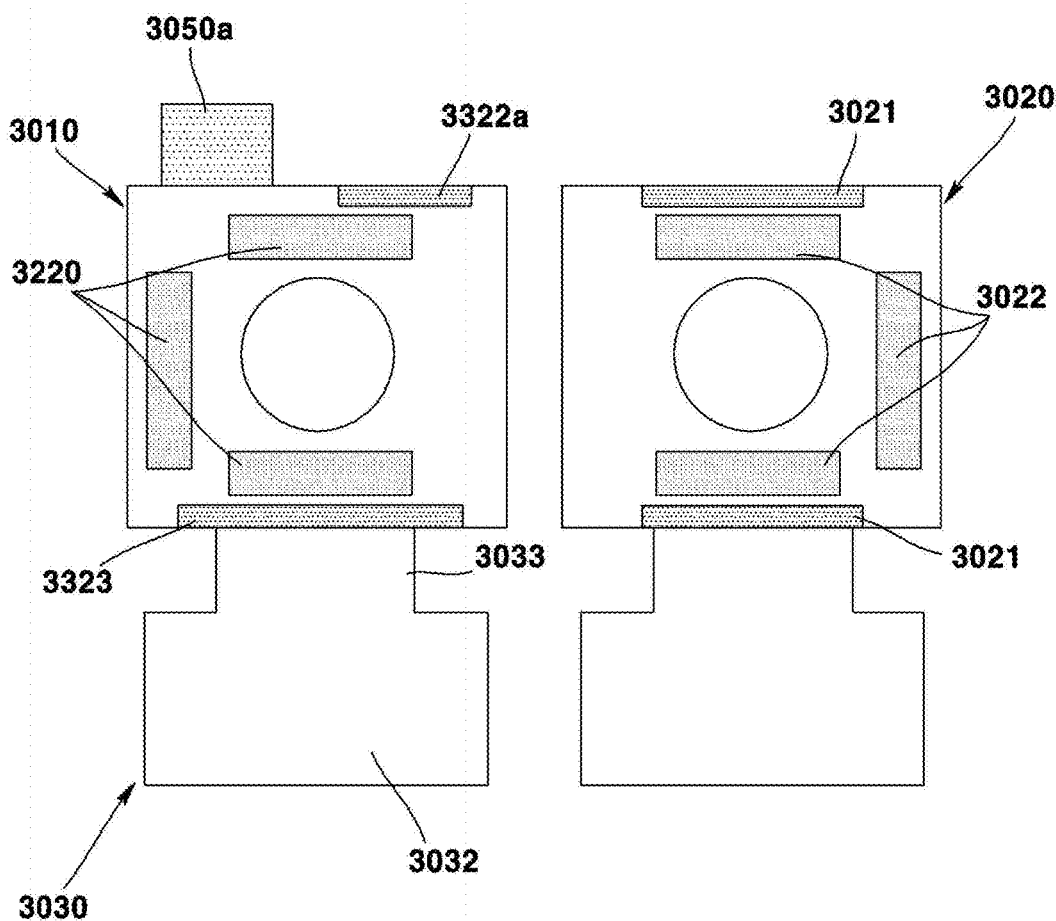
FIG. 14 is a schematic diagram of a modification of a camera device according to a first embodiment of the present embodiment.

FIG. 1 is a schematic diagram of a camera device according to a first embodiment of the present embodiment; FIG. 2 is a perspective view of a camera device according to a first embodiment of the present embodiment; FIG. 3 is a perspective view of a part of a camera device according to a first embodiment of the present embodiment; FIG. 4 is a cross-sectional view viewed from A-A in FIG. 2; FIG. 5 is a cross-sectional view viewed from line B-B of FIG. 2; FIG. 6 is a cross-sectional view viewed from C-C in FIG. 2; FIG. 7 is a perspective view of a first lens driving device according to a first embodiment of the present embodiment; FIG. 8 is a perspective view of a first lens driving device according to a first embodiment of the present embodiment viewed from a direction different from FIG. 7; FIG. 9 is an exploded perspective view of a first lens driving device according to a first embodiment of the present embodiment; FIG. 10 is an exploded perspective view of a first mover of a first lens driving device according to a first embodiment of the present embodiment; FIG. 11 is an exploded perspective view of a second mover of a first lens driving device according to a first embodiment of the present embodiment; FIG. 12 is an exploded perspective view of a stator of a first lens driving device according to a first embodiment of the present embodiment; FIG. 13 is an exploded perspective view of an elastic member and a support member of a first lens driving device according to a first embodiment of the present embodiment; and FIG. 14 is a schematic diagram of a modification of a camera device according to a first embodiment of the present embodiment.

The camera device 3002 may comprise a camera module.

The camera device 3002 may comprise a lens driving device. The camera device 3002 may comprise a plurality of lens driving devices. The camera device 3002 may comprise two lens driving devices. The camera device 3002 may comprise first and second lens driving devices 3010 and 3020.

The camera device 3002 may comprise a printed circuit board (PCB) 3030. The printed circuit board 3030 may be a substrate or circuit substrate. A lens driving device may be disposed on the printed circuit board 3030. A first and second lens driving devices 3010 and 3020 may be disposed on the printed circuit board 3030. A sensor base may be disposed between the printed circuit board 3030 and the lens driving device 3010. The printed circuit board 3030 may be electrically connected to the lens driving device. The printed circuit board 3030 may be electrically connected to the first and second lens driving devices 3010 and 3020. An image sensor may be disposed in the printed circuit board 3030. A gyro sensor 3050 may be disposed in the printed circuit board 3030. The printed circuit board 3030 may comprise various circuits, elements, controllers, and the like in order to convert an image formed in the image sensor into an electrical signal and transmit it to an external device.

The printed circuit board 3030 may comprise: a first portion 3021 in which the first lens driving device 3010 is disposed; a second portion 3022 in which a connector is disposed; and a third portion 3023 connecting the first portion 3021 and the second portion 3022. At this time, the third portion 3023 may be disposed closest to the second lateral plate 3342-2 among the first to fourth lateral plates 3342-1, 3342-2, 3342-3, and 3342-4 of the cover member 3340 of the first lens driving device 3010.

The camera device 3002 may comprise a lens module. The lens module may be coupled to the bobbin of the lens driving device. The lens module may be coupled to the bobbin by screw-coupling and/or an adhesive. The lens module may move integrally with the bobbin. The lens module may comprise a lens. The lens module may comprise a barrel and a plurality of lenses being disposed inside the barrel. The lens may be disposed at a position corresponding to the image sensor. The lens may comprise a first lens 3041 being coupled to the first lens driving device 3010. The lens may comprise a second lens 3042 being coupled to a second lens driving device 3020.

The camera device 3002 may comprise a filter. The filter may serve to block light of a specific frequency band among the light passing through the lens module from being incident on the image sensor. The filter may be disposed parallel to an x-y plane. The filter may be disposed between the lens module and the image sensor. A filter may be disposed in the sensor base. The filter may comprise an infrared filter. The infrared filter may block light in the infrared region from being incident on the image sensor. The infrared filter may comprise an infrared reflection filter or an infrared absorption filter.

The camera device 3002 may comprise a sensor base. The sensor base may be disposed between the lens driving device and the printed circuit board 3030. An opening may be formed in a portion of the sensor base where the filter is disposed so that light passing through the filter may be incident on the image sensor.

The camera device 3002 may comprise an image sensor. The image sensor may be configured to form an image by incident light passing through a lens and a filter. The image sensor may be disposed on the printed circuit board 3030. The image sensor may be mounted on the printed circuit board 3030. The image sensor may be electrically connected to the printed circuit board 3030. As an example, the image sensor may be coupled to the printed circuit board 3030 by a surface mounting technology (SMT). As another example, the image sensor may be coupled to the printed circuit board 3030 by a flip chip technology. The image sensor may be disposed such that an optical axis coincides with a lens. That is, the optical axis of the image sensor and the optical axis of the lens may be aligned. The image sensor may convert light irradiated onto an effective image area of the image sensor into an electrical signal. The image sensor may be any one of a charge coupled device (CCD), a metal oxide semi-conductor (MOS), a CPD, and a CID.

The camera device 3002 may comprise a gyro sensor 3050. The gyro sensor 3050 may be disposed in the printed circuit board 3030. The gyro sensor 3050 may be disposed on an upper surface of the printed circuit board 3030. The gyro sensor 3050 may be disposed on a first surface of the printed circuit board 3030. The gyro sensor 3050 may be spaced apart from the cover member 3340, the base 3310 and the substrate 3320. The gyro sensor 3050 may be spaced apart from the first terminal unit 3322 of the substrate 3320. In a modified embodiment, the gyro sensor 3050 may be disposed to be in contact with the base 3310. The gyro sensor 3050 may be disposed closest to the first lateral plate 3342-1 among the first to fourth lateral plates 3342-1, 3342-2, 3342-3, and 3342-4 of the cover member 3340. The gyro sensor 3050 may output rotational angular velocity information due to the movement of the camera device 3002. The gyro sensor 3050 may comprise a 2-axis or 3-axis gyro sensor.

As illustrated in FIG. 1, the gyro sensor 3050 may be disposed closer to the second lens driving device 3020 than to the first terminal unit 3322. However, in a modified embodiment, the gyro sensor 350a may be disposed farther from the second lens driving device 3020 than the first terminal unit 3322a, as illustrated in FIG. 14. That is, the first terminal unit 3322a may be disposed closer to the second lens driving device 3020 than the gyro sensor 350a.

The camera device 3002 may comprise a connector. The connector may be electrically connected to the printed circuit board 3030. The connector may comprise a port for electrically connecting with an external device. The connector may be disposed in the third portion 333 of the printed circuit board 3030.

The camera device 3002 may comprise a first lens driving device 3010. The first lens driving device 3010 may be a voice coil motor (VCM). The first lens driving device 3010 may be a lens driving motor. The first lens driving device 3010 may be a lens driving actuator. The first lens driving device 3010 may comprise an AF module. The first lens driving device 3010 may comprise an OIS module. The first lens driving device 3010 may be disposed on a first surface of the printed circuit board 3030.

The first lens driving device 3010 may comprise a first mover 3100. The first mover 3100 may be coupled to the first lens 3041. The first mover 3100 may be connected to the second mover 3200 through a first elastic member 3410 and/or a second elastic member 3420. The first mover 3100 may move through interaction with the second mover 3200. At this time, the first mover 3100 may move integrally with the first lens 3041. Meanwhile, the first mover 3100 may move during AF driving. At this time, the first mover 3100 may be referred to as an 'AF mover'. However, the first mover 3100 may move together with the second mover 3200 even during OIS driving.

The first lens driving device 3010 may comprise a bobbin 3110. The first mover 3100 may comprise a bobbin 3110. The bobbin 3110 may be disposed inside the housing 3210. The bobbin 3110 may be disposed in a hole 3211 of the housing 3210. The bobbin 3110 may be movably coupled to the housing 3210. The bobbin 3110 may move against the housing 3210 in an optical axis direction. A first lens 3041 may be coupled to the bobbin 3110. The bobbin 3110 and the first lens 3041 may be coupled by screw-coupling and/or adhesive. A first coil 3120 may be coupled to the bobbin 3110. A first elastic member 3410 may be coupled to an upper portion or an upper surface of the bobbin 3110. A second elastic member 3420 may be coupled to a lower portion or a lower surface of the bobbin 3110. The bobbin 3110 may be coupled to the first elastic member 3410 and/or the second elastic member 3420 by thermal fusion and/or an adhesive. An adhesive coupling the bobbin 3110 and the first lens 3041 and the bobbin 3110 and the elastic member 3400 may be an epoxy being cured by at least one among ultraviolet (UV) light, heat, and laser.

The bobbin 3110 may comprise a hole 3111. The hole 3111 may be hollow. The hole 3111 may penetrate through the bobbin 3110 in an optical axis direction. The first lens 3041 may be accommodated in the hole 3111. For an example, a screw thread corresponding to a screw thread being formed on an outer circumferential surface of the first lens 3041 may be disposed on an inner circumferential surface of the hole 3111 of the bobbin 3110.

The bobbin 3110 may comprise a groove 3112. The groove 3112 may be a sensing magnet accommodating groove. The groove 3112 may be a recess. A sensing magnet 3130 may be disposed in the groove 3112. The groove 3112 of the bobbin 3110 may be formed on an outer circumferential surface of the bobbin 3110. At least a portion of the groove 3112 of the bobbin 3110 may be formed to correspond to the shape and size of the sensing magnet 3130. The groove 3112 may be opened toward lower direction.

The bobbin 3110 may comprise a protrusion 3113. A first coil 3120 may be disposed in the protrusion 3113. The protrusion 3113 may be formed on an outer circumferential surface of the bobbin 3110. The protrusion 3113 may be protruded from an outer circumferential surface of the bobbin 3110. The first coil 3120 may be wound and fixed to the protrusion 3113.

The bobbin 3110 may comprise a lower stopper 3114. A lower stroke of the bobbin 3110 may be restricted through the lower stopper 3114. The lower stopper 3114 may be formed on an outer circumferential surface of the bobbin 3110. The lower stopper 3114 may come into contact with the housing 3210 when the bobbin 3110 moves downward.

The first lens driving device 3010 may comprise a first coil 3120. The first mover 3100 may comprise a first coil 3120. The first coil 3120 may be an 'AF driving coil' used for AF driving. The first coil 3120 may be disposed in the bobbin 3110. The first coil 3120 may move the bobbin 3110. The first coil 3120 may be disposed between the bobbin 3110 and the housing 3210. The first coil 3120 may be disposed on an outer side surface or an outer circumferential surface of the bobbin 3110. The first coil 3120 may be directly wound around the bobbin 3110. Or, the first coil 3120 may be coupled to the bobbin 3110 in a state being directly wound. The first coil 3120 may face the magnet 3220. The first coil 3120 may be disposed to face the magnet 3220. The first coil 3120 may interact with the magnet 3220 electromagnetically. In this case, when a current is supplied to the first coil 3120 and an electromagnetic field is formed around the first coil 3120, the first coil 3120 can move against the magnet 3220 due to the electromagnetic interaction between the first coil 3120 and the magnet 3220.

The first coil 3120 may comprise a plurality of coils. The first coil 3120 may comprise two coils. The first coil 3120 may comprise first-first and first-second coils 3121 and 3122. The first-first coil 3121 may be disposed at a position corresponding to the first lateral plate 3342-1 of the cover member 3340. The first-first coil 3121 may be disposed to face the first lateral plate 3342-1 of the cover member 3340. The first-second coil 3122 may be disposed at a position corresponding to the second lateral plate 3342-2 of the cover member 3340. The first-second coil 3122 may be disposed to face the second lateral plate 3342-2 of the cover member 3340.

In a first embodiment of the present embodiment, the first coil 3120 and the magnet 3220 may move the bobbin 3110 against the housing 3210 in an optical axis direction. The first coil 3120 and the magnet 3220 may move the bobbin 3110 in an optical axis direction through electromagnetic interaction. The first coil 3120 and the magnet 3220 may be used for AF driving.

The first lens driving device 3010 may comprise a coil. The coil may move the bobbin 3110. The coil may comprise a first coil 3120 that moves the bobbin 3110 in an optical axis direction and a second coil 3330 that moves the bobbin 3110 in a direction perpendicular to the optical axis direction.

The first lens driving device 3010 may comprise a sensing magnet 3130. The first mover 3100 may comprise a sensing magnet 3130. The sensing magnet 3130 may be disposed in the bobbin 3110. The sensing magnet 3130 may be detected through the first sensor 3610. In addition, the first lens driving device 3010 may comprise a compensation magnet. The first mover 3100 may comprise a compensation magnet. The compensation magnet may be disposed to balance the magnetic force with the sensing magnet 3130. The compensation magnet may have a weight corresponding to that of the sensing magnet 3130. The compensation magnet may be disposed symmetrically with the sensing magnet 3130 with respect to an optical axis.

The first lens driving device 3010 may comprise a second mover 3200. The second mover 3200 may be movably coupled to the stator 3300 through a support member 3500. The second mover 3200 may support the first mover 3100 through the first and second elastic members 3410 and 3420. The second mover 3200 may move the first mover 3100 or may move together with the first mover 3100. The second mover 3200 may move through interaction with the stator 3300. The second mover 3200 may move during OIS driving. At this time, the second mover 3200 may be referred to as an 'OIS mover'. The second mover 3200 may move integrally with the first mover 3100 during OIS driving.

The first lens driving device 3010 may comprise a housing 3210. The second mover 3200 may comprise a housing 3210. The housing 3210 may be spaced apart from the base 3310. The housing 3210 may be disposed outside the bobbin 3110. The housing 3210 may accommodate at least a portion of the bobbin 3110. The housing 3210 may be disposed inside the cover member 3340. The housing 3210 may be disposed between the cover member 3340 and the bobbin 3110. The housing 3210 may be formed of a material different from that of the cover member 3340. The housing 3210 may be formed of an insulating material. The housing 3210 may be formed of an injection molding material. An outer side surface of the housing 3210 may be spaced apart from an inner surface of the lateral plate 3342 of the cover member 3340. Through the separation space between the housing 3210 and the cover member 3340, the housing 3210 may move for OIS driving. A magnet 3220 may be disposed in the housing 3210. The housing 3210 and the magnet 3220 may be coupled by an adhesive. A first elastic member 3410 may be coupled to an upper portion or an upper surface of the housing 3210. A second elastic member 3420 may be coupled to a lower portion or a lower surface of the housing 3210. The housing 3210 may be coupled to an upper portion and second elastic members 3410 and 3420 by thermal fusion and/or an adhesive. The adhesive for coupling the housing 3210 and the magnet 3220 and the housing 3210 and the elastic member 3400 may be an epoxy cured by at least one among ultraviolet (UV) light, heat, and laser.

The housing 3210 may comprise four side portions and four corner portions being disposed between the four side portions. The side portion of the housing 3210 may comprise: a first side portion; a second side portion being disposed at an opposite side of the first side portion; a third side portion and a fourth side portion being disposed at an opposite side to each other between the first side portion and the second side portion. The corner portion of the housing 3210 may comprise: a first corner portion being disposed between the first side portion and the third side portion; a second corner portion being disposed between the first side portion and the fourth side portion; a third corner portion being disposed between the second side portion and the third side portion; and a fourth corner portion being disposed between the second side portion and the fourth side portion. A side portion of the housing 3210 may comprise a 'lateral wall'. The first side portion of the housing 3210 may be disposed at a position corresponding to the first lateral plate 3342-1 of the cover member 3340. The second side portion of the housing 3210 may be disposed at a position corresponding to the second lateral plate 3342-2 of the cover member 3340. The third side portion of the housing 3210 may be disposed at a position corresponding to a third lateral plate 3342-3 of the cover member 3340. The fourth side portion of the housing 3210 may be disposed at a position corresponding to a fourth lateral plate 3342-4 of the cover member 3340.

The housing 3210 may comprise a hole 3211. The hole 3211 may be hollow. The hole 3211 may be formed in the housing 3210. The hole 3211 may be formed to penetrate through the housing 3210 in an optical axis direction. A bobbin 3110 may be disposed in the hole 3211. At least a portion of the hole 3211 may be formed in a shape corresponding to that of the bobbin 3110. An inner circumferential surface or an inner circumferential surface of the housing 3210 forming the hole 3211 may be spaced apart from an outer circumferential surface of the bobbin 3110. However, the housing 3210 and the bobbin 3110 may be at least partially overlapped in an optical axis direction, thereby restricting the distance of the moving stroke of the bobbin 3110 in an optical axis direction.

The housing 3210 may comprise a groove 3212. The groove 3212 may accommodate at least a portion of the lower stopper 3114 of the bobbin 3110. The bottom surface of the groove 3212 may be overlapped with the lower stopper 3114 of the bobbin 3110 in an optical axis direction. When the bobbin 3110 moves downward, the lower stopper 3114 of the bobbin 3110 may be in contact with the bottom surface of the groove 3212 of the housing 3210.

The housing 3210 may comprise a hole 3213. The hole 3213 may be a magnet accommodating groove. A magnet 3220 may be coupled to the groove 3213. The groove 3213 may be formed as a portion of an inner circumferential surface and/or a lower surface of the housing 3210 is being recessed. The groove 3213 may be formed in each of the three side portions of the housing 3210. The groove 3213 may be formed in first, second and fourth side portions of the housing 3210. The groove 3213 may be formed in a shape corresponding to the third side portion of the housing 3210, but a dummy member 3230, instead of the magnet 3220, may be disposed in the groove 3213 being formed in a third side portion of the housing 3210.

The housing 3210 may comprise a hole 3214. The hole 3214 may be a hole through which a support member passes. The hole 3214 may be formed in a corner portion of the housing 3210. The hole 3214 may be formed to penetrate through the housing 3210 in an optical axis direction. A support member 3500 may be disposed in the hole 3214 of the housing 3210. The support member 3500 may pass through the hole 3214 of the housing 3210.

The first lens driving device 3010 may comprise a magnet 3220. The second mover 3200 may comprise a magnet 3220. The magnet 3220 may be disposed in the housing 3210. The magnet 3220 may be disposed inside the cover member 3340. The magnet 3220 may be fixed to the housing 3210 by an adhesive. The magnet 3220 may be disposed between the bobbin 3110 and the housing 3210. The magnet 3220 may face the first coil 3120. The magnet 3220 may interact with the first coil 3120 electromagnetically. The magnet 3220 may move the bobbin 3110 in an optical axis direction through interaction with the first coil 3120. The magnet 3220 may be used for AF driving. The magnet 3220 may face the second coil 3330. The magnet 3220 may interact with the second coil 3330 electromagnetically. The magnet 3220 may move the bobbin 3110 and the housing 3210 in a direction perpendicular to the optical axis direction through interaction with the second coil 3330. The magnet 3220 may be used for OIS driving. The magnet 3220 may be disposed in a plurality of side portions of the housing 3210. The magnet 3220 may be a flat magnet having a flat plate shape.

The magnet 3220 may comprise a plurality of magnets. The magnet 3220 may comprise three magnets. The magnet 3220 may comprise first to third magnets 3221, 3222, and 3223. The first magnet 3221 may be disposed in a first side portion of the housing 3210. The second magnet 3221 may be disposed in a second side portion of the housing 3210. The third magnet 3221 may be disposed in a fourth side portion of the housing 3210. A dummy member 3230 may be disposed in a third side portion of the housing 3210.

The first magnet 3221 may face the first-first coil 3121. The second magnet 3222 may face the first-second coil 3122. The first and second magnets 3221 and 3222 may be used during AF driving. The magnet 3220 may comprise: a first magnet 3221 being disposed at a position corresponding to the first lateral plate 3342-1 of the cover member 3340; a second magnet 3222 being disposed at a position corresponding to the second lateral plate 3342-2; and a third magnet 3223 being disposed at a position corresponding to the fourth lateral plate 3342-4.

The first magnet 3221 may face the second-first coil 3331. The second magnet 3222 may face the second-second coil 3332. The first and second magnets 3221 and 3222 may be used when driving in an OIS-x axis direction. The third magnet 3223 may face the second-third coil 3333. The third magnet 3223 may be used when driving in an OIS-y axis direction. The area of a lower surface of the third magnet 3223 may be larger than that of each of the lower surfaces of the first magnet 3221 and the second magnet 3222.

The first magnet 3221 and the second magnet 3222 may be 4-pole magnetized magnets. The first magnet 3221 and the second magnet 3222 may be 4-pole magnets. The 4-pole magnetized magnet may comprise a neutral portion being disposed in a horizontal direction at the central portion. Here, the neutral portion may be a void. The first magnet 3221 and the second magnet 3222 may be both-pole magnetized. As the first magnet 3221 and the second magnet 3222 are both-pole magnetized, the AF electromagnetic force can be maximized. Each of the first magnet 3221 and the second magnet 3222 may be a 4-pole magnet in which an upper portion of the inner surface has a different polarity than a lower portion of the inner surface and an upper portion of the outer surface, and the same polarity as a lower portion of the outer surface.

The third magnet 3223 may be a two-pole magnetized magnet. The third magnet 3223 may be a two-pole magnet. The third magnet 3223 may be a two-pole magnet having different inner and outer polarities. For example, an inner surface of the third magnet 3223 may have an N pole and an outer surface of the third magnet 3223 may have an S pole. Conversely, an inner surface of the third magnet 3223 may be an S pole and an outer surface of the third magnet 3223 may be an N pole. However, as a modified embodiment, the third magnet 3223 may be a 4-pole magnet. The third magnet 3223 may be larger than each of the first magnet 3221 and the second magnet 3222.

The first lens driving device 3010 may comprise a dummy member 3230. The second mover 3200 may comprise a dummy member 3230. The dummy member 3230 may be disposed in the housing 3210. The dummy member 3230 may be disposed in the third side portion of the housing 3210. The dummy member 3230 may be disposed adjacent to the second lens driving device 3020. Through this, magnetic force interference between the first lens driving device 3010 and the second lens driving device 3020 can be minimized. The dummy member 3230 may be disposed at a position corresponding to the third lateral plate 3342-3 of the cover member 3340.

The dummy member 3230 may have a weight corresponding to that of the third magnet 3223. The dummy member 3230 may have a weaker magnetic force than the third magnet 3223 or may not have magnetic force. The dummy member 3230 may be disposed at an opposite side of the third magnet 3223 in the housing 3210. The weight of the dummy member 3230 may correspond to the weight of the third magnet 3223. However, the dummy member 3230 may have a weight lighter than the weight of the third magnet 3223. Or, the dummy member 3230 may have a weight heavier than the weight of the third magnet 3223. The dummy member 3230 may be inside 80% of the weight of the third magnet 3223 to 120% of the weight of the third magnet 3223. If the weight of the dummy member 3230 is less than the lower limit or exceeds the upper limit of the above-mentioned values, the weight balancing of the OIS driving unit may collapse.

The dummy member 3230 may be a non-magnetic material. The dummy member 3230 may comprise a non-magnetic material. The magnetic strength of the dummy member 3230 may be weaker than the magnetic strength of the third magnet 3223. The dummy member 3230 may be disposed at an opposite side of the third magnet 3223 to align the center of gravity. The dummy member 3230 may be made from a material of 95% or more of tungsten. That is, the dummy member 3230 may be a tungsten alloy. For an example, the specific gravity of the dummy member 3230 may be 18000 or more. The dummy member 3230 may be disposed symmetrically with the third magnet 3223 with respect to a central axis of the housing 3210. At this time, the central axis of the housing 3210 may correspond to an optical axis. The dummy member 3230 may have a thickness corresponding to the third magnet 3223 in a direction perpendicular to the optical axis.

The first lens driving device 3010 may comprise a yoke 3240. The second mover 3200 may comprise a yoke 3240. The yoke 3240 may be disposed in the housing 3210. The yoke 3240 may be disposed on a third side portion of the housing 3210. The yoke 3240 may be disposed adjacent to the second lens driving device 3020. Through this, magnetic force interference between the first lens driving device 3010 and the second lens driving device 3020 can be minimized.

The first lens driving device 3010 may comprise a stator 3300. The stator 3300 may be disposed below the first and second movers 3100 and 3200. The stator 3300 may movably support the second mover 3200. The stator 3300 may move the second mover 3200. At this time, the first mover 3100 can also move together with the second mover 3200.

The first lens driving device 3010 may comprise a base 3310. The stator 3300 may comprise a base 3310. The base 3310 may be disposed below the housing 3210. The base 3310 may be disposed below the substrate 3320. A substrate 3320 may be disposed on an upper surface of the base 3310. The base 3310 may be coupled to the cover member 3340. The base 3310 may be disposed on the printed circuit board 3030.

The base 3310 may comprise a step 3311. The step 3311 may be formed on a side surface of the base 3310. The step 3311 may be formed around an outer circumferential surface of the base 3310. The step 3311 may be formed as a portion of a side surface of the base 3310 is protruded or recessed. A lower end of the lateral plate 3342 of the cover member 3340 may be disposed at the step 3311.

The base 3310 may comprise a hole 3312. The hole 3312 may be hollow. The hole 3312 may penetrate through the base 3310 in an optical axis direction. A light passing through the first lens 3041 through the hole 3312 may be incident to the image sensor.

The base 3310 may comprise a protrusion 3313. The protrusion 3313 may be formed on an upper surface of the base 3310. The protrusion 3313 may be protruded from an upper surface of the base 3310. A second coil 3330 may be disposed at the protrusion 3313. A second coil 3330 may be wound around the protrusion 3313 and disposed.

The first lens driving device 3010 may comprise a substrate 3320. The stator 3300 may comprise a substrate 3320. The substrate 3320 may be disposed at one side of the housing 3210. The substrate 3320 may be disposed between the base 3310 and the housing 3210. The substrate 3320 may be disposed on an upper surface of the base 3310. A support member 3500 may be coupled to the substrate 3320. The substrate 3320 may be electrically connected to the support member 3500. One end of the support member 3500 may be fixed to the substrate 3320. The substrate 3320 may be coupled to the printed circuit board 3030 being disposed below the base 3310 by soldering. The substrate 3320 may comprise a flexible printed circuit board (FPCB). The substrate 3320 may be partially bent.

The substrate 3320 may comprise a body part 3321. A hole may be formed in the body part 3321. The hole may be hollow penetrating the substrate 3320 in an optical axis direction. The substrate 3320 may comprise a hole. A support member 3500 may be disposed in the hole of the substrate 3320. The support member 3500 may be disposed to penetrate through the hole of the substrate 3320.

The substrate 3320 may comprise a first terminal unit 3322. The first terminal unit 3322 may be extended downward from the body part 3321 of the substrate 3320. The first terminal unit 3322 may be formed as a portion of the substrate 3320 is being bent. At least a portion of the first terminal unit 3322 may be exposed to the outside. The first terminal unit 3322 may be coupled to the printed circuit board 3030 being disposed below the base 3310 by soldering. The first terminal unit 3322 may be disposed in a groove of the base 3310. The first terminal unit 3322 may comprise a plurality of terminals. The first terminal unit 3322 may be disposed between the gyro sensor 3050 and the second lens driving device 3010.

The substrate 3320 may comprise a first terminal unit 3322 and a plurality of terminals being disposed in the first terminal unit 3322 and electrically connected to the printed circuit board 3030. The first terminal unit 3322 of the substrate 3320 may be disposed at a position corresponding to the first lateral plate 3342-1 of the cover member 3340. The first terminal unit 3322 of the substrate 3320 may be disposed closest to the first lateral plate 3342-1 among the first to fourth lateral plates 3342-1, 3342-2, 3342-3, and 3342-4 of the cover member 3340. In a direction in which the second lateral plate 3342-2 faces the first lateral plate 3342-1, the first terminal unit 3322 may not be overlapped with the gyro sensor 3050.

The first terminal unit 3322 may be disposed closer to one corner among the corners on both sides of the first lateral plate 3342-1 of the cover member 3340. The first lateral plate 3342-1 of the cover member 3340 may comprise: a first region close to one of the corners on both sides; and a second region close to the other corner among the corners on both sides. The first terminal unit 3322 may be disposed at a position corresponding to a first region of the first lateral plate 3342-1. The gyro sensor 3050 may be disposed at a position corresponding to the second region of the first lateral plate 3342-1.

In a direction in which the third lateral plate 3342-3 faces the fourth lateral plate 3342-4, the length of the first terminal unit 3322 may be shorter than the length of the second terminal unit 3323. The substrate 3320 may comprise: a first terminal unit 3322 being disposed at a position corresponding to the first lateral plate 3342-1; and a second terminal unit 3323 being disposed at a position corresponding to the second lateral plate 3342-2. The width of the first terminal unit 3322 in a first direction may be smaller than the width of the second terminal unit 3323 in a first direction. The first terminal unit 3322 of the substrate 3320 may be omitted at a position corresponding to the gyro sensor 3050.

In a first embodiment of the present embodiment, the first terminal unit 3322 may be driven to one side of the first lens driving device 3010 to secure an arrangement space for the gyro sensor 3050. The first lens driving device 3010 may comprise a plurality of terminals. The terminals of the first lens driving device 3010 may comprise 17 terminals. Due to size limitations, the first terminal unit 3322 may comprise 7 terminals, and the second terminal unit 3323 may comprise 10 terminal units. Seven or less terminals may be disposed in the first terminal unit 3322. Ten or more terminals may be disposed in the second terminal unit 3323. The plurality of terminals of the first lens driving device 3010 may comprise: two terminals for the first coil 3120; two terminals for the second-first and second-second coils 3331 and 3332; two terminals for the second-third coil 3333; four terminals for the first sensor 3610; and eight terminals for the second sensor 3620. At this time, when the ground terminal is commonly used among the eight terminals for the two second sensors 3620, seven terminals may be required for the two second sensors 3620.

The substrate 3320 may comprise a second terminal unit 3323. The second terminal unit 3323 may be disposed at an opposite side of the first terminal unit 3322. The second terminal unit 3323 of the substrate 3320 may be disposed at a position corresponding to the second lateral plate 3342-2 of the cover member 3340.

The first lens driving device 3010 may comprise a second coil 3330. The stator 3300 may comprise a second coil 3330. The second coil 3330 may be an 'OIS coil'. The second coil 3330 may move the bobbin 3110. The second coil 3330 may be disposed in the base 3310. The second coil 3330 may be disposed in the substrate 3320. The second coil 3330 may face the magnet 3220. The second coil 3330 may interact with the magnet 3220 electromagnetically. In this case, when a current is supplied to the second coil 3330 and a magnetic field is formed around the second coil 3330, the magnet 3220 may move against the second coil 3330 due to electromagnetic interaction between the second coil 3330 and the magnet 3220. The second coil 3330 may move the housing 3210 and the bobbin 3110 in a direction perpendicular to the optical axis with respect to the base 3310 through electromagnetic interaction with the magnet 3220. The substrate 3320 may comprise a second coil 3330. That is, the second coil 3330 may be a configuration of the substrate 3320. The second coil 3330 may be formed as a fine pattern coil (FP coil) in a substrate separate from the substrate 3320.

The second coil 3330 may comprise a plurality of coils. The second coil 3330 may comprise a number of coils corresponding to those of the magnet 3220. The second coil 3330 may comprise three coils. The second coil 3330 may comprise a second-first coil 3331, a second-second coil 3332, and a second-third coil 3333. The second-first coil 3331 may face the first magnet 3221. The second-second coil 3332 may face the second magnet 3222. The second-third coil 3333 may face the third magnet 3223.

The number of windings of the second-first coil 3331 may be greater than the number of windings of the second-second coil 3332 and the second-third coil 3333. The number of windings of the second-second coil 3332 may correspond to the number of windings of the second-third coil 3333. In a first embodiment of the present embodiment, the movement in an X-axis direction is performed through the second-first coil 3331 and the second-second coil 3332 during OIS driving, and the movement in a Y-axis direction can be performed through the second-third coil 3333. Therefore, in a first embodiment of the present embodiment, in order to compensate for the insufficient driving force in a Y-axis direction, the number of turns of the second-third coil 3333 may be higher than the number of turns of the second-first coil 3331 and the second-second coil 3332. For an example, the ratio of the number of turns of the second-third coil 3333 to the number of turns of the second-first and second-second coils 3331 and 3332 may be 1.5:2.0 to 1:1. Ideally, the ratio of the number of turns of the second-third coil 3333 to the number of turns of the second-first and second-second coils 3331 and 3332 is 1:1, but it can be disposed up to 1.5:2.0 due to the space constraint.

The first lens driving device 3010 may comprise a cover member 3340. The stator 3300 may comprise a cover member 3340. The cover member 3340 may comprise a 'cover can'. The cover member 3340 may comprise a yoke. The cover member 3340 may be disposed outside the housing 3210. The cover member 3340 may be coupled to the base 3310. The cover member 3340 may accommodate the housing 3210 therein. The cover member 3340 may form the outer appearance of the first lens driving device 3010. The cover member 3340 may have a hexahedral shape with an open lower surface. The cover member 3340 may be a non-magnetic material. The cover member 3340 may be formed of a metal material. The cover member 3340 may be formed of a metal plate material. The cover member 3340 may be connected to the ground portion of the printed circuit board 3030. Through this, the cover member 3340 may be grounded. The cover member 3340 may block electromagnetic interference (EMI). At this time, the cover member 3340 may be referred to as an 'EMI shield can'.

The cover member 3340 may comprise an upper plate 3341 and a lateral plate 3342. The cover member 3340 may comprise an upper plate 3341 comprising a hole and a lateral plate 3342 being extended downward from an outer circumference or edge of the upper plate 3341. The lower end of the lateral plate 3342 of the cover member 3340 may be disposed in the step 3311 of the base 3310. An inner surface of the lateral plate 3342 of the cover member 3340 may be fixed to the base 3310 by an adhesive.

The lateral plate 3342 of the cover member 3340 may comprise a plurality of lateral plates. The lateral plate 3342 may comprise four lateral plates. The lateral plate 3342 of the cover member 3340 may comprise: a first lateral plate 3342-1 being disposed at an opposite side to each other; a second lateral plate 3342-2; a third lateral plate 3342-3 being disposed at an opposite side to each other; and a fourth lateral plate 3342-4. The gyro sensor 3050 may be disposed closest to the first lateral plate 3342-1 among the first to fourth lateral plates 3342-1, 3342-2, 3342-3, and 3342-4. The first terminal unit 3322 of the substrate 3320 may be disposed at a position corresponding to the first lateral plate 3342-1 of the cover member 3340.

The cover member 3340 may comprise a groove 3343. The groove 3343 may be formed in the lateral plate 3342 of the cover member 3340. The groove 3343 may be formed at a lower end of the lateral plate 3342. The groove 3343 may be formed at a position corresponding to the first terminal unit 3322. The groove 3343 may be formed to expose the first terminal unit 3322 to the outside.

The first lens driving device 3010 may comprise a terminal 3350. The stator 3300 may comprise a terminal 3350. The terminal 3350 may be disposed in the base 3310. The terminal 3350 may be electrically connected to the substrate 3320. The terminal 3350 may be coupled to the support member 3500. The terminal 3350 may electrically connect the support member 3500 and the substrate 3320.

The first lens driving device 3010 may comprise an elastic member 3400. The elastic member 3400 may be an 'AF support member'. At least portion of the elastic member 3400 may have elasticity. The elastic member 3400 may be formed of metal. The elastic member 3400 may be formed of a conductive material. The elastic member 3400 may connect the bobbin 3110 and the housing 3210. The elastic member 3400 may elastically connect the bobbin 3110 and the housing 3210. The elastic member 3400 may be coupled to the bobbin 3110 and the housing 3210. The elastic member 3400 may elastically support the bobbin 3110. The elastic member 3400 may movably support the bobbin 3110. The elastic member 3400 may support the movement of the bobbin 3110 during AF driving.

The elastic member 3400 may comprise a first elastic member 3410. The first elastic member 3410 may be an 'upper elastic member'. The first elastic member 3410 may connect the housing 3210 and the bobbin 3110. The first elastic member 3410 may be coupled to an upper portion of the bobbin 3110 and an upper portion of the housing 3210. The first elastic member 3410 may be coupled to an upper surface of the bobbin 3110. The first elastic member 3410 may be coupled to an upper surface of the housing 3210. The first elastic member 3410 may be coupled to the support member 3500. The first elastic member 3410 may be formed of a leaf spring. The first elastic member 3410 may be separated and used as a power line for electrical or communication signal.

The first elastic member 3410 may comprise a plurality of elastic units. The first elastic member 3410 may comprise three elastic units. The first elastic member 3410 may comprise first to third elastic units 3410-1, 3410-2, and 3410-3. The first elastic unit 3410-1 may connect the support member 3500 and one end of the first-first coil 3121. The second elastic unit 3410-2 may connect the other end of the first-first coil 3121 and one end of the first-second coil 3122. The third elastic unit 3410-3 may connect the other end of the first-second coil 3122 and the support member 3500. The first elastic member 3410 may be electrically connected to the first coil 3120. The first elastic member 3410 may electrically connect the first coil 3120 and the support member 3500.

The first elastic member 3410 may comprise an outer side portion 3411. The outer side portion 3411 may be coupled to the housing 3210. The outer side portion 3411 may be coupled to an upper surface of the housing 3210. The outer side portion 3411 may comprise a hole or groove being coupled to the protrusion of the housing 3210. The outer side portion 3411 may be fixed to the housing 3210 by an adhesive.

The first elastic member 3410 may comprise an inner side portion 3412. The inner side portion 3412 may be coupled with the bobbin 3110. The inner side portion 3412 may be coupled to an upper surface of the bobbin 3110. The inner side portion 3412 may comprise a hole or groove being coupled to a protrusion of the bobbin 3110. The inner side portion 3412 may be fixed to the bobbin 3110 by an adhesive.

The first elastic member 3410 may comprise a connecting portion 3413. The connecting portion 3413 may connect the inner side portion 3412 and the outer side portion 3411. The connecting portion 3413 may have elasticity. At this time, the connecting portion 3413 may be referred to as an 'elastic portion'. The connecting portion 3413 may comprise a shape bent two or more times.

The first elastic member 3410 may comprise a connecting portion 3414. The connecting portion 3414 may be extended from an outer side portion 3411. The connecting portion 3414 may be coupled to the support member 3500. The connecting portion 3414 and the support member 3500 may be coupled by soldering.

The elastic member 3400 may comprise a second elastic member 3420. The second elastic member 3420 may be a 'lower elastic member'. The second elastic member 3420 may be disposed below the first elastic member 3410. The second elastic member 3420 may be disposed on one side of the first elastic member 3410. The second elastic member 3420 may connect the housing 3210 and the bobbin 3110. The second elastic member 3420 may be disposed below the bobbin 3110. The second elastic member 3420 may be coupled to the bobbin 3110 and the housing 3210. The second elastic member 3420 may be coupled to a lower surface of the bobbin 3110. The second elastic member 3420 may be coupled to a lower surface of the housing 3210. The second elastic member 3420 may be formed of a leaf spring. The second elastic member 3420 may be integrally formed.

The second elastic member 3420 may comprise an outer side portion 3421. The outer side portion 3421 may be coupled to the housing 3210. The outer side portion 3421 may be coupled to a lower surface of the housing 3210. The outer side portion 3421 may comprise a hole or groove being coupled to the protrusion of the housing 3210. The outer side portion 3421 may be fixed to the housing 3210 by an adhesive.

The second elastic member 3420 may comprise an inner side portion 3422. The inner side portion 3422 may be coupled to the bobbin 3110. The inner side portion 3422 may be coupled to a lower surface of the bobbin 3110. The inner side portion 3422 may comprise a hole or groove being coupled to a protrusion of the bobbin 3110. The inner side portion 3422 may be fixed to the bobbin 3110 by an adhesive.

The second elastic member 3420 may comprise a connecting portion 3423. The connecting portion 3423 may connect an inner side portion 3422 and an outer side portion 3421. The connecting portion 3423 may have elasticity. At this time, the connecting portion 3423 may be referred to as an 'elastic portion'. The connecting portion 3423 may comprise a shape bent two or more times.

The first lens driving device 3010 may comprise a support member 3500. The support member 3500 may be an 'OIS support member'. The support member 3500 may connect the first elastic member 3410 and the substrate 3320 or the first elastic member 3410 and the terminal 3350. The support member 3500 may be coupled to an upper surface of the first elastic member 3410 and the terminal 3350. The support member 3500 may movably support the housing 3210. The support member 3500 may elastically support the housing 3210. At least a portion of the support member 3500 may have elasticity. The support member 3500 may elastically support the movement of the housing 3210 and the bobbin 3110 during OIS driving. One end of the support member 3500 may be coupled to the first elastic member 3410 by soldering. The other end of the support member 3500 may be coupled to the terminal 3350 by soldering.

The support member 3500 may comprise a plurality of wires. The support member 3500 may comprise four wires. The plurality of wires may comprise four wires connecting the three first elastic units 3410-1, 3410-2, and 3410-3 and the substrate 3320. As a modified example, the support member 3500 may be formed of a leaf spring.

The first lens driving device 3010 may comprise a first sensor 3610. The first sensor 3610 may be disposed in the base 3310. The first sensor 3610 may detect the sensing magnet 3130. The first sensor 3610 may be disposed in the substrate 3320. The first sensor 3610 may be coupled to a lower surface of the substrate 3320. The first sensor 3610 may be spaced apart from the housing 3210. The first sensor 3610 may be spaced apart from the bobbin 3110. The first sensor 3610 may be overlapped with the sensing magnet 3130 in an optical axis direction. The first sensor 3610 may detect the position of the sensing magnet 3130 for AF feedback control. The first sensor 3610 may be a Hall IC, a Hall element, or a Hall sensor. The first sensor 3610 may detect the magnetic force of the sensing magnet 3130.

The first lens driving device 3010 may comprise a second sensor 3620. The second sensor 3620 may be disposed between the base 3310 and the substrate 3320. The second sensor 3620 may detect the movement of the second mover 3300. The second sensor 3620 may detect the movement of the housing 3210 and the magnet 3220 by detecting the magnetic force of the magnet 3220. A detection value detected by the second sensor 3620 may be used for OIS feedback control. The second sensor 3620 may comprise a plurality of Hall sensors. The second sensor 3620 may comprise two Hall sensors. The second sensor 3620 may comprise a first Hall sensor for detecting the movement in an x-axis direction in the horizontal direction and a second Hall sensor for detecting the movement in a y-axis direction in the horizontal direction.

The first lens driving device 3010 may comprise a damper. The damper may be disposed in the support member 3500. The damper may be disposed in the support member 3500 and the housing 3210. The damper may be disposed in the elastic member. The damper may be disposed in the elastic member 3400 and/or the support member 3500 to prevent a resonance phenomenon generated in the elastic member 3400 and/or the support member 3500.

The camera device 3002 may comprise a second lens driving device 3020. The second lens driving device 3020 may be a voice coil motor (VCM). The second lens driving device 3020 may be a lens driving motor. The second lens driving device 3020 may be a lens driving actuator. The second lens driving device 3020 may comprise an AF module. The second lens driving device 3020 may comprise an OIS module. The second lens driving device 3020 may be disposed on a first surface of the printed circuit board 3030. The second lens driving device 3020 may be disposed closest to the third lateral plate 3342-3 among the first to fourth lateral plates 3342-1, 3342-2, 3342-3, and 3342-4 of the first lens driving device 3010.

The second lens driving device 3020 may comprise a first mover. The first mover may be coupled to the second lens 3042. The first mover may be connected to the second mover through the first elastic member and/or the second elastic member. The first mover may move through interaction with the second mover. At this time, the first mover can move integrally with the second lens 3042. Meanwhile, the first mover may move during AF driving. At this time, the first mover may be referred to as an 'AF mover'. However, the first mover may move together with the second mover even during OIS driving.

The second lens driving device 3020 may comprise a bobbin. The first mover may comprise a bobbin. A bobbin may be disposed inside the housing. The bobbin may be disposed in a hole in the housing. The bobbin may be movably coupled to the housing. The bobbin is movable against the housing in an optical axis direction. A second lens 3042 may be coupled to the bobbin. The bobbin and the second lens 3042 may be coupled by screw-coupling and/or an adhesive. A first coil may be coupled to the bobbin. A first elastic member may be coupled to an upper portion or upper surface of the bobbin. A second elastic member may be coupled to a lower portion or lower surface of the bobbin. The bobbin may be coupled to the first elastic member and/or the second elastic member by thermal fusion and/or an adhesive. The adhesive for coupling the bobbin and the second lens 3042 and the bobbin and the elastic member may be an epoxy cured by at least one among ultraviolet (UV) light, heat, and laser.

The second lens driving device 3020 may comprise a first coil. The first mover may comprise a first coil. The first coil may be an 'AF driving coil' used for AF driving. The first coil may be disposed in the bobbin. The first coil may move the bobbin. The first coil may be disposed between the bobbin and the housing. The first coil may be disposed on an outer lateral surface or an outer circumferential surface of the bobbin. The first coil may be directly wound in the bobbin. Or, the first coil may be coupled to the bobbin in a directly wound state. The first coil may face the magnet 3022. The first coil may be disposed to face the magnet 3022. The first coil may interact electromagnetically with the magnet 3022. In this case, when a current is supplied to the first coil and an electromagnetic field is formed around the first coil, the first coil may move against the magnet 3022 due to the electromagnetic interaction between the first coil and the magnet 3022.

The first coil may comprise a plurality of coils. The first coil may comprise two coils. The first coil may comprise first-first and first-second coils. The first-first coil may be disposed at a position corresponding to the first lateral plate of the cover member. The first-first coil may be disposed to face the first lateral plate of the cover member. The first-second coil may be disposed at a position corresponding to the second lateral plate of the cover member. The first-second coil may be disposed to face the second lateral plate of the cover member.

In a first embodiment of the present embodiment, the first coil and the magnet 3022 may move the bobbin in an optical axis direction against the housing. The first coil and the magnet 3022 may move the bobbin in an optical axis direction through an electromagnetic interaction. The first coil and the magnet 3022 may be used for AF driving.

The second lens driving device 3020 may comprise a coil. The coil can move the bobbin. The coil may comprise a first coil for moving the bobbin in an optical axis direction and a second coil for moving the bobbin in a direction perpendicular to the optical axis direction.

The second lens driving device 3020 may comprise a sensing magnet. The first mover may comprise a sensing magnet. A sensing magnet may be disposed in the bobbin. The sensing magnet may be detected through the first sensor. In addition, the second lens driving device 3020 may comprise a compensation magnet. The first mover may comprise a compensation magnet. The compensation magnet may be disposed to achieve magnetic force balance with the sensing magnet. The compensation magnet may have a weight corresponding to that of the sensing magnet. The compensation magnet may be disposed symmetrically with the sensing magnet with respect to an optical axis.

The second lens driving device 3020 may comprise a second mover. The second mover may be movably coupled to the stator through a support member. The second mover may support the first mover through the first and second elastic members. The second mover may move the first mover or move together with the first mover. The second mover may move through the interaction with the stator. The second mover can move during OIS driving. At this time, the second mover may be referred to as an 'OIS mover'. The second mover can move integrally with the first mover during OIS driving.

The second lens driving device 3020 may comprise a housing. The second mover may comprise a housing. The housing may be spaced apart from the base. The housing may be disposed outside the bobbin. The housing can accommodate at least a portion of the bobbin. The housing may be disposed inside the cover member. The housing may be disposed between the cover member and the bobbin. The housing may be formed of a material different from that of the cover member. The housing may be formed of an insulating material. The housing may be formed through injection molding. An outer side surface of the housing may be spaced apart from an inner surface of a lateral plate of the cover member. The housing may be moved for OIS driving through the separation space between the housing and the cover member. A magnet 3022 may be disposed in the housing. The housing and the magnet 3022 may be coupled by an adhesive. A first elastic member may be coupled to an upper portion or upper surface of the housing. A second elastic member may be coupled to a lower portion or lower surface of the housing. The housing may be coupled to an upper portion and the second elastic member by thermal fusion and/or an adhesive. An adhesive coupling the housing and the magnet 3022 and the housing and the elastic member may be an epoxy cured by at least one among ultraviolet (UV) light, heat, and laser.

The housing may comprise four side portions and four corner portions being disposed between the four side portions. The side portion of the housing may comprise: a first side portion; a second side portion being disposed at an opposite side of the first side portion; and a third side portion and a fourth side being disposed at an opposite side to each other between the first side portion and the second side portion. The corner portion of the housing may comprise: a first corner portion being disposed between the first side portion and the third side portion; a second corner portion being disposed between the first side portion and the fourth side portion; a third corner portion being disposed between a second side portion and the third side portion; and a fourth corner portion being disposed between the second side portion and the fourth side portion. A side portion of the housing may comprise a 'lateral wall'. The first side portion of the housing may be disposed at a position corresponding to the first lateral plate of the cover member. The second side portion of the housing may be disposed at a position corresponding to the second lateral plate of the cover member. The third side portion of the housing may be disposed at a position corresponding to the third lateral plate of the cover member. The fourth side portion of the housing may be disposed at a position corresponding to the fourth lateral plate of the cover member.

The second lens driving device 3020 may comprise a magnet 3022. The second mover may comprise a magnet 3022. The magnet 3022 may be disposed in the housing. The magnet 3022 may be disposed inside the cover member. The magnet 3022 may be fixed to the housing by an adhesive. The magnet 3022 may be disposed between the bobbin and the housing. The magnet 3022 may face the first coil. The magnet 3022 may interact electromagnetically with the first coil. The magnet 3022 may move the bobbin in an optical axis direction through the interaction with the first coil. The magnet 3022 may be used for AF driving. The magnet 3022 may face the second coil. The magnet 3022 may interact electromagnetically with the second coil. The magnet 3022 may move the bobbin and the housing in a direction perpendicular to the optical axis direction through the interaction with the second coil. The magnet 3022 may be used for OIS driving. The magnet 3022 may be disposed in a plurality of side portions of the housing. The magnet 3022 may be a flat magnet having a flat plate shape.

The magnet 3022 may comprise a plurality of magnets. The magnet 3022 may comprise three magnets. The magnet 3022 may comprise first to third magnets. The first magnet may be disposed in a first side portion of the housing. The second magnet may be disposed in a second side portion of the housing. The third magnet may be disposed in a fourth side portion of the housing. A dummy member may be disposed in a third side portion of the housing.

The first magnet may face the first-first coil. The second magnet may face the first-second coil. The first and second magnets may be used during AF driving. The magnet may comprise: a first magnet being disposed at a position corresponding to the first lateral plate of the cover member; a second magnet being disposed at a position corresponding to the second lateral plate; and a third magnet being disposed at a position corresponding to the fourth lateral plate.

The first magnet may face the second-first coil. The second magnet may face the second-second coil. The first and second magnets may be used when driving in an OIS-x-axis direction. The third magnet may face the second-third coil. The third magnet may be used when driving in an OIS-y-axis direction. The area of the lower surface of the third magnet may be larger than that of each of the lower surfaces of the first and second magnets.

The second lens driving device 3020 may comprise a dummy member. The second mover may comprise a dummy member. The dummy member may be disposed in the housing. The dummy member may be disposed in the third side portion of the housing. The dummy member may be disposed adjacent to the second lens driving device 3020. Through this, magnetic force interference between the second lens driving device 3020 and the second lens driving device 3020 may be minimized. The dummy member may be disposed at a position corresponding to the third lateral plate of the cover member.

The dummy member may have a weight corresponding to that of the third magnet. The dummy member may have weaker magnetic force than the third magnet or may not have magnetic force. The dummy member may be disposed at an opposite side of the third magnet in the housing. The weight of the dummy member may correspond to the weight of the third magnet. However, the dummy member may have a weight lighter than that of the third magnet. Or, the dummy member may have a weight heavier than that of the third magnet. The dummy member may be within 80% of the weight of the third magnet to 120% of the weight of the third magnet. When the weight of the dummy member is less than the lower limit or exceeds the upper limit of the above-mentioned value, the weight balancing of the OIS driving unit may collapse.

The dummy member may be a non-magnetic material. The dummy member may comprise a non-magnetic material. The magnetic strength of the dummy member may be weaker than that of the third magnet. The dummy member may be disposed at an opposite side of the third magnet to align the center of gravity. The dummy member may be made of 95% or more of tungsten. That is, the dummy member may be a tungsten alloy. For example, the specific gravity of the dummy member may be 18000 or more. The dummy member may be disposed at a position symmetrical to the third magnet with respect to the central axis of the housing. At this time, the central axis of the housing may correspond with an optical axis. The dummy member may have a thickness corresponding to the third magnet and a direction perpendicular to the optical axis.

The second lens driving device 3020 may comprise a yoke. The second mover may comprise a yoke. The yoke may be disposed in the housing. The yoke may be disposed in the third side portion of the housing. The yoke may be disposed adjacent to the second lens driving device 3020. Through this, magnetic force interference between the second lens driving device 3020 and the second lens driving device 3020 may be minimized.

The second lens driving device 20 may comprise a yoke 2240. The second mover 2200 may comprise a yoke 2240. The yoke 2240 may be disposed in the second housing 2210. The yoke 2240 may be disposed in the first side portion of the second housing 2210. The yoke 2240 may be disposed adjacent to the first lens driving device 10. Through this, magnetic force interference between the first lens driving device 10 and the second lens driving device 20 can be minimized.

The second lens driving device 3020 may comprise a stator. The stator may be disposed below the first and second movers. The stator may movably support the second mover. The stator may move the second mover. At this time, the first mover can also move with the second mover.

The second lens driving device 3020 may comprise a base. The stator may comprise a base. The base may be disposed below the housing. The base can be disposed below the substrate. A substrate may be placed on an upper surface of the base. The base may be coupled with the cover member. The base may be disposed on the printed circuit board 3030.

The second lens driving device 3020 may comprise a substrate. The stator may comprise a substrate. A substrate may be disposed at one side of the housing. A substrate may be disposed between the base and the housing. The substrate may be placed on an upper surface of the base. A support member may be coupled to the substrate. The substrate may be electrically connected to the support member. One end of the support member may be fixed to the substrate. The substrate may be coupled to the printed circuit board 3030 being disposed below the base by soldering. The substrate may comprise a flexible printed circuit board (FPCB). The substrate may be bent in part.

The substrates may comprise a body part. A hole may be formed in the body part. The hole may be hollow penetrating the substrate in an optical axis direction. The substrate may comprise a hole. A support member may be disposed in the hole of the substrate. The support member may be disposed to pass through the hole of the substrate.

The second lens driving device 3020 may comprise a terminal unit 3021. The terminal unit 3021 may be extended from the body part. The terminal unit 3021 may be extended downward from the body part. The terminal unit 3021 may be bent from the body part. The terminal unit 3021 may comprise a plurality of terminal units. The terminal unit 3021 may comprise a first terminal unit and a second terminal unit being disposed at an opposite side of the first terminal unit. In the second lens driving device 3020, the first terminal unit and the second terminal unit may have the same width. The first terminal unit may be disposed to correspond to the first lateral plate of the cover member, and the second terminal unit may be disposed to correspond to the second lateral plate of the cover member.

The second lens driving device 3020 may comprise a second coil. The stator may comprise a second coil. The second coil may be an 'OIS coil'. The second coil may move the bobbin. A second coil may be disposed in the base. A second coil may be disposed in the substrate. The second coil may face the magnet 3022. The second coil may interact electromagnetically with the magnet 3022. In this case, when a current is supplied to the second coil and a magnetic field is formed around the second coil, the magnet 3022 may move against the second coil due to electromagnetic interaction between the second coil and the magnet 3022. The second coil may move the housing and the bobbin in a direction perpendicular to the optical axis with respect to the base through electromagnetic interaction with the magnet 3022. The substrate may comprise a second coil. That is, the second coil may be a configuration of the substrate. The second coil may be formed as a fine pattern coil (FP coil) in a substrate separate from the substrate.

The second coil may comprise a plurality of coils. The second coil may comprise a number of coils corresponding to the magnet 3022. The second coil may comprise three coils. The second coil may comprise a second-first coil, a second-second coil, and a second-third coil. The second-first coil may face the first magnet. The second-second coil may face the second magnet. The second-third coil may face the third magnet.

The second lens driving device 3020 may comprise a cover member. The stator may comprise a cover member. The cover member may comprise a 'cover can'. The cover member may comprise a yoke. The cover member may be disposed outside the housing. The cover member may be coupled to the base. The cover member can accommodate the housing therein. The cover member may form the outer appearance of the second lens driving device 3020. The cover member may have a hexahedral shape with an open lower surface. The cover member may be a non-magnetic material. The cover member may be formed of a metal material. The cover member may be formed of a metal plate. The cover member may be connected to the ground portion of the printed circuit board 3030. Through this, the cover member may be grounded. The cover member may block electromagnetic interference (EMI). At this time, the cover member may be referred to as an 'EMI shield can'.

The cover member may comprise an upper plate and a lateral plate. The cover member may comprise an upper plate comprising a hole and a lateral plate being extended downward from an outer circumference or edge of the upper plate. The lower end of the lateral plate of the cover member may be disposed in a step of the base. An inner surface of the lateral plate of the cover member may be fixed to the base by an adhesive.

The lateral plate of the cover member may comprise a plurality of lateral plates. The lateral plate may comprise four lateral plates. The lateral plates of the cover member may comprise a first lateral plate and a second lateral plate being disposed at an opposite side to each other, and a third lateral plate and a fourth lateral plate being disposed at an opposite side to each other. The third lateral plate of the second lens driving device 3020 may face the third lateral plate 3342-3 of the first lens driving device 3010.

The second lens driving device 3020 may comprise a terminal. The stator may comprise a terminal. The terminals can be disposed in the base. The terminal may be electrically connected to a substrate. The terminal may be coupled to a support member. The terminal may electrically connect the support member and the substrate.

The second lens driving device 3020 may comprise an elastic member. The elastic member may be an 'AF support member'. The elastic member may have elasticity at least in part. The elastic member may be formed of metal. The elastic member may be formed of a conductive material. The elastic member may connect the bobbin and the housing. The elastic member may elastically connect the bobbin and the housing. The elastic member may be coupled to the bobbin and the housing. The elastic member may elastically support the bobbin. The elastic member may movably support the bobbin. The elastic member may support movement of the bobbin during AF driving.

The elastic member may comprise a first elastic member. The first elastic member may be an 'upper elastic member'. The first elastic member may connect the housing and the bobbin. The first elastic member may be coupled to an upper portion of the bobbin and an upper portion of the housing. The first elastic member may be coupled to an upper surface of the bobbin. The first elastic member may be coupled to an upper surface of the housing. The first elastic member may be coupled to the support member. The first elastic member may be formed as a leaf spring. The first elastic member may be separated and used as a power line for electrical or communication signal.

The first elastic member may comprise a plurality of elastic units. The first elastic member may comprise three elastic units. The first elastic member may comprise first to third elastic units. The first elastic unit may connect the support member and one end of the first-first coil. The second elastic unit may connect the other end of the first-first coil and one end of the first-second coil. The third elastic unit may connect the other end of the first-second coil to the support member. The first elastic member may be electrically connected to the first coil. The first elastic member may electrically connect the first coil and the support member.

The first elastic member may comprise an outer side portion. The outer side portion may be coupled to the housing. The outer side portion may be coupled to an upper surface of the housing. The outer side portion may comprise a hole or groove being coupled to a protrusion of the housing. The outer side portion may be fixed to the housing by an adhesive.

The first elastic member may comprise an inner side portion. The inner side portion may be coupled with the bobbin. The inner side portion may be coupled to an upper surface of the bobbin. The inner side portion may comprise a hole or groove being coupled to a protrusion of the bobbin. The inner side portion may be fixed to the bobbin by an adhesive.

The first elastic member may comprise a connecting portion. The connecting portion may connect an inner side portion and an outer side portion. The connecting portion may have elasticity. At this time, the connecting portion may be referred to as an 'elastic portion'. The connecting portion may comprise a shape bent two or more times.

The first elastic member may comprise a coupling portion. The coupling portion may be extended from an outer side portion. The coupling portion may be coupled to the support member. The coupling portion and the support member may be coupled by a solder.

The elastic member may comprise a second elastic member. The second elastic member may be a 'lower elastic member'. The second elastic member may be disposed below the first elastic member. The second elastic member may be disposed at one side of the first elastic member. The second elastic member may connect the housing and the bobbin. The second elastic member may be disposed below the bobbin. The second elastic member may be coupled to the bobbin and the housing. The second elastic member may be coupled to a lower surface of the bobbin. The second elastic member may be coupled to a lower surface of the housing. The second elastic member may be formed as a leaf spring. The second elastic member may be integrally formed.

The second elastic member may comprise an outer side portion. The outer side portion may be coupled to the housing. The outer side portion may be coupled to a lower surface of the housing. The outer side portion may comprise a hole or groove being coupled to the protrusion of the housing. The outer side portion may be fixed to the housing by an adhesive.

The second elastic member may comprise an inner side portion. The inner side portion may be coupled with the bobbin. The inner side portion may be coupled to a lower surface of the bobbin. The inner side portion may comprise a hole or groove being coupled to the protrusion of the bobbin. The inner side portion may be fixed to the bobbin by an adhesive.

The second elastic member may comprise a connecting portion. The connecting portion may connect an inner side portion and an outer side portion. The connecting portion may have elasticity. At this time, the connecting portion may be referred to as an 'elastic portion'. The connecting portion may comprise a shape bent two or more times.

The second lens driving device 3020 may comprise a support member. The support member may be an 'OIS support member'. The support member may connect the first elastic member to the substrate or the first elastic member to the terminal. The support member may be coupled to an upper surface of the first elastic member and the terminal. The support member may movably support the housing. The support member may elastically support the housing. The support member may have elasticity at least in part. The support member may elastically support the movement of the housing and the bobbin during OIS driving. One end of the support member may be coupled to the first elastic member by soldering. The other end of the support member may be coupled to the terminal by soldering.

The support member may comprise a plurality of wires. The support member may comprise four wires. The plurality of wires may comprise four wires connecting the three first elastic units 3410-1, 3410-2, and 3410-3 and the substrate. As a modified embodiment, the support member may be formed as a leaf spring.

The second lens driving device 3020 may comprise a first sensor. The first sensor may be disposed in the base. The first sensor may detect a sensing magnet. The first sensor may be disposed in the substrate. The first sensor may be coupled to a lower surface of the substrate. The first sensor may be spaced apart from the housing. The first sensor may be spaced apart from the bobbin. The first sensor may be overlapped with the sensing magnet in an optical axis direction. The first sensor may detect the position of the sensing magnet for AF feedback control. The first sensor may be a Hall IC, a Hall element, or a Hall sensor. The first sensor may detect the magnetic force of the sensing magnet.

The second lens driving device 3020 may comprise a second sensor. The second sensor may be disposed between the base and the substrate. The second sensor may detect the movement of the second mover. The second sensor may detect the movement of the housing and the magnet by detecting the magnetic force of the magnet. A detection value detected by the second sensor may be used for OIS feedback control. The second sensor may comprise a plurality of Hall sensors. The second sensor may comprise two Hall sensors. The second sensor may comprise a first Hall sensor for detecting the movement in an x-axis direction in the horizontal direction and a second Hall sensor for detecting the movement in a y-axis direction in the horizontal direction.

The second lens driving device 3020 may comprise a damper. The damper may be disposed in the support member. The damper may be disposed in the support member and the housing. The damper may be disposed in the elastic member. The damper may be disposed in the elastic member and/or the support member to prevent a resonance phenomenon generated in the elastic member and/or the support member.

Hereinafter, an optical device according to a first embodiment of present embodiment will be described with reference to drawings.

Figure 15:
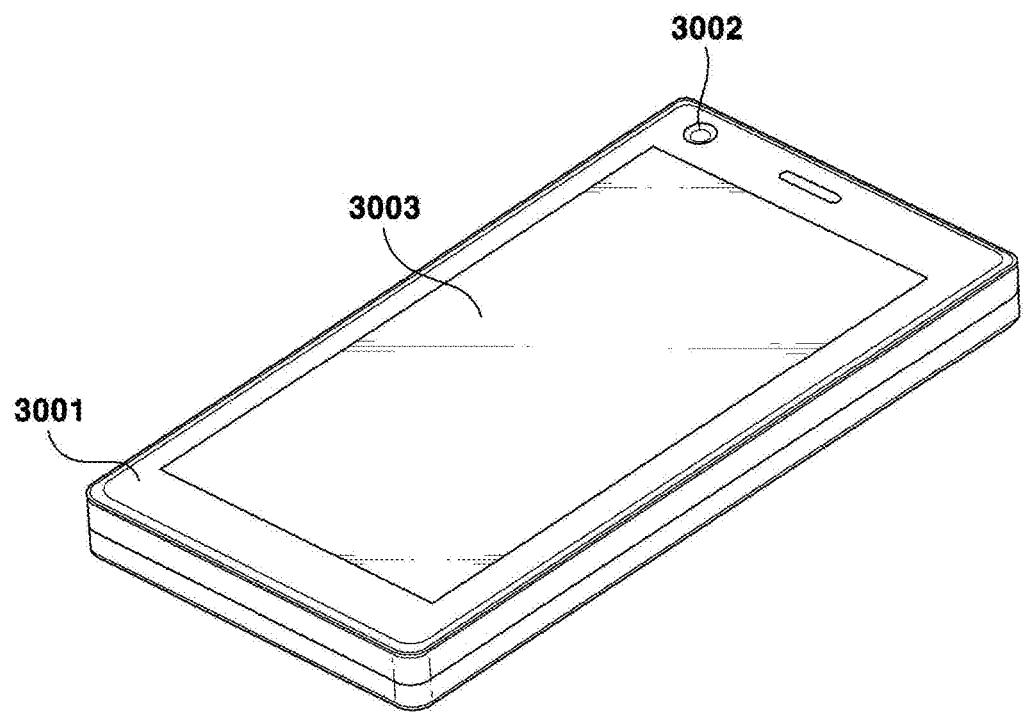
FIG. 15 is a perspective view of an optical device according to a first embodiment of the present embodiment.

FIG. 15 is a perspective view of an optical device according to a first embodiment of the present embodiment.

Optical devices comprise cell phones, portable phones, smart phones, portable communication devices, portable smart devices, portable terminals, digital cameras, computers, laptop computers, digital broadcasting terminals, personal digital assistants (PDAs), portable multimedia players (PMPs) and navigation. However, the type of optical device is not limited thereto, and any device for photographing a video or photo may be comprised in the optical device.

The optical device may comprise a main body 3001. The main body 1 may form the outer appearance of an optical device. The main body 3001 can accommodate the camera device 3002. A display 3003 may be disposed at a first surface of the main body 3001. For example, the display 3003 and the camera device 3002 are disposed at a first surface of the main body 3001, and a camera device 3002 may be additionally disposed at a second surface at an opposite side of the first surface of the main body 3001.

The optical device may comprise a camera device 3002. The camera device 3002 may be disposed in the main body 3001. At least a portion of the camera device 3002 may be accommodated inside the main body 3001. The camera device 3002 may be provided in plurality. The camera device 3002 may comprise dual, triple or more camera devices. The camera device 3002 may be disposed at each of the first surface of the main body 3001 and the second surface at an opposite side of the first surface of the main body 3001. The camera device 3002 may photograph an image and/or video of a subject.

The optical device may comprise a display 3003. The display 3003 may be disposed in the main body 3001. The display 3003 may be disposed at a first surface of the main body 3001. The display 3003 may output images and/or videos photographed by the camera device 3002.

Hereinafter, a configuration of a camera device according to a second embodiment of the present embodiment will be described with reference to the drawings.

Figure 16:
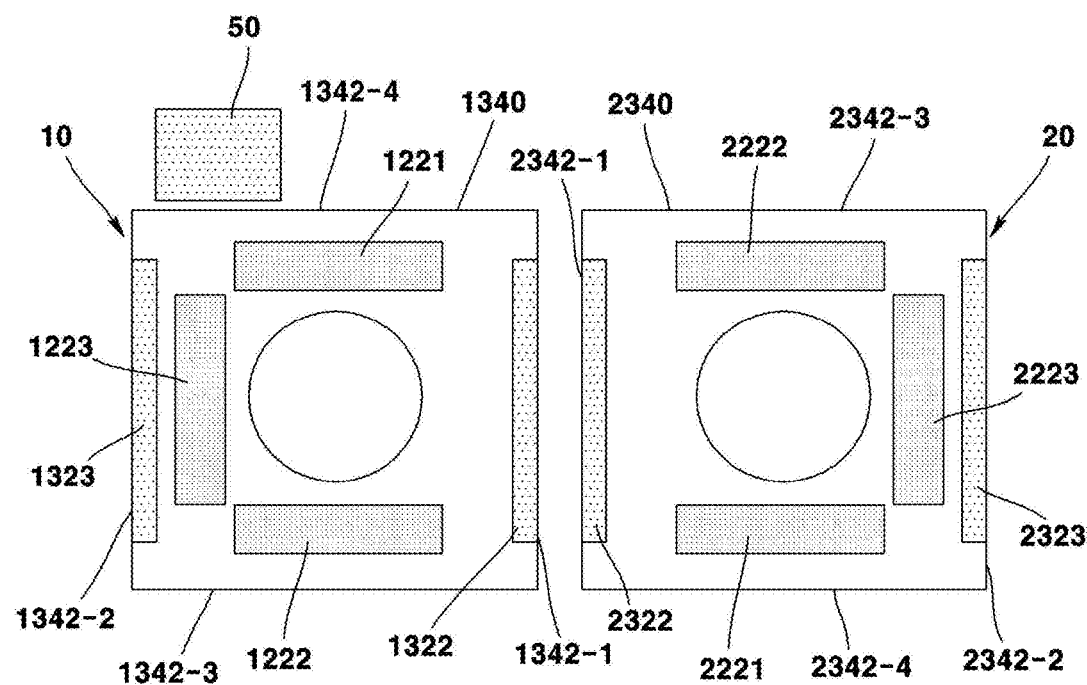
FIG. 16 is a schematic diagram of a camera device according to a second embodiment of the present embodiment.
Figure 17:
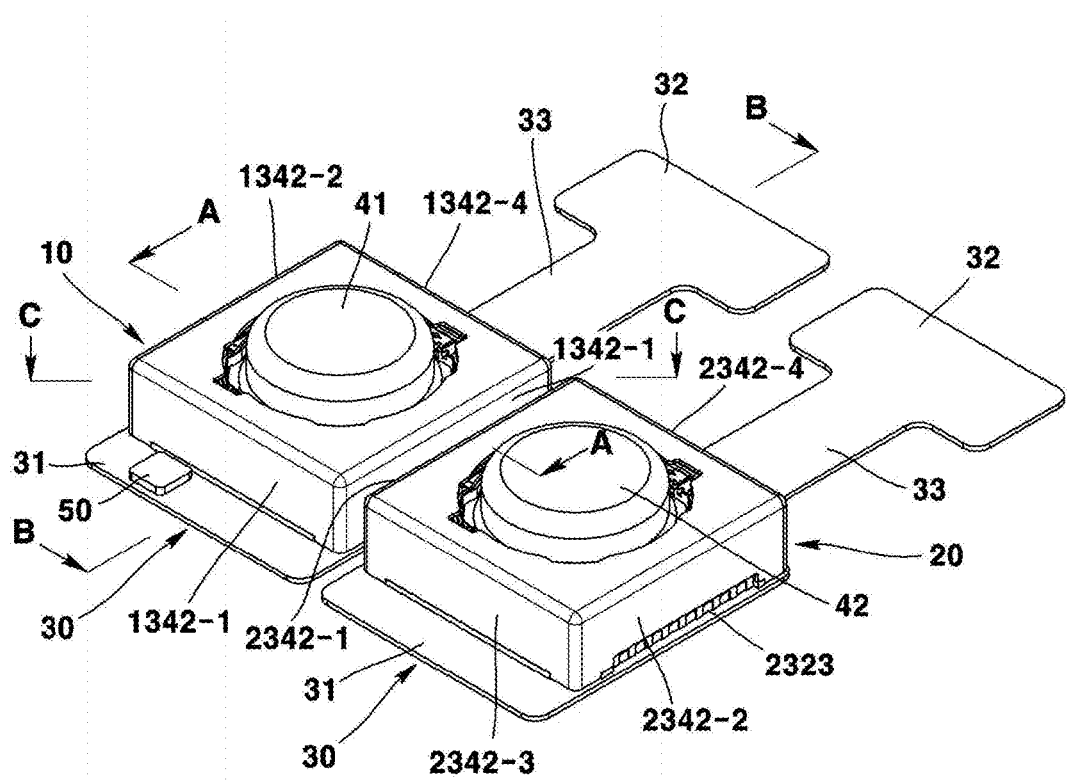
FIG. 17 is a perspective view of a camera device according to a second embodiment of the present embodiment.

FIG. 16 is a schematic diagram of a camera device according to a second embodiment of the present embodiment; and FIG. 17 is a perspective view of a camera device according to a second embodiment of the present embodiment.

The camera device 2 may comprise a camera module.

The camera device 2 may comprise a lens driving device. The camera device 2 may comprise a plurality of lens driving devices. The camera device 2 may comprise two lens driving devices. The camera device 2 may comprise a first and second lens driving devices 10 and 20. The camera device 2 may comprise a dual camera module. The camera device 2 may comprise three or more lens driving devices.

The camera device 2 may comprise a printed circuit board (PCB) 30. The printed circuit board 30 may be a substrate or circuit substrate. A lens driving device may be disposed in the printed circuit board 30. A first and second lens driving devices 10 and 20 may be disposed in the printed circuit board 30. A sensor base may be disposed between the printed circuit board 30 and the lens driving device 10. The printed circuit board 30 may be electrically connected to the lens driving device. The printed circuit board 30 may be electrically connected to the first and second lens driving devices 10 and 20. An image sensor may be disposed in the printed circuit board 30. A gyro sensor 50 may be disposed in the printed circuit board 30. The printed circuit board 30 may comprise various circuits, elements, control units, and the like in order to convert an image being formed on an image sensor into an electrical signal and transmit it to an external device.

The printed circuit board 30 may comprise: a first portion 21 in which a lens driving device is disposed; a second portion 22 in which a connector is disposed; and a third portion 23 connecting the first portion 21 and the second portion 22.

The camera device 2 may comprise a connector. The connector may be electrically connected to the printed circuit board 30. The connector may comprise a port for electrically connecting with an external device. The connector may be disposed in the third portion 33 of the printed circuit board 30.

The camera device 2 may comprise a lens module. The lens module may be coupled to the bobbin of the lens driving device. The lens module may be coupled to the bobbin by screw-coupling and/or an adhesive. The lens module may move integrally with the bobbin. The lens module may comprise a lens. The lens module may comprise a barrel and a plurality of lenses disposed inside the barrel. The lens may be disposed at a position corresponding to the image sensor. The lens may comprise a first lens 41 being coupled to the first lens driving device 10. The lens may comprise a second lens 42 being coupled to the second lens driving device 20.

The camera device 2 may comprise a filter. The filter may serve to block light of a specific frequency band among the light passing through the lens module from being incident on the image sensor. The filter may be disposed parallel to an x-y plane. The filter may be disposed between the lens module and the image sensor. A filter may be disposed in the sensor base. The filter may comprise an infrared filter. The infrared filter may block light in the infrared region from being incident on the image sensor. The infrared filter may comprise an infrared reflection filter or an infrared absorption filter.

The camera device 2 may comprise a sensor base. The sensor base may be disposed between the lens driving device and the printed circuit board 30. An opening may be formed in a portion of the sensor base where the filter is disposed so that light passing through the filter may be incident on the image sensor.

The camera device 2 may comprise an image sensor. The image sensor may be configured to form an image by incident light passing through a lens and a filter. The image sensor may be disposed on the printed circuit board 30. The image sensor may be mounted on the printed circuit board 30. The image sensor may be electrically connected to the printed circuit board 30. As an example, the image sensor may be coupled to the printed circuit board 30 by a surface mounting technology (SMT). As another example, the image sensor may be coupled to the printed circuit board 30 by a flip chip technology. The image sensor may be disposed such that an optical axis coincides with a lens. That is, the optical axis of the image sensor and the optical axis of the lens may be aligned. The image sensor may convert light irradiated onto an effective image area of the image sensor into an electrical signal. The image sensor may be any one of a charge coupled device (CCD), a metal oxide semiconductor (MOS), a CPD, and a CID.

The camera device 2 may comprise electronic components. The camera device 2 may comprise an electric element. The electronic component may be a gyro sensor 50. The camera device 2 may comprise a gyro sensor 50. The gyro sensor 50 may be disposed in the printed circuit board 30. The gyro sensor 50 may be disposed on an upper surface of the printed circuit board 30. The gyro sensor 50 may be disposed on a first surface of the printed circuit board 30.

In a second embodiment of the present embodiment, the first lateral plate 1342-1 of the first cover 1340 may be disposed to face the first lateral plate 2342-1 of the second cover 2340. A first substrate 1320 may comprise a terminal unit comprising terminals being coupled to the printed circuit board 30. The terminal unit of the first substrate 1320 may comprise a first terminal unit 1322 being disposed at a position corresponding to the first lateral plate 1342-1 of the first cover 1340. The terminal unit of the first substrate 1320 may comprise a second terminal unit 1322 being disposed at a position corresponding to the second lateral plate 1342-2 of the first cover 1340. At this time, the gyro sensor 50 may be disposed adjacent to the third lateral plate 1342-3 of the first cover 1340.

The gyro sensor 50 may be disposed to be spaced apart from the first lens driving device 10. The gyro sensor 50 may be disposed in contact with the first lens driving device 10. The gyro sensor 50 may be disposed spaced apart from the first cover 1340. The gyro sensor 50 may be disposed in contact with the first cover 1340. The gyro sensor 50 may be disposed to be closest to the third lateral plate 1342-3 among the first to fourth lateral plates 1342-1, 1342-2, 1342-3, and 1342-4 of the first cover 1340. The gyro sensor 50 may be disposed to be closer to the second lateral plate 1342-2 than to the first lateral plate 1342-1.

The body part 1321 of the first substrate 1320 may comprise: a first region in which the second-first coil 1331 is disposed; a second region in which the second-second coil 1332 is disposed; a third region in which the second-third coil 1333 is disposed; and a fourth region where the second coil 1330 is not disposed. The terminal unit of the first substrate 1320 may comprise a first terminal unit 1322 being extended from an edge of the fourth region of the body part 1321. The terminal unit of the first substrate 1320 may comprise a second terminal unit 1323 being extended from an edge of the third region of the body part 1321. The second-first coil 1331, the second-second coil 1332, and the second-third coil 1333 may be referred to as a first coil, a second coil, and a third coil.

An outer side surface of the first terminal unit 1322 may face the second lens driving device 20. The first terminal unit 1322 may be spaced apart from the second lens driving device 20. An outer side surface of the second terminal unit 1323 may not face the second lens driving device 20. The first terminal unit 1322 may be disposed closer to the second lens driving device 20 than the second terminal unit 1323.

The first base 1310 may comprise a first side surface being disposed at a position corresponding to the first lateral plate 1342-1 of the first cover 1340. The first terminal unit 1322 may be disposed on a first side surface of the first base 1310. The first base 1310 may comprise a second side surface being disposed at a position corresponding to the second lateral plate 1342-2 of the first cover 1340. The second side surface of the first base 1310 may be disposed at an opposite side of the first side surface of the first base 1310. The second terminal unit 1323 may be disposed on a second side surface of the first base 1310.

The terminal unit of the first substrate 1320 may comprise a second terminal unit 1323 being disposed at an opposite side of the first terminal unit 1322. The first terminal unit 1322 and the second terminal unit 1323 may be disposed at an opposite side to each other. The first terminal unit 1322 and the second terminal unit 1323 may be disposed at an opposite side to each other with respect to the first base 1310. The first terminal unit 1322 and the second terminal unit 1323 may be disposed at an opposite side to each other with respect to an optical axis of the first lens driving device 10.

The first terminal unit 1322 and the second terminal unit 1323 may be formed to have different sizes. The first terminal unit 1322 and the second terminal unit 1323 may be formed to have different widths. The first terminal unit 1322 and the second terminal unit 1323 may be formed in different shapes. The first terminal unit 1322 and the second terminal unit 1323 may comprise different numbers of terminals. Any one of the first terminal unit 1322 and the second terminal unit 1323 comprises 8 terminals and the other may comprise 7 terminals.

The first terminal unit 1322 and the second terminal unit 1323 may be formed to have the same size. The first terminal unit 1322 and the second terminal unit 1323 may be formed to have the same width. The first terminal unit 1322 and the second terminal unit 1323 may be formed in the same shape. The first terminal unit 1322 and the second terminal unit 1323 may comprise the same number of terminals. Each of the first terminal unit 1322 and the second terminal unit 1323 may comprise eight terminals.

In a second embodiment of the present embodiment, the first lateral plate 2342-1 of the second cover 2340 may be disposed to face the first lateral plate 1342-1 of the first cover 1340. The second substrate 2320 may comprise a terminal unit comprising terminals being coupled to the printed circuit board 30. The terminal unit of the second substrate 2320 may comprise a first terminal unit 2322 being disposed at a position corresponding to the first lateral plate 2342-1 of the second cover 2340. The terminal unit of the second substrate 2320 may comprise a second terminal unit 2322 being disposed at a position corresponding to the second lateral plate 2342-2 of the second cover 2340. At this time, the gyro sensor 50 may be disposed closer to the first lens driving device 10 than to the second lens driving device 20.

The body part 2321 of the second substrate 2320 may comprise: a first region in which the fourth-first coil 2331 is disposed; a second region in which the fourth-second coil 2332 is disposed; a third region in which the fourth-third coil 2333 is disposed; and a fourth region where the fourth coil 2330 is not disposed. The terminal unit of the second substrate 2320 may comprise a first terminal unit 2322 being extended from an edge of the fourth region of the body part 2321. The terminal unit of the second substrate 2320 may comprise a second terminal unit 2323 being extended from an edge of a third region of the body part 2321. The fourth-first coil 4331, fourth-second coil 4332, and fourth-third coil 4333 may be referred to as a first coil, a second coil, and a third coil.

An outer surface of the first terminal unit 2322 may face the first lens driving device 10. The first terminal unit 2322 may be spaced apart from the first lens driving device 10. An outer side surface of the second terminal unit 2323 may not face the first lens driving device 10. The first terminal unit 2322 may be disposed closer to the first lens driving device 10 than the second terminal unit 2323.

The second base 2310 may comprise a first side surface being disposed at a position corresponding to the first lateral plate 1342-1 of the second cover 2340. The first terminal unit 2322 may be disposed on a first side surface of the second base 2310. The second base 2310 may comprise a second side surface being disposed at a position corresponding to the second lateral plate 1342-2 of the second cover 2340. The second side surface of the second base 2310 may be disposed at an opposite side of the first side surface of the second base 2310. The second terminal unit 2323 may be disposed on a second side surface of the second base 2310.

The terminal unit of the second substrate 2320 may comprise a second terminal unit 2323 being disposed at an opposite side of the first terminal unit 2322. The first terminal unit 2322 and the second terminal unit 2323 may be disposed at an opposite side to each other. The first terminal unit 2322 and the second terminal unit 2323 may be disposed at an opposite side to each other with respect to the second base 2310. The first terminal unit 2322 and the second terminal unit 2323 may be disposed at an opposite side to each other with respect to an optical axis of the second lens driving device 20.

The first terminal unit 2322 and the second terminal unit 2323 may be formed in different sizes. The first terminal unit 2322 and the second terminal unit 2323 may be formed to have different widths. The first terminal unit 2322 and the second terminal unit 2323 may be formed in different shapes. The first terminal unit 2322 and the second terminal unit 2323 may comprise different numbers of terminals. Any one of the first terminal unit 2322 and the second terminal unit 2323 comprises 8 terminals and the other may comprise 7 terminals.

The first terminal unit 2322 and the second terminal unit 2323 may be formed to have the same size. The first terminal unit 2322 and the second terminal unit 2323 may be formed to have the same width. The first terminal unit 2322 and the second terminal unit 2323 may be formed in the same shape. The first terminal unit 2322 and the second terminal unit 2323 may comprise the same number of terminals. Each of the first terminal unit 2322 and the second terminal unit 2323 may comprise eight terminals.

The second substrate 2320 may comprise a first terminal unit 2322 being disposed to face the first terminal unit 1322 of the first substrate 1320. The second substrate 2320 may comprise a second terminal unit 2323 being disposed at an opposite side of the first terminal unit 2322 of the second substrate 2320.

Hereinafter, a configuration of a first lens driving device according to a second embodiment of present embodiment will be described with reference to drawings.

Figure 18:
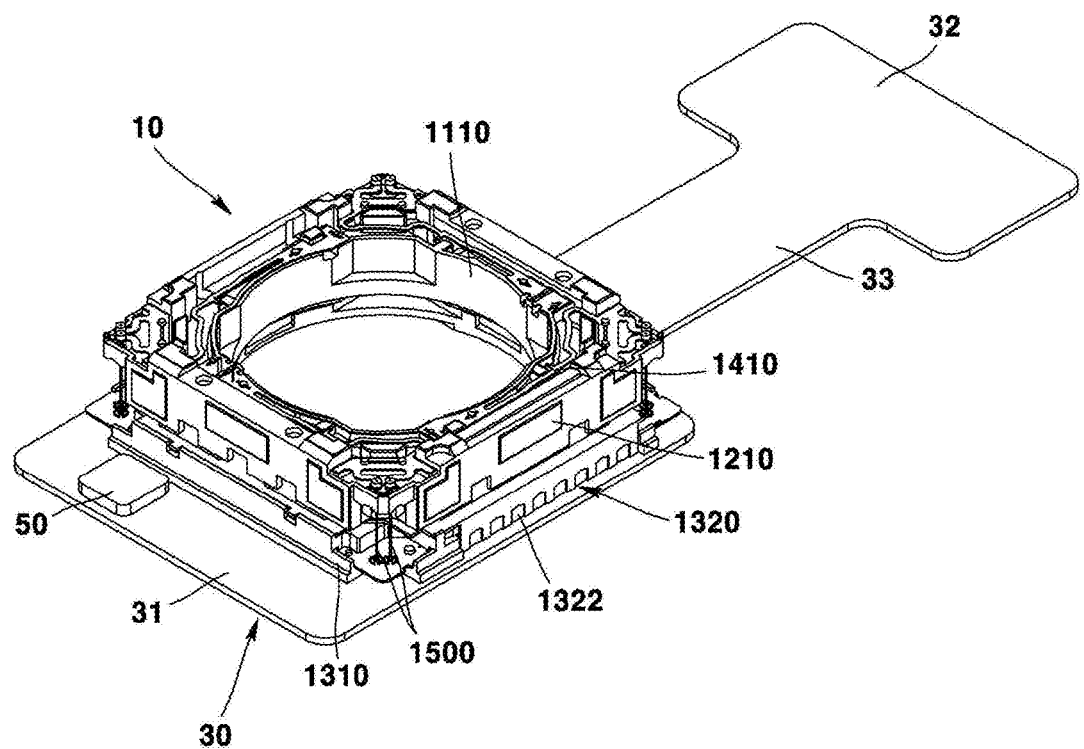
FIG. 18 is a perspective view of a part of a camera device according to a second embodiment of the present embodiment.
Figure 19:
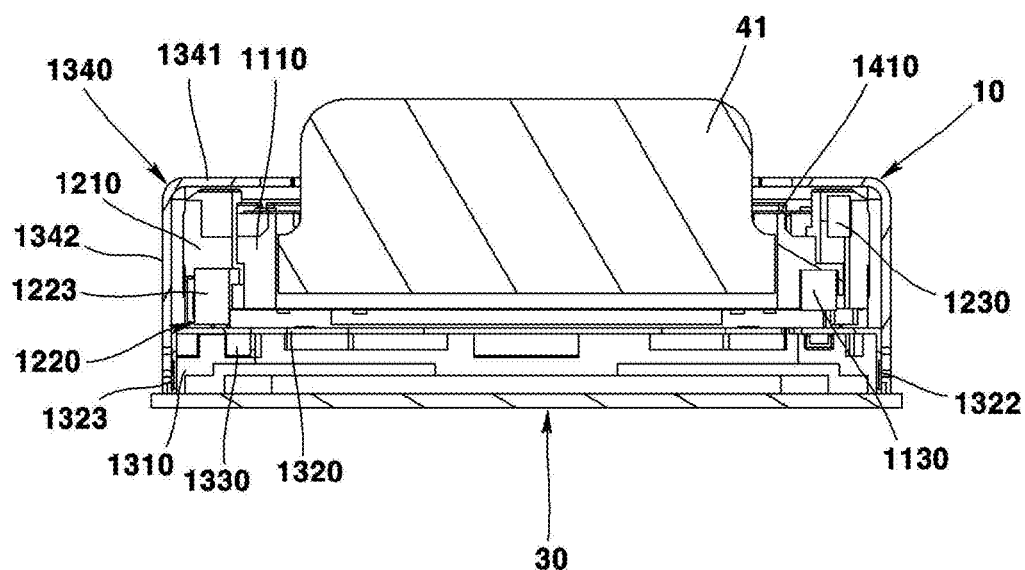
FIG. 19 is a cross-sectional view viewed from A-A in FIG. 2.
Figure 20:
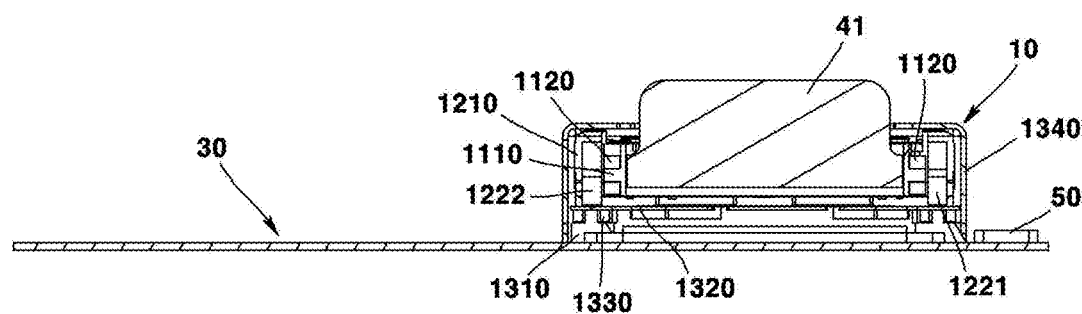
FIG. 20 is a cross-sectional view viewed from line B-B in FIG. 2.
Figure 21:
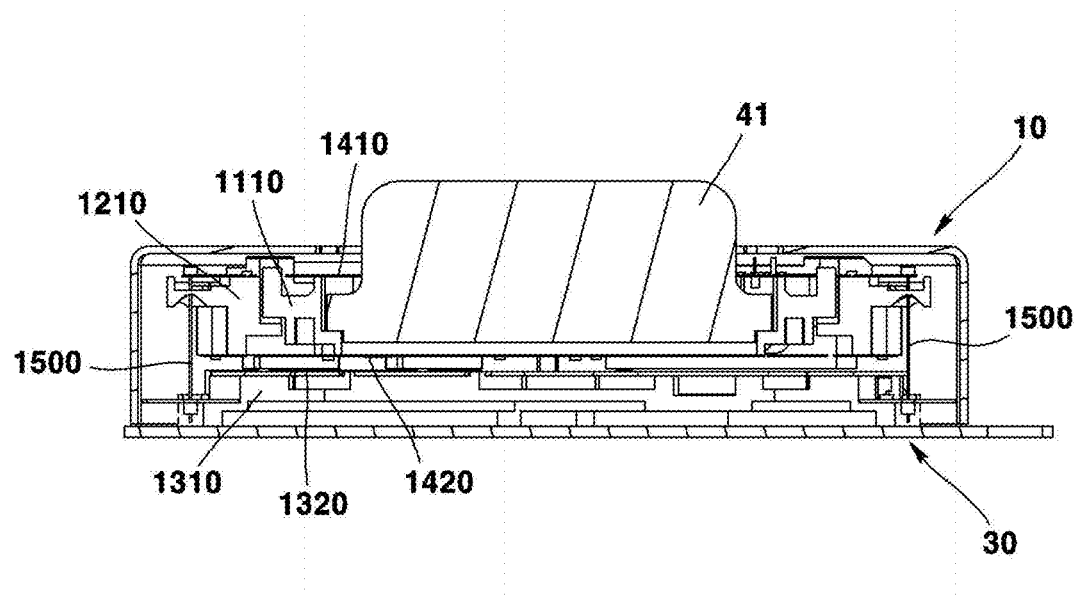
FIG. 21 is a cross-sectional view viewed from C-C in FIG. 2.
Figure 22:
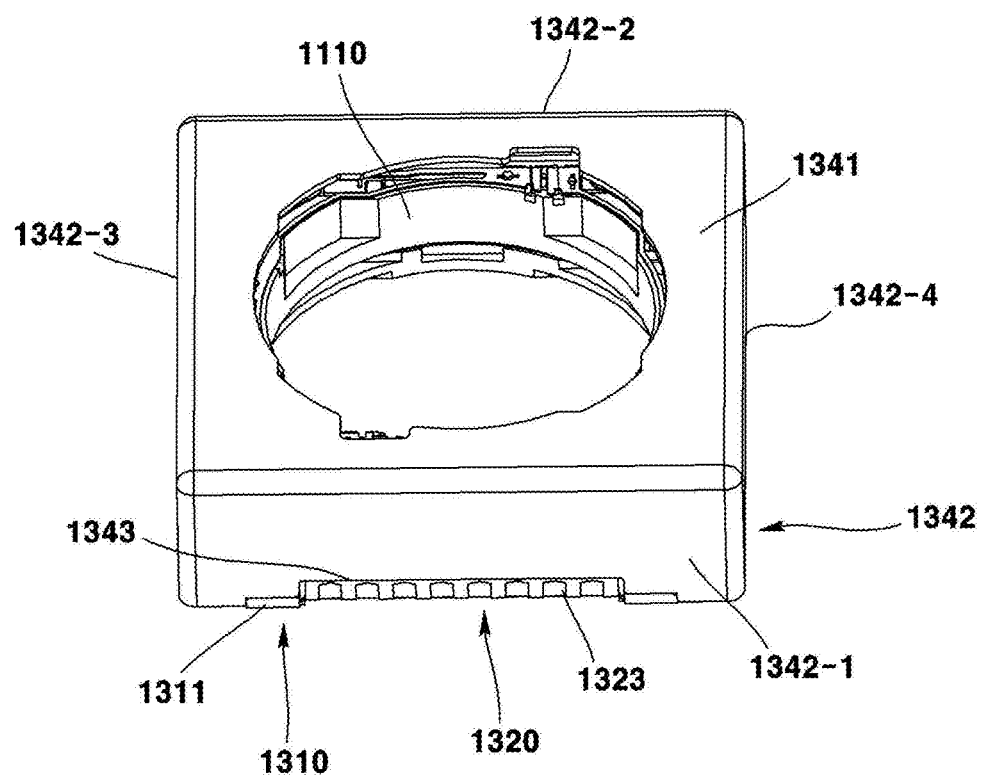
FIG. 22 is a perspective view of a first lens driving device according to a second embodiment of present embodiment.
Figure 23:
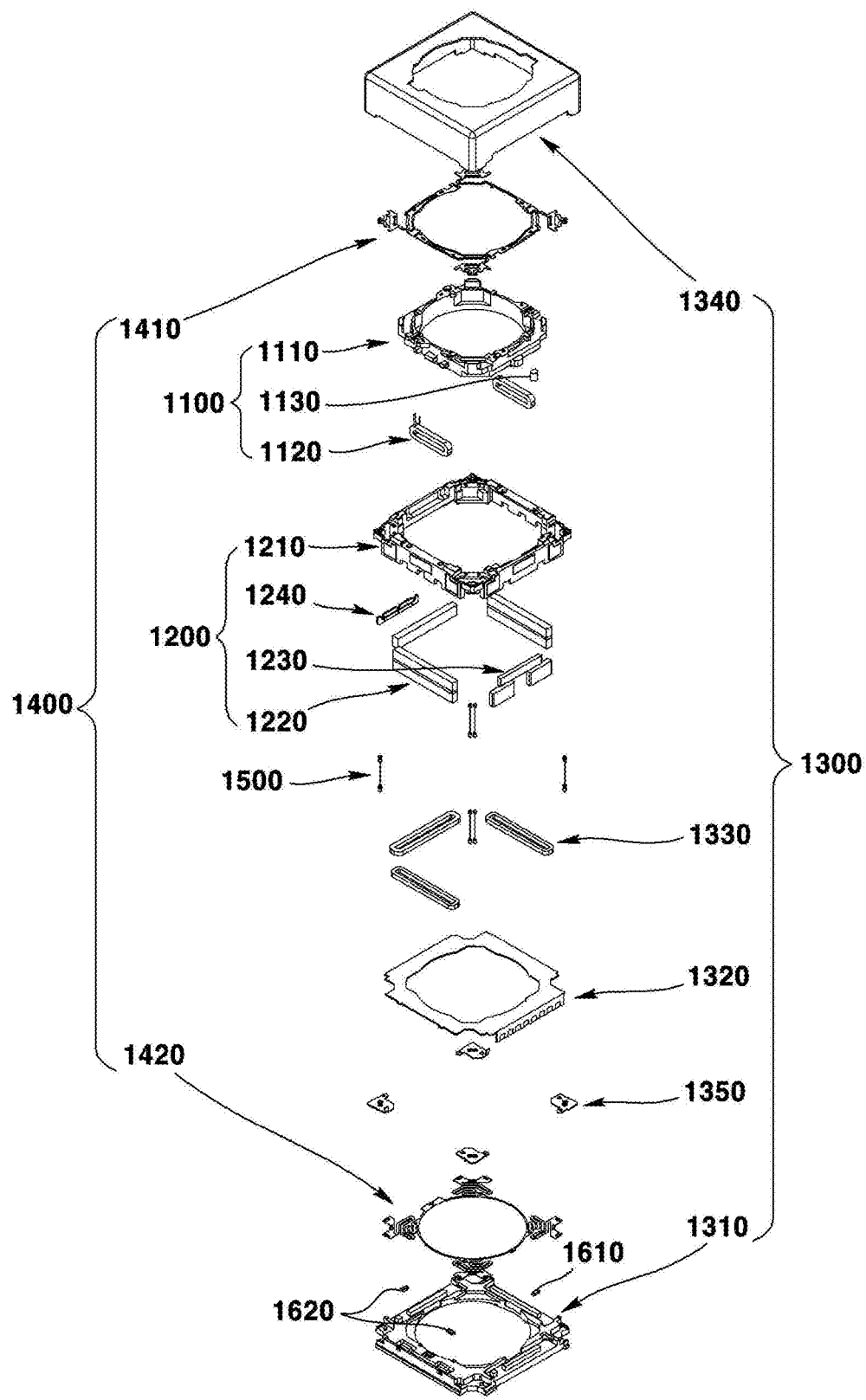
FIG. 23 is an exploded perspective view of a first lens driving device according to a second embodiment of present embodiment.
Figure 24:
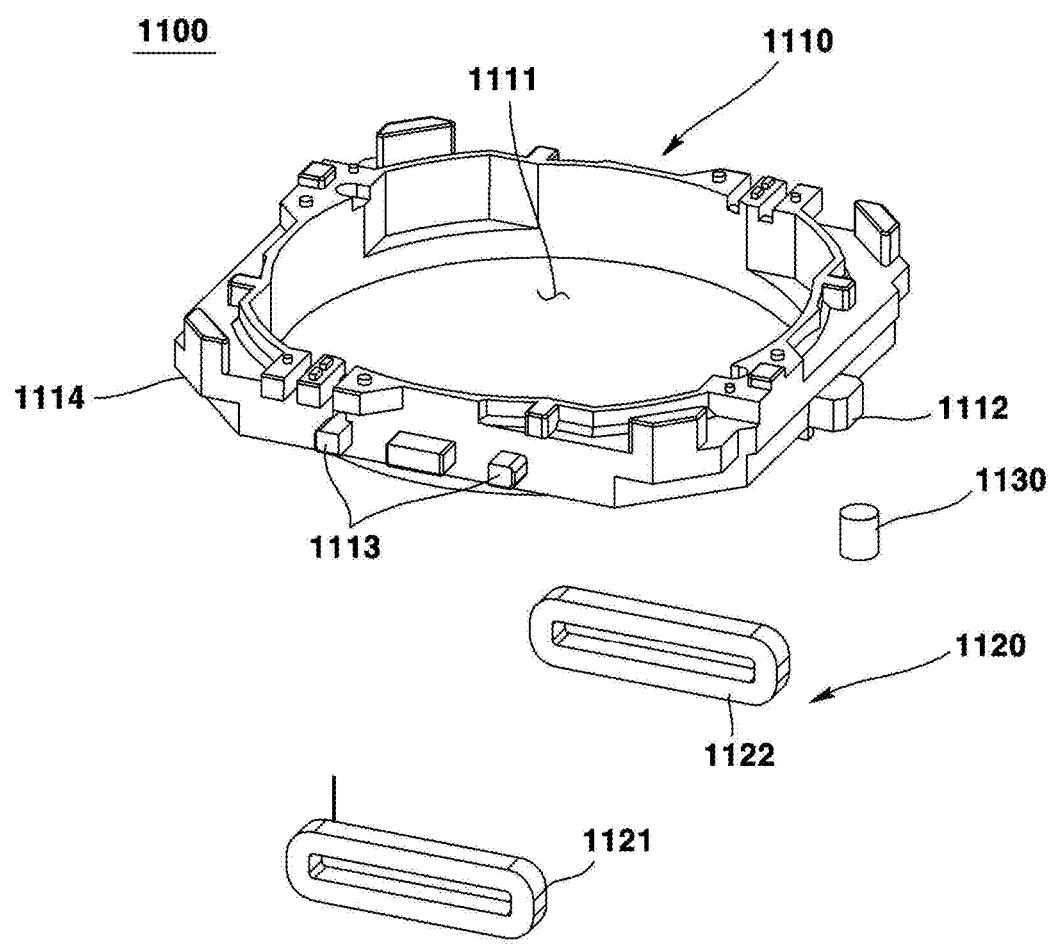
FIG. 24 is an exploded perspective view of a first mover of a first lens driving device according to a second embodiment of present embodiment.
Figure 25:
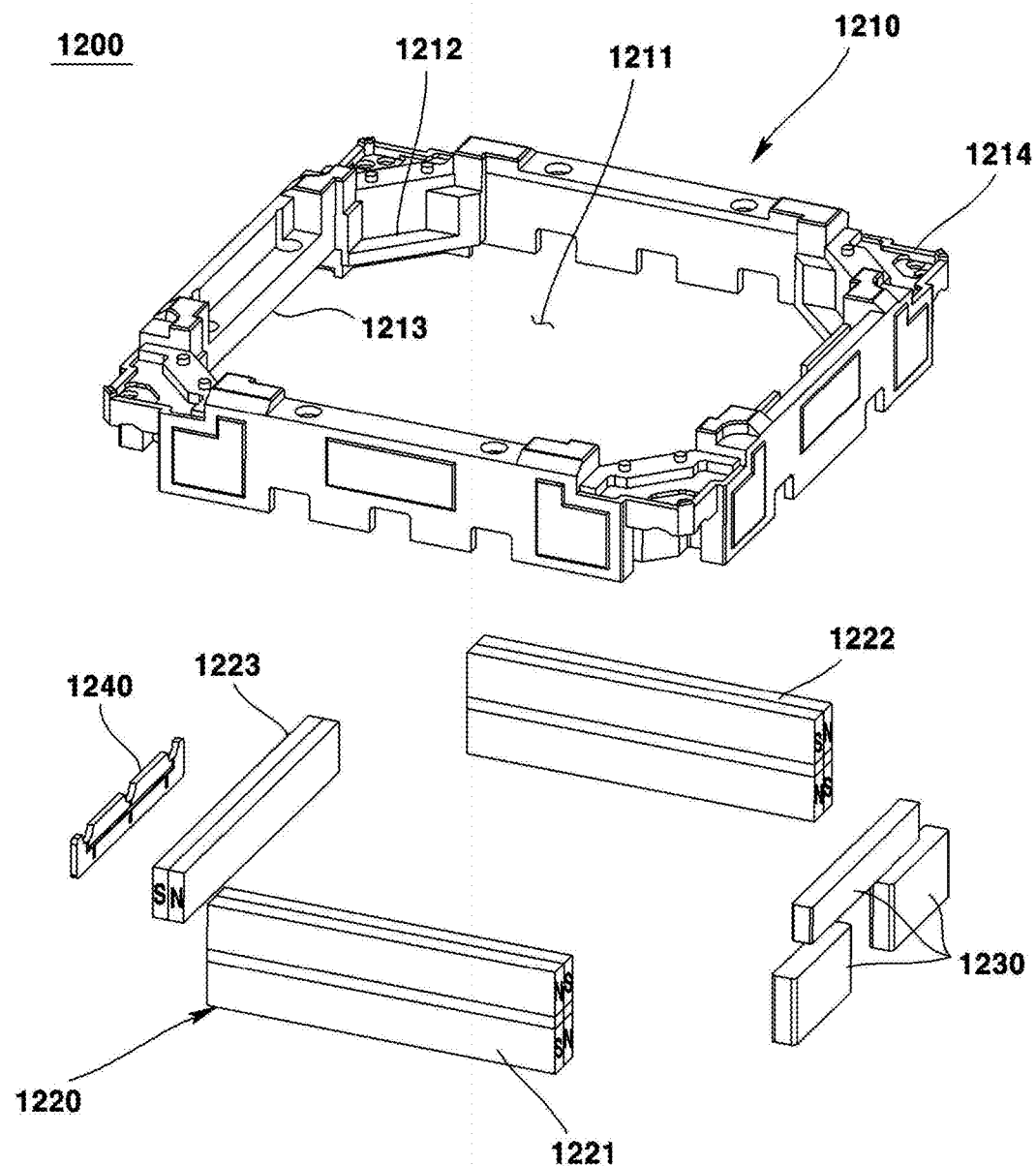
FIG. 25 is an exploded perspective view of a second mover of a first lens driving device according to a second embodiment of present embodiment.
Figure 26:
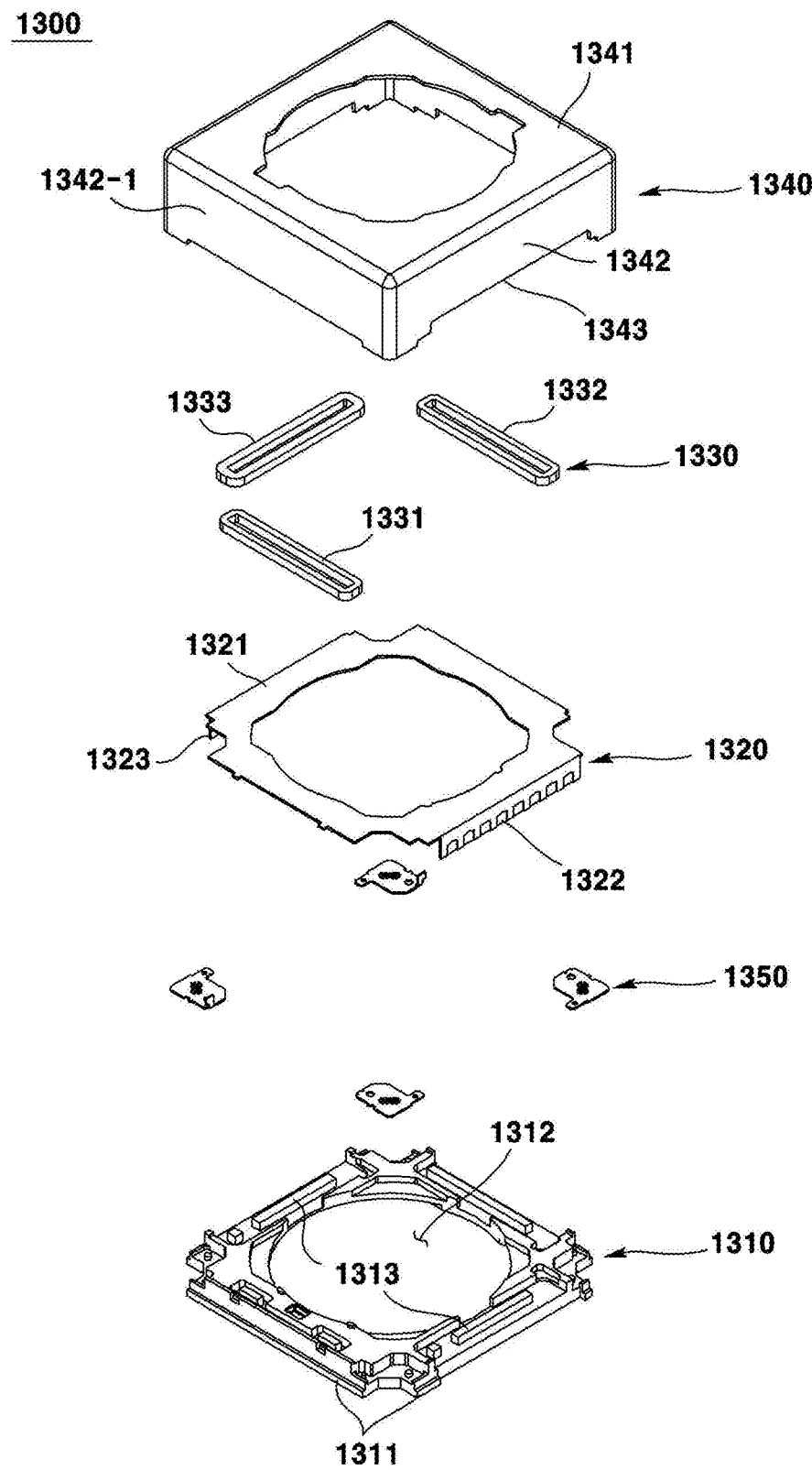
FIG. 26 is an exploded perspective view of a stator of a first lens driving device according to a second embodiment of present embodiment.
Figure 27:
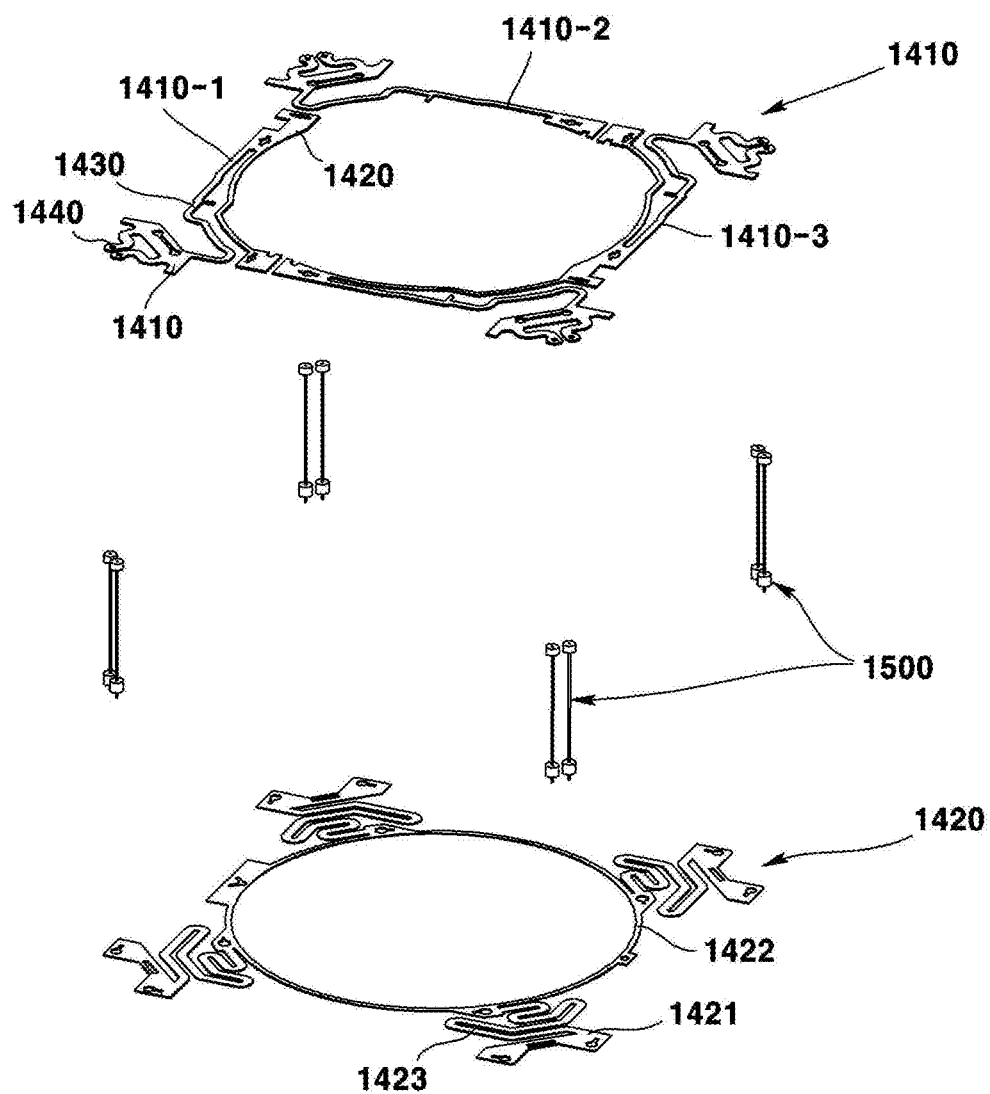
FIG. 27 is an exploded perspective view of an elastic member and a support member of a first lens driving device according to a second embodiment of the present embodiment.

FIG. 18 is a perspective view of a part of a camera device according to a second embodiment of the present embodiment; FIG. 19 is a cross-sectional view viewed from A-A in FIG. 2; FIG. 20 is a cross-sectional view viewed from line B-B in FIG. 2; FIG. 21 is a cross-sectional view viewed from C-C in FIG. 2; FIG. 22 is a perspective view of a first lens driving device according to a second embodiment of present embodiment; FIG. 23 is an exploded perspective view of a first lens driving device according to a second embodiment of present embodiment; FIG. 24 is an exploded perspective view of a first mover of a first lens driving device according to a second embodiment of present embodiment; FIG. 25 is an exploded perspective view of a second mover of a first lens driving device according to a second embodiment of present embodiment; FIG. 26 is an exploded perspective view of a stator of a first lens driving device according to a second embodiment of present embodiment; and FIG. 27 is an exploded perspective view of an elastic member and a support member of a first lens driving device according to a second embodiment of the present embodiment.

The camera device 2 may comprise a first lens driving device 10. The first lens driving device 10 may be a voice coil motor (VCM). The first lens driving device 10 may be a lens driving motor. The first lens driving device 10 may be a lens driving actuator. The first lens driving device 10 may comprise an AF module. The first lens driving device 10 may comprise an OIS module. The first lens driving device 10 may be disposed on the printed circuit board 30. The first lens driving device 10 may be disposed on a first surface of the printed circuit board 30. At this time, the first surface may be an upper surface.

The first lens driving device 10 may comprise a first mover 1100. The first mover 1100 may be coupled to the first lens 41. The first mover 1100 may be connected to the second mover 1200 through the first elastic member 1410 and/or the second elastic member 1420. The first mover 1100 may move through interaction with the second mover 1200. At this time, the first mover 1100 can move integrally with the first lens 41. Meanwhile, the first mover 1100 may move during AF driving. At this time, the first mover 1100 may be referred to as an 'AF mover'. However, the first mover 1100 can move together with the second mover 1200 even during OIS driving.

The first lens driving device 10 may comprise a first bobbin 1110. The first mover 1100 may comprise a first bobbin 1110. The first bobbin 1110 may be disposed inside the first housing 1210. The first bobbin 1110 may be disposed in the hole 1211 of the first housing 1210. The first bobbin 1110 may be movably coupled to the first housing 1210. The first bobbin 1110 may move in an optical axis direction against the first housing 1210. The first lens 41 may be coupled to the first bobbin 1110. The first bobbin 1110 and the first lens 41 may be coupled by screw-coupling and/or an adhesive. The first coil 1120 may be coupled to the first bobbin 1110. A first elastic member 1410 may be coupled to an upper portion or an upper surface of the first bobbin 1110. A second elastic member 1420 may be coupled to a lower portion or a lower surface of the first bobbin 1110. The first bobbin 1110 may be coupled to the first elastic member 1410 and/or the second elastic member 1420 by thermal fusion and/or an adhesive. The adhesive coupling the first bobbin 1110 and the first lens 41 and the first bobbin 1110 and the elastic member 1400 may be an epoxy being cured by any one or more among ultraviolet (UV), heat and laser.

The first bobbin 1110 may comprise a hole 1111. The hole 1111 may be hollow. The hole 1111 may penetrate through the first bobbin 1110 in an optical axis direction. The first lens 41 may be accommodated in the hole 1111. For an example, a screw thread corresponding to a screw thread being formed on an outer circumferential surface of the first lens 41 may be disposed on an inner circumferential surface of the hole 1111 of the first bobbin 1110.

The first bobbin 1110 may comprise a groove 1112. The groove 1112 may be a sensing magnet accommodating groove. The groove 1112 may be a recess. A sensing magnet 1130 may be disposed in the groove 1112. The groove 1112 of the first bobbin 1110 may be formed on an outer circumferential surface of the first bobbin 1110. At least a portion of the groove 1112 of the first bobbin 1110 may be formed to correspond to the shape and size of the sensing magnet 1130. The groove 1112 may open downward.

The first bobbin 1110 may comprise a protrusion 1113. A first coil 1120 may be disposed at the protrusion 1113. The protrusion 1113 may be formed on an outer circumferential surface of the first bobbin 1110. The protrusion 1113 may be protruded from an outer circumferential surface of the first bobbin 1110. The first coil 1120 may be wound and fixed to the protrusion 1113.

The first bobbin 1110 may comprise a lower stopper 1114. A downward stroke of the first bobbin 1110 may be restricted through the lower stopper 1114. The lower stopper 1114 may be formed on an outer circumferential surface of the first bobbin 1110. The lower stopper 1114 may be in contact with the first housing 1210 when the first bobbin 1110 moves downward.

The first lens driving device 10 may comprise a first coil 1120. The first mover 1100 may comprise a first coil 1120. The first coil 1120 may be an 'AF driving coil' used for AF driving. The first coil 1120 may be disposed in the first bobbin 1110. The first coil 1120 may move the first bobbin 1110. The first coil 1120 may be disposed between the first bobbin 1110 and the first housing 1210. The first coil 1120 may be disposed on an outer lateral surface or an outer circumferential surface of the first bobbin 1110. The first coil 1120 may be directly wound around the first bobbin 1110. Or, the first coil 1120 may be coupled to the first bobbin 1110 in a directly wound state. The first coil 1120 may face the first magnet 1220. The first coil 1120 may be disposed to face the first magnet 1220. The first coil 1120 may interact with the first magnet 1220 electromagnetically. In this case, when a current is supplied to the first coil 1120 and an electromagnetic field is formed around the first coil 1120, the first coil 1120 may move against the first magnet 1220 by the electromagnetic interaction between the first coil 1120 and the first magnet 1220.

The first coil 1120 may comprise a plurality of coils. The first coil 1120 may comprise two coils. The first coil 1120 may comprise a first-first and first-second coils 1121 and 1122. The first-first coil 1121 may be disposed at a position corresponding to the third lateral plate 1342-3 of the first cover 1340. The first-first coil 1121 may be disposed to face the third lateral plate 1342-3 of the first cover 1340. The first-second coil 1122 may be disposed at a position corresponding to the fourth lateral plate 1342-4 of the first cover 1340. The first-second coil 1122 may be disposed to face the fourth lateral plate 1342-4 of the first cover 1340.

In the second embodiment of the present embodiment, the first coil 1120 and the first magnet 1220 may move the first bobbin 1110 against first housing 1210 in an optical axis direction. The first coil 1120 and the first magnet 1220 may move the first bobbin 1110 in an optical axis direction through electromagnetic interaction. The first coil 1120 and the first magnet 1220 may be used for AF driving.

The first lens driving device 10 may comprise a coil. The coil may move the first bobbin 1110. The coil may comprise a first coil 1120 that moves the first bobbin 1110 in an optical axis direction and a second coil 1330 that moves the first bobbin 1110 in a direction perpendicular to the optical axis direction.

The first lens driving device 10 may comprise a sensing magnet 1130. The first mover 1100 may comprise a sensing magnet 1130. The sensing magnet 1130 may be disposed in the first bobbin 1110. The sensing magnet 1130 may be detected through the first sensor 1610. In addition, the first lens driving device 10 may comprise a compensation magnet. The first mover 1100 may comprise a compensation magnet. The compensation magnet may be disposed to achieve magnetic force balance with the sensing magnet 1130. The compensation magnet may have a weight corresponding to that of the sensing magnet 1130. The compensation magnet may be disposed symmetrically with the sensing magnet 1130 with respect to an optical axis.

The first lens driving device 10 may comprise a second mover 1200. The second mover 1200 may be movably coupled to the stator 1300 through the support member 1500. The second mover 1200 may support the first mover 1100 through the first and second elastic members 1410 and 1420. The second mover 1200 may move the first mover 1100 or may move together with the first mover 1100. The second mover 1200 may move through interaction with the stator 1300. The second mover 1200 may move during OIS driving. At this time, the second mover 1200 may be referred to as an 'OIS mover'. The second mover 1200 may move integrally with the first mover 1100 during OIS driving.

The first lens driving device 10 may comprise a first housing 1210. The second mover 1200 may comprise a first housing 1210. The first housing 1210 may be spaced apart from the first base 1310. The first housing 1210 may be disposed outside the first bobbin 1110. The first housing 1210 may accommodate at least a portion of the first bobbin 1110. The first housing 1210 may be disposed inside the first cover 1340. The first housing 1210 may be disposed between the first cover 1340 and the first bobbin 1110. The first housing 1210 may be formed of a material different from that of the first cover 1340. The first housing 1210 may be formed of an insulating material. The first housing 1210 may be formed of an injection-molded material. An outer side surface of the first housing 1210 may be spaced apart from an inner surface of the lateral plate 1342 of the first cover 1340. The first housing 1210 may move for OIS driving through the separation space between the first housing 1210 and the first cover 1340. A first magnet 1220 may be disposed in the first housing 1210. The first housing 1210 and the first magnet 1220 may be coupled by an adhesive. A first elastic member 1410 may be coupled to an upper portion or an upper surface of the first housing 1210. A second elastic member 1420 may be coupled to a lower portion or lower surface of the first housing 1210. The first housing 1210 may be coupled to an upper portion and the second elastic members 1410 and 1420 by thermal fusion and/or an adhesive. The adhesive that couples the first housing 1210 and the first magnet 1220 and the first housing 1210 and the elastic member 1400 may be an epoxy cured by any one or more among ultraviolet (UV), heat and laser.

The first housing 1210 may comprise four side portions and four corner portions being disposed between the four side portions. The side portion of the first housing 1210 may comprise: a first side portion; a second side portion being disposed at an opposite side of the first side portion; a third side portion and a fourth side portion being disposed at an opposite side to each other between the first side portion and the second side portion. The corner portion of the first housing 1210 may comprise: a first corner portion being disposed between a first side portion and a third side portion; a second corner portion being disposed between a first side portion and a fourth side portion; a third corner portion being disposed between a second side portion and a third side portion; and a fourth corner portion being disposed between a second side portion and a fourth side portion. The side portion of the first housing 1210 may comprise a 'lateral wall'. The first side portion of the first housing 1210 may be disposed at a position corresponding to the first lateral plate 1342-1 of the first cover 1340. The second side portion of the first housing 1210 may be disposed at a position corresponding to the second lateral plate 1342-2 of the first cover 1340. The third side portion of the first housing 1210 may be disposed at a position corresponding to the third lateral plate 1342-3 of the first cover 1340. The fourth side portion of the first housing 1210 may be disposed at a position corresponding to the fourth lateral plate 1342-4 of the first cover 1340.

The first housing 1210 may comprise a hole 1211. The hole 1211 may be hollow. The hole 1211 may be formed in the first housing 1210. The hole 1211 may be formed to penetrates through the first housing 1210 in an optical axis direction. A first bobbin 1110 may be disposed in the hole 1211. At least a portion of the hole 1211 may be formed in a shape corresponding to that of the first bobbin 1110. An inner circumferential surface or an inner lateral surface of the first housing 1210 forming the hole 1211 may be spaced apart from an outer circumferential surface of the first bobbin 1110. However, at least a portion of the first housing 1210 and the first bobbin 1110 be overlapped in an optical axis direction, so that the moving stroke distance of the first bobbin 1110 in an optical axis direction may be restricted.

The first housing 1210 may comprise a groove 1212. The groove 1212 may accommodate at least a portion of the lower stopper 1114 of the first bobbin 1110. The bottom surface of the groove 1212 may be overlapped with the lower stopper 1114 of the first bobbin 1110 in an optical axis direction. When the first bobbin 1110 moves downward, the lower stopper 1114 of the first bobbin 1110 may come into contact with the bottom surface of the groove 1212 of the first housing 1210.

The first housing 1210 may comprise a hole 1213. The hole 1213 may be a magnet accommodating groove. A first magnet 1220 may be coupled to the groove 1213. The groove 1213 may be formed as a portion of an inner circumferential surface and/or a lower surface of the first housing 1210 is being recessed. The groove 1213 may be formed in each of the three side portions of the first housing 1210. The groove 1213 may be formed in a second, third, and fourth side portions of the first housing 1210. The groove 1213 may be formed in a shape corresponding to the first side portion of the first housing 1210, but a dummy member 1230 other than the first magnet 1220 may be disposed in the groove 1213 being formed in a first side portion of the first housing 1210.

The first housing 1210 may comprise a hole 1214. The hole 1214 may be a support member through hole. The hole 1214 may be formed in a corner portion of the first housing 1210. The hole 1214 may be formed to penetrate through the first housing 1210 in an optical axis direction. A support member 1500 may be disposed in the hole 1214 of the first housing 1210. The support member 1500 may pass through the hole 1214 of the first housing 1210.

The first lens driving device 10 may comprise a first magnet 1220. The second mover 1200 may comprise a first magnet 1220. The first magnet 1220 may be disposed in the first housing 1210. The first magnet 1220 may be disposed inside the first cover 1340. The first magnet 1220 may be fixed to the first housing 1210 by an adhesive. The first magnet 1220 may be disposed between the first bobbin 1110 and the first housing 1210. The first magnet 1220 may face the first coil 1120. The first magnet 1220 may interact with the first coil 1120 electromagnetically. The first magnet 1220 may move the first bobbin 1110 in an optical axis direction through interaction with the first coil 1120. The first magnet 1220 may be used for AF driving. The first magnet 1220 may face the second coil 1330. The first magnet 1220 may interact with the second coil 1330 electromagnetically. The first magnet 1220 may move the first bobbin 1110 and the first housing 1210 in a direction perpendicular to the optical axis direction through interaction with the second coil 1330. The first magnet 1220 may be used for OIS driving. The first magnet 1220 may be disposed in a plurality of side portions of the first housing 1210. The first magnet 1220 may be a flat magnet having a flat plate shape.

The first magnet 1220 may not be disposed between the first bobbin 1110 and the first lateral plate 1342-1 of the first cover 1340. Through this, magnetic field interference of the first magnet 1220 affecting the second lens driving device 20 can be minimized.

The first magnet 1220 may comprise a plurality of magnets. The first magnet 1220 may comprise three magnets. The first magnet 1220 may comprise first-first to first-third magnets 1221, 1222, and 1223. The first-first magnet 1221 may be disposed in a third side portion of the first housing 1210. The first-second magnet 1221 may be disposed in a fourth side portion of the first housing 1210. The first to third magnets 1221 may be disposed in a second side portion of the first housing 1210. A dummy member 1230 may be disposed in a first side portion of the first housing 1210.

The first-first magnet 1221 may face the first-first coil 1121. The first-second magnet 1222 may face the first-second coil 1122. The first-first and first-second magnets 1221 and 1222 may be used during AF driving. The first magnet 1220 comprises a first-first magnet 1221 being disposed at a position corresponding to the third lateral plate 1342-3 of the first cover 1340 and the fourth lateral plate 1342-4. The first-second magnet 1222 being disposed at a corresponding position and first to third magnets 1223 being disposed at a position corresponding to the second lateral plate 1342-2 may be comprised.

The first-first magnet 1221 may face the second-first coil 1331. The first-second magnet 1222 may face the second-second coil 1332. The first-first and first-second magnets 1221 and 1222 may be used when driving in an OIS-x-axis direction. The first-third magnet 1223 may face the second-third coil 1333. The first-third magnet 1223 may be used when driving in an OIS-y-axis direction. The area of the lower surface of the first-third magnet 1223 may be larger than the area of the lower surface of each of the first-first magnet 1221 and the first-second magnet 1222.

The first-first magnet 1221 and the first-second magnet 1222 may be 4-pole magnetized magnets. The first-first magnet 1221 and the first-second magnet 1222 may be 4-pole magnets. The 4-pole magnetized magnet may comprise a neutral portion being disposed horizontally in the central portion. Here, the neutral portion may be a void. The first-first magnet 1221 and the first-second magnet 1222 may be 2-pole magnetized. As the first-first magnet 1221 and the first-second magnet 1222 are 2-pole magnetized, the AF electromagnetic force can be maximized. Each of the first-first magnet 1221 and the first-second magnet 1222 may be a 4-pole magnet in which the polarity of the upper portion of the inner surface is different from that of the lower portion of the inner surface and the upper portion of the outer surface, and the polarity of the lower portion of the outer surface is the same.

The first-third magnet 1223 may be a 2-pole magnetized magnet. The first-third magnet 1223 may be a 2-pole magnet. The first-third magnet 1223 may be a 2-pole magnet in which the polarities of the inner surface and the outer surface are different. For example, the inner surface of the first-third magnet 1223 may be an N pole and the outer surface of the first-third magnet 1223 may be an S pole. Conversely, the inner surface of the first-third magnet 1223 may be an S pole and the outer surface of the first-third magnet 1223 may be an N pole. However, as a modified embodiment, the first-third magnet 1223 may be a 4-pole magnet. The first-third magnet 1223 may be formed larger than each of the first-first magnet 1221 and the first-second magnet 1222.

The first lens driving device 10 may comprise a dummy member 1230. The second mover 1200 may comprise a dummy member 1230. The dummy member 1230 may be disposed in the first housing 1210. The dummy member 1230 may be disposed in the first side portion of the first housing 1210. The dummy member 1230 may be disposed adjacent to the second lens driving device 20. Through this, magnetic force interference between the first lens driving device 10 and the second lens driving device 20 can be minimized. The dummy member 1230 may be disposed at a position corresponding to the first lateral plate 1342-1 of the first cover 1340.

The dummy member 1230 may have a weight corresponding to that of the first-third magnet 1223. The dummy member 1230 may have weaker magnetic force than the first-third magnet 1223 or may not have magnetic force. The dummy member 1230 may be disposed at an opposite side of the first-third magnet 1223 in the first housing 1210. The weight of the dummy member 1230 may correspond to the weight of the first-third magnet 1223. However, the dummy member 1230 may have a weight lighter than that of the first-third magnet 1223. Or, the dummy member 1230 may have a weight heavier than that of the first-third magnet 1223. The dummy member 1230 may be within 80% of the weight of the first-third magnet 1223 to 120% of the weight of the first-third magnet 1223. If the weight of the dummy member 1230 is less than the lower limit or exceeds the upper limit of the above-mentioned value, the weight balancing of the OIS driving unit may collapse.

The dummy member 1230 may be a non-magnetic material. The dummy member 1230 may comprise a non-magnetic material. The magnetic strength of the dummy member 1230 may be weaker than that of the first-third magnet 1223. The dummy member 1230 may be disposed at an opposite side of the first-third magnet 1223 to align the center of gravity. The dummy member 1230 may be made of 95% or more of tungsten. That is, the dummy member 1230 may be a tungsten alloy. For example, the specific gravity of the dummy member 1230 may be 18000 or more. The dummy member 1230 may be disposed at a position symmetrical to the first-third magnet 1223 with respect to the central axis of the first housing 1210. At this time, the central axis of the first housing 1210 may correspond to an optical axis. The dummy member 1230 may have a thickness corresponding to that of the first-third magnet 1223 in a direction perpendicular to the optical axis.

The first lens driving device 10 may comprise a yoke 1240. The second mover 1200 may comprise a yoke 1240. The yoke 1240 may be disposed in the first housing 1210. The yoke 1240 may be disposed in a first side portion of the first housing 1210. The yoke 1240 may be disposed adjacent to the second lens driving device 20. Through this, magnetic force interference between the first lens driving device 10 and the second lens driving device 20 can be minimized.

The first lens driving device 10 may comprise a stator 1300. The stator 1300 may be disposed below the first and second movers 1100 and 1200. The stator 1300 may movably support the second mover 1200. The stator 1300 may move the second mover 1200. At this time, the first mover 1100 can also move together with the second mover 1200.

The first lens driving device 10 may comprise a first base 1310. The stator 1300 may comprise a first base 1310. The first base 1310 may be disposed below the first housing 1210. The first base 1310 may be disposed below the first substrate 1320. The first substrate 1320 may be disposed on an upper surface of the first base 1310. The first base 1310 may be coupled to the first cover 1340. The first base 1310 may be disposed on the printed circuit board 30.

The first base 1310 may comprise a step 1311. The step 1311 may be formed on a side surface of the first base 1310. The step 1311 may be formed around an outer circumferential surface of the first base 1310. The step 1311 may be formed as a portion of the side surface of the first base 1310 is being protruded or recessed. A lower end of the lateral plate 1342 of the first cover 1340 may be disposed at the step 1311.

The first base 1310 may comprise a hole 1312. The hole 1312 may be hollow. The hole 1312 may penetrate through the first base 1310 in an optical axis direction. A light passing through the first lens 41 through the hole 1312 may be incident to an image sensor.

The first base 1310 may comprise a protrusion 1313. The protrusion 1313 may be formed on an upper surface of the first base 1310. The protrusion 1313 may be protruded from an upper surface of the first base 1310. A second coil 1330 may be disposed in the protrusion 1313. The second coil 1330 may be wound around the protrusion 1313 and disposed.

The first lens driving device 10 may comprise a first substrate 1320. The stator 1300 may comprise a first substrate 1320. The first substrate 1320 may be disposed in the first base 1310. The first substrate 1320 may be disposed at one side of the first housing 1210. The first substrate 1320 may be disposed between the first base 1310 and the first housing 1210. The first substrate 1320 may be disposed on an upper surface of the first base 1310. The support member 1500 may be coupled to the first substrate 1320. The first substrate 1320 may be electrically connected to the support member 1500. One end of the support member 1500 may be fixed to the first substrate 1320. The first substrate 1320 may be coupled to the printed circuit board 30 being disposed below the first base 1310 by soldering. The first substrate 1320 may comprise a flexible printed circuit board (FPCB). The first substrate 1320 may be partially bent.

The first substrate 1320 may comprise a body part 1321. A hole may be formed in the body part 1321. The hole may be hollow penetrating the first substrate 1320 in an optical axis direction. The first substrate 1320 may comprise a hole. A support member 1500 may be disposed in the hole of the first substrate 1320. The support member 1500 may be disposed to pass through the hole of the first substrate 1320.

The first substrate 1320 may comprise a terminal unit. The terminal unit may be extended from an edge of the body part 1321. The terminal unit may comprise a terminal electrically connected to the printed circuit board 30. The terminal unit may comprise a terminal being coupled to the printed circuit board 30. The terminal unit may comprise a plurality of terminal units.

The first substrate 1320 may comprise a first terminal unit 1322. The first terminal unit 1322 may be extended downward from the body part 1321 of the first substrate 1320. The first terminal unit 1322 may be formed by bending a part of the first substrate 1320. At least a portion of the first terminal unit 1322 may be exposed to the outside. The first terminal unit 1322 may be coupled to the printed circuit board 30 being disposed below the first base 1310 by soldering. The first terminal unit 1322 may be disposed in a groove of the first base 1310. The first terminal unit 1322 may comprise a plurality of terminals.

The first substrate 1320 may comprise a first terminal unit 1322 and a plurality of terminals being disposed on the first terminal unit 1322 and electrically connected to the printed circuit board 30. The first terminal unit 1322 of the first substrate 1320 may be disposed at a position corresponding to the first lateral plate 1342-1 of the first cover 1340. The first terminal unit 1322 of the first substrate 1320 may be disposed closest to the first lateral plate 1342-1 among the first to fourth lateral plates 1342-1, 1342-2, 1342-3, and 1342-4 of the first cover 1340.

The first substrate 1320 may comprise a second terminal unit 1323. The second terminal unit 1323 may be disposed at an opposite side of the first terminal unit 1322. The second terminal unit 1323 of the first substrate 1320 may be disposed at a position corresponding to the second lateral plate 1342-2 of the first cover 1340.

The first lens driving device 10 may comprise a second coil 1330. The stator 1300 may comprise a second coil 1330. The second coil 1330 may be an 'OIS coil'. The second coil 1330 may move the first bobbin 1110. The second coil 1330 may be disposed in the first base 1310. The second coil 1330 may be disposed in the first substrate 1320. The second coil 1330 may face the first magnet 1220. The second coil 1330 may interact with the first magnet 1220 electromagnetically. In this case, when a current is supplied to the second coil 1330 and a magnetic field is formed around the second coil 1330, the first magnet 1220 may move against the second coil 1330 by the electromagnetic interaction between the second coil 1330 and the first magnet 1220. The second coil 1330 may move the first housing 1210 and the first bobbin 1110 against the first base 1310 in a direction perpendicular to the optical axis through electromagnetic interaction with the first magnet 1220. The first substrate 1320 may comprise a second coil 1330. That is, the second coil 1330 may be one configuration of the first substrate 1320. The second coil 1330 may be formed as a fine pattern coil (FP coil) in a substrate separate from the first substrate 1320.

The second coil 1330 may comprise a plurality of coils. The second coil 1330 may comprise a number of coils corresponding to those of the first magnet 1220. The second coil 1330 may comprise three coils. The second coil 1330 may comprise a second-first coil 1331, a second-second coil 1332, and a second-third coil 1333. The second-first coil 1331 may face the first-first magnet 1221. The second-second coil 1332 may face the first-second magnet 1222. The second-third coil 1333 may face the first-third magnet 1223.

The number of windings of the second-first coil 1331 may be greater than the number of windings of the second-second coil 1332 and the second-third coil 1333. The number of windings of the second-second coil 1332 may correspond to the number of windings of the second-third coil 1333. In a second embodiment of the present embodiment, during OIS driving, the movement in an X-axis direction is performed through the second-first coil 1331 and second-second coil 1332, and the movement in a Y-axis direction may be performed through the second-third coil 1333. Therefore, in a second embodiment of the present embodiment, the number of turns of the second-third coil 1333 may be higher than the number of turns of the second-first coil 1331 and the second-second coil 1332 to compensate for insufficient driving force in a Y-axis direction. For example, a ratio between the number of turns of the second-third coil 1333 and the number of turns of the second-first and second-second coils 1331 and 1332 may be 1.5:2.0 to 1:1. Ideally, the ratio of the number of turns of the second-third coil 1333 to the number of turns of the second-first and second-second coils 1331 and 1332 is 1:1, but it can be disposed up to 1.5:2.0 due to space constraints.

The first lens driving device 10 may comprise a first cover 1340. The stator 1300 may comprise a first cover 1340. The first cover 1340 may comprise a 'cover can'. The first cover 1340 may comprise a yoke. The first cover 1340 may be disposed outside the first housing 1210. The first cover 1340 may be coupled to the first base 1310. The first cover 1340 may accommodate the first housing 1210 therein. The first cover 1340 may form the outer appearance of the first lens driving device 10. The first cover 1340 may have a hexahedral shape with an open lower surface. The first cover 1340 may be made of a non-magnetic material. The first cover 1340 may be formed of a metal material. The first cover 1340 may be formed of a metal plate. The first cover 1340 may be connected to the ground portion of the printed circuit board 30. Through this, the first cover 1340 may be grounded. The first cover 1340 may block electromagnetic interference (EMI). At this time, the first cover 1340 may be referred to as an 'EMI shield can'.

The first cover 1340 may comprise an upper plate 1341 and a lateral plate 1342. The first cover 1340 may comprise an upper plate 1341 comprising a hole and a lateral plate 1342 being extended downward from an outer circumference or edge of the upper plate 1341. The lower end of the lateral plate 1342 of the first cover 1340 may be disposed in the step 1311 of the first base 1310. An inner surface of the lateral plate 1342 of the first cover 1340 may be fixed to the first base 1310 by an adhesive.

The lateral plate 1342 of the first cover 1340 may comprise a plurality of lateral plates. The lateral plate 1342 may comprise four lateral plates. The lateral plate 1342 of the first cover 1340 may comprise: a first lateral plate 1342-1 and a second lateral plate 1342-2 being disposed at an opposite side to each other; and a third lateral plate 1342-3 and a fourth lateral plate 1342-4 being disposed at an opposite side to each other. The gyro sensor 50 may be disposed closest to the fourth lateral plate 1342-4 among the first to fourth lateral plates 1342-1, 1342-2, 1342-3, and 1342-4. The first terminal unit 1322 of the first substrate 1320 may be disposed at a position corresponding to the first lateral plate 1342-1 of the first cover 1340. The second terminal unit 1323 of the first substrate 1320 may be disposed at a position corresponding to the second lateral plate 1342-2 of the first cover 1340.

The first cover 1340 may comprise a groove 1343. The groove 1343 may be formed in the lateral plate 1342 of the first cover 1340. The groove 1343 may be formed at a lower end of the lateral plate 1342. The groove 1343 may be formed at a position corresponding to at least one of the first terminal unit 1322 and the second terminal unit 1323. The groove 1343 may be formed to expose at least one of the first terminal unit 1322 and the second terminal unit 1323 to the outside.

The first lens driving device 10 may comprise a terminal 1350. The stator 1300 may comprise a terminal 1350. The terminal 1350 may be disposed in the first base 1310. The terminal 1350 may be electrically connected to the first substrate 1320. The terminal 1350 may be coupled to the support member 1500. The terminal 1350 may electrically connect the support member 1500 and the first substrate 1320.

The first lens driving device 10 may comprise an elastic member 1400. The elastic member 1400 may be an 'AF support member'. At least portion of the elastic member 1400 may have elasticity. The elastic member 1400 may be formed of metal. The elastic member 1400 may be formed of a conductive material. The elastic member 1400 may connect the first bobbin 1110 and the first housing 1210. The elastic member 1400 may elastically connect the first bobbin 1110 and the first housing 1210. The elastic member 1400 may be coupled to the first bobbin 1110 and the first housing 1210. The elastic member 1400 may elastically support the first bobbin 1110. The elastic member 1400 may movably support the first bobbin 1110. The elastic member 1400 may support the movement of the first bobbin 1110 during AF driving.

The elastic member 1400 may comprise a first elastic member 1410. The first elastic member 1410 may be an 'upper elastic member'. The first elastic member 1410 may connect the first housing 1210 and the first bobbin 1110. The first elastic member 1410 may be coupled to an upper portion of the first bobbin 1110 and an upper portion of the first housing 1210. The first elastic member 1410 may be coupled to an upper surface of the first bobbin 1110. The first elastic member 1410 may be coupled to an upper surface of the first housing 1210. The first elastic member 1410 may be coupled to the support member 1500. The first elastic member 1410 may be formed of a leaf spring. The first elastic member 1410 can be separated and used as a power line for electrical or communication signal.

The first elastic member 1410 may comprise a plurality of elastic units. The first elastic member 1410 may comprise three elastic units. The first elastic member 1410 may comprise first to third elastic units 1410-1, 1410-2, and 1410-3. The first elastic unit 1410-1 may connect the support member 1500 and one end of the first-first coil 1121. The second elastic unit 1410-2 may connect the other end of the first-first coil 1121 and one end of the first-second coil 1122. The third elastic unit 1410-3 may connect the other end of the first-second coil 1122 and the support member 1500. The first elastic member 1410 may be electrically connected to the first coil 1120. The first elastic member 1410 may electrically connect the first coil 1120 and the support member 1500.

The first elastic member 1410 may comprise an outer side portion 1411. The outer side portion 1411 may be coupled to the first housing 1210. The outer side portion 1411 may be coupled to an upper surface of the first housing 1210. The outer side portion 1411 may comprise a hole or groove being coupled to the protrusion of the first housing 1210. The outer side portion 1411 may be fixed to the first housing 1210 by an adhesive.

The first elastic member 1410 may comprise an inner side portion 1412. The inner side portion 1412 may be coupled to the first bobbin 1110. The inner side portion 1412 may be coupled to an upper surface of the first bobbin 1110. The inner side portion 1412 may comprise a hole or groove being coupled to the protrusion of the first bobbin 1110. The inner side portion 1412 may be fixed to the first bobbin 1110 by an adhesive.

The first elastic member 1410 may comprise a connecting portion 1413. The connecting portion 1413 may connect the inner side portion 1412 and the outer side portion 1411. The connecting portion 1413 may have elasticity. At this time, the connecting portion 1413 may be referred to as an 'elastic portion'. The connecting portion 1413 may comprise a shape bent two or more times.

The first elastic member 1410 may comprise a connecting portion 1414. The connecting portion 1414 may be extended from the outer side portion 1411. The connecting portion 1414 may be coupled to the support member 1500. The connecting portion 1414 and the support member 1500 may be coupled by soldering.

The elastic member 1400 may comprise a second elastic member 1420. The second elastic member 1420 may be a 'lower elastic member'. The second elastic member 1420 may be disposed below the first elastic member 1410. The second elastic member 1420 may be disposed at one side of the first elastic member 1410. The second elastic member 1420 may connect the first housing 1210 and the first bobbin 1110. The second elastic member 1420 may be disposed below the first bobbin 1110. The second elastic member 1420 may be coupled to the first bobbin 1110 and the first housing 1210. The second elastic member 1420 may be coupled to a lower surface of the first bobbin 1110. The second elastic member 1420 may be coupled to a lower surface of the first housing 1210. The second elastic member 1420 may be formed of a leaf spring. The second elastic member 1420 may be integrally formed.

The second elastic member 1420 may comprise an outer side portion 1421. The outer side portion 1421 may be coupled to the first housing 1210. The outer side portion 1421 may be coupled to a lower surface of the first housing 1210. The outer side portion 1421 may comprise a hole or groove being coupled to the protrusion of the first housing 1210. The outer side portion 1421 may be fixed to the first housing 1210 by an adhesive.

The second elastic member 1420 may comprise an inner side portion 1422. The inner side portion 1422 may be coupled to the first bobbin 1110. The inner side portion 1422 may be coupled to a lower surface of the first bobbin 1110. The inner side portion 1422 may comprise a hole or groove being coupled to a protrusion of the first bobbin 1110. The inner side portion 1422 may be fixed to the first bobbin 1110 by an adhesive.

The second elastic member 1420 may comprise a connecting portion 1423. The connecting portion 1423 may connect the inner side portion 1422 and the outer side portion 1421. The connecting portion 1423 may have elasticity. At this time, the connecting portion 1423 may be referred to as an 'elastic portion'. The connecting portion 1423 may comprise a shape bent two or more times.

The first lens driving device 10 may comprise a support member 1500. The support member 1500 may be an 'OIS support member'. The support member 1500 may connect the first elastic member 1410 and the first substrate 1320 or the first elastic member 1410 and the terminal 1350. The support member 1500 may be coupled to an upper surface of the first elastic member 1410 and the terminal 1350. The support member 1500 may movably support the first housing 1210. The support member 1500 may elastically support the first housing 1210. At least a portion of the support member 1500 may have elasticity. The support member 1500 may elastically support the movement of the first housing 1210 and the first bobbin 1110 during OIS driving. One end of the support member 1500 may be coupled to the first elastic member 1410 by soldering. The other end of the support member 1500 may be coupled to the terminal 1350 by soldering.

The support member 1500 may comprise a plurality of wires. The support member 1500 may comprise four wires. The plurality of wires may comprise four wires connecting the three first elastic units 410-1, 410-2, and 410-3 and the first substrate 1320. As a modified embodiment, the support member 1500 may be formed as a leaf spring.

The first lens driving device 10 may comprise a first sensor 1610. The first sensor 1610 may be disposed in the first base 1310. The first sensor 1610 may detect the sensing magnet 1130. The first sensor 1610 may be disposed in the first substrate 1320. The first sensor 1610 may be coupled to a lower surface of the first substrate 1320. The first sensor 1610 may be spaced apart from the first housing 1210. The first sensor 1610 may be spaced apart from the first bobbin 1110. The first sensor 1610 may be overlapped with the sensing magnet 1130 in an optical axis direction. The first sensor 1610 may detect the position of the sensing magnet 1130 for AF feedback control. The first sensor 1610 may be a Hall IC, a Hall element, or a Hall sensor. The first sensor 1610 may detect the magnetic force of the sensing magnet 1130.

The first lens driving device 10 may comprise a second sensor 1620. The second sensor 1620 may be disposed between the first base 1310 and the first substrate 1320. The second sensor 1620 may detect the movement of the second mover 1300. The second sensor 1620 may detect the movement of the first housing 1210 and the first magnet 1220 by detecting the magnetic force of the first magnet 1220. The detected value detected by the second sensor 1620 may be used for OIS feedback control. The second sensor 1620 may comprise a plurality of Hall sensors. The second sensor 1620 may comprise two Hall sensors. The second sensor 1620 may comprise a first Hall sensor for detecting the movement in an x-axis direction in the horizontal direction and a second Hall sensor for detecting the movement in a y-axis direction in the horizontal direction.

The first lens driving device 10 may comprise a damper. The damper may be disposed in the support member 1500. The damper may be disposed in the support member 1500 and the first housing 1210. The damper may be disposed in the elastic member. The damper may be disposed in the elastic member 1400 and/or the support member 1500 to prevent a resonance phenomenon generated in the elastic member 1400 and/or the support member 1500.

Hereinafter, a configuration of a second lens driving device according to a second embodiment of present embodiment will be described with reference to drawings.

Figure 28:
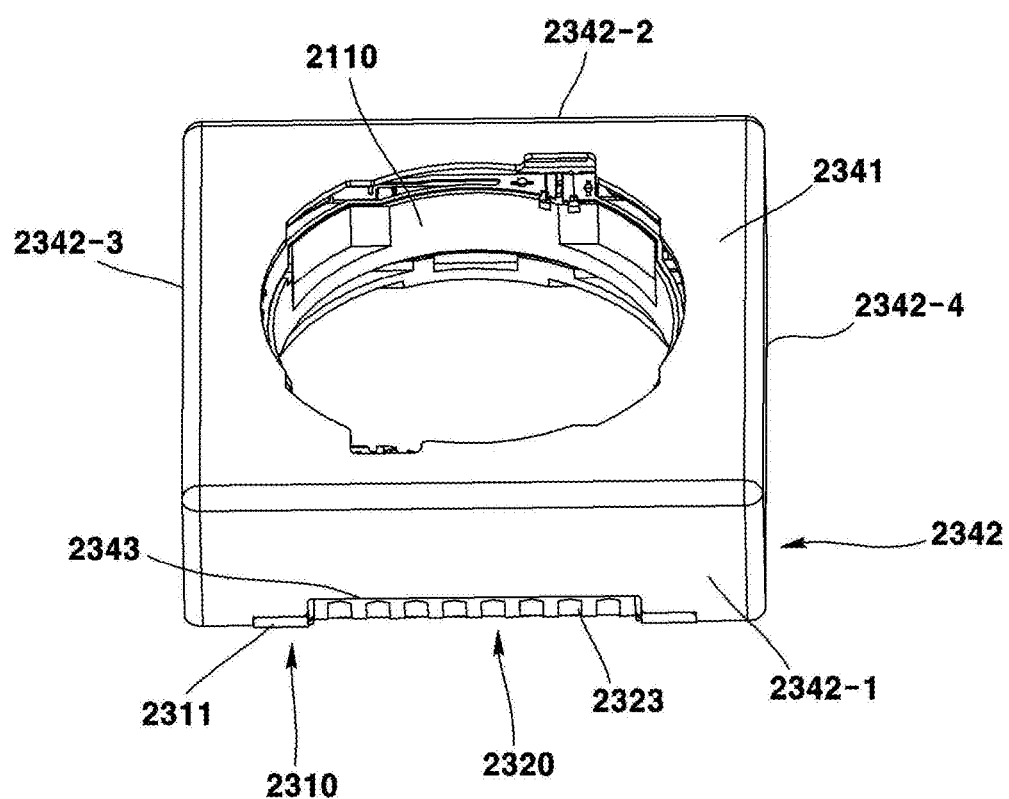
FIG. 28 is a perspective view of a second lens driving device according to a second embodiment of present embodiment.
Figure 29:
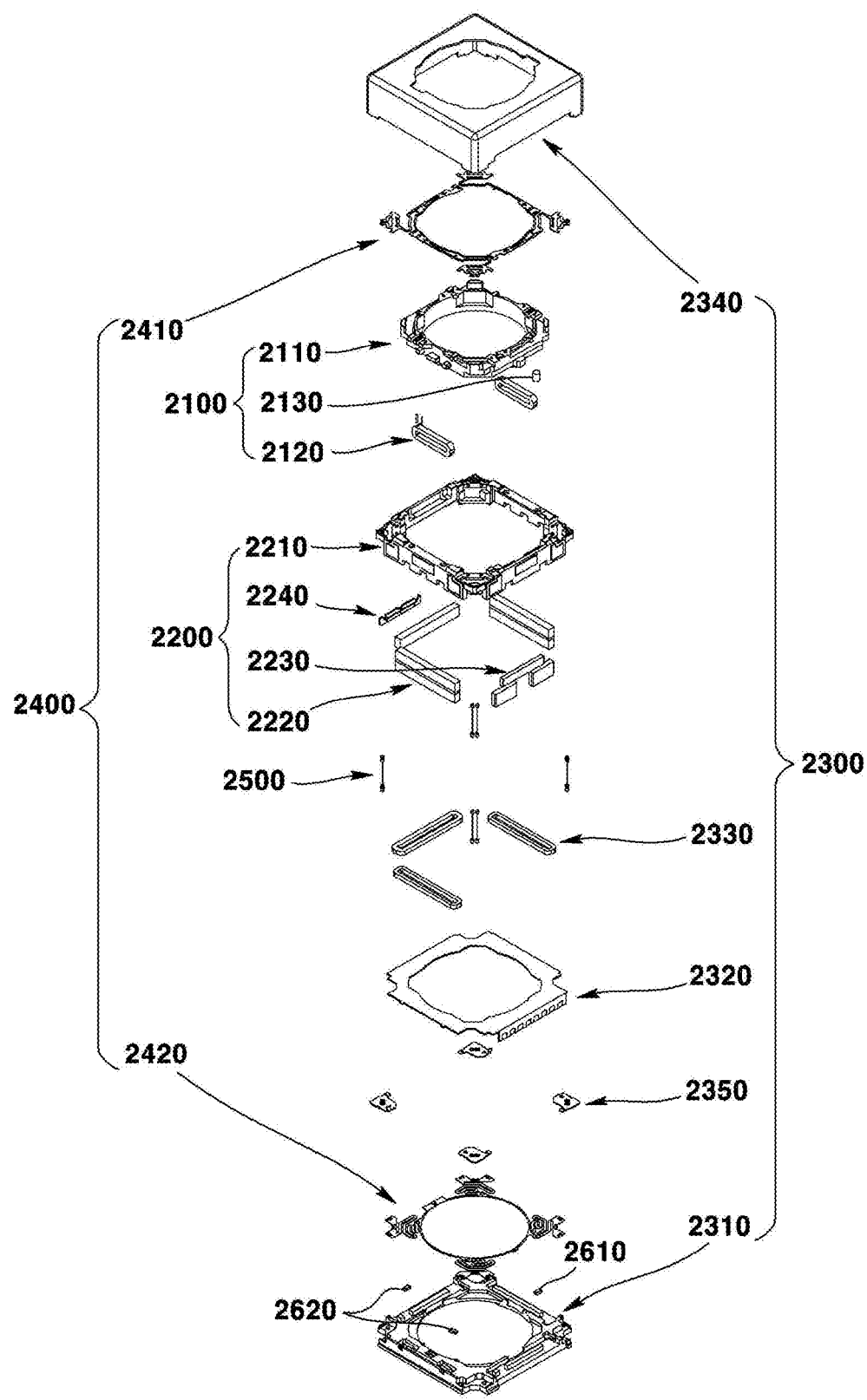
FIG. 29 is an exploded perspective view of a second lens driving device according to a second embodiment of present embodiment.
Figure 30:
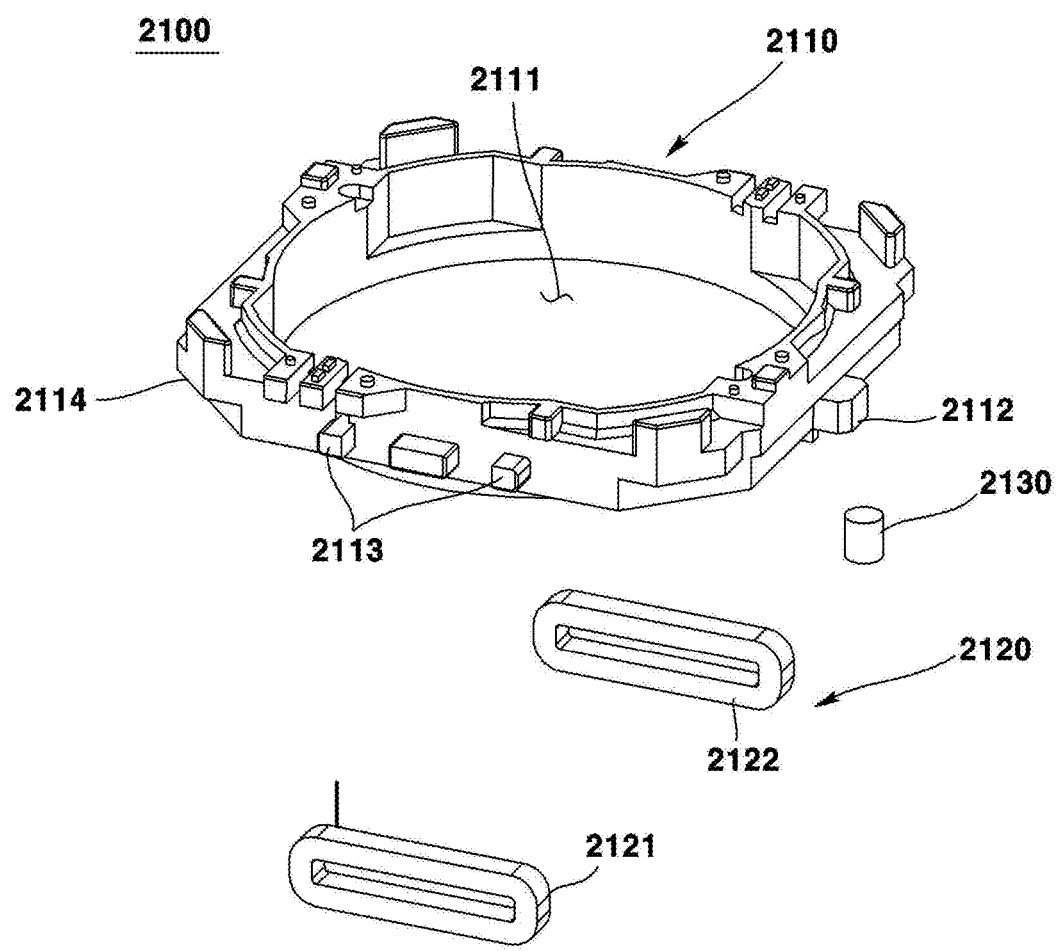
FIG. 30 is an exploded perspective view of a first mover of a second lens driving device according to a second embodiment of present embodiment.
Figure 31:
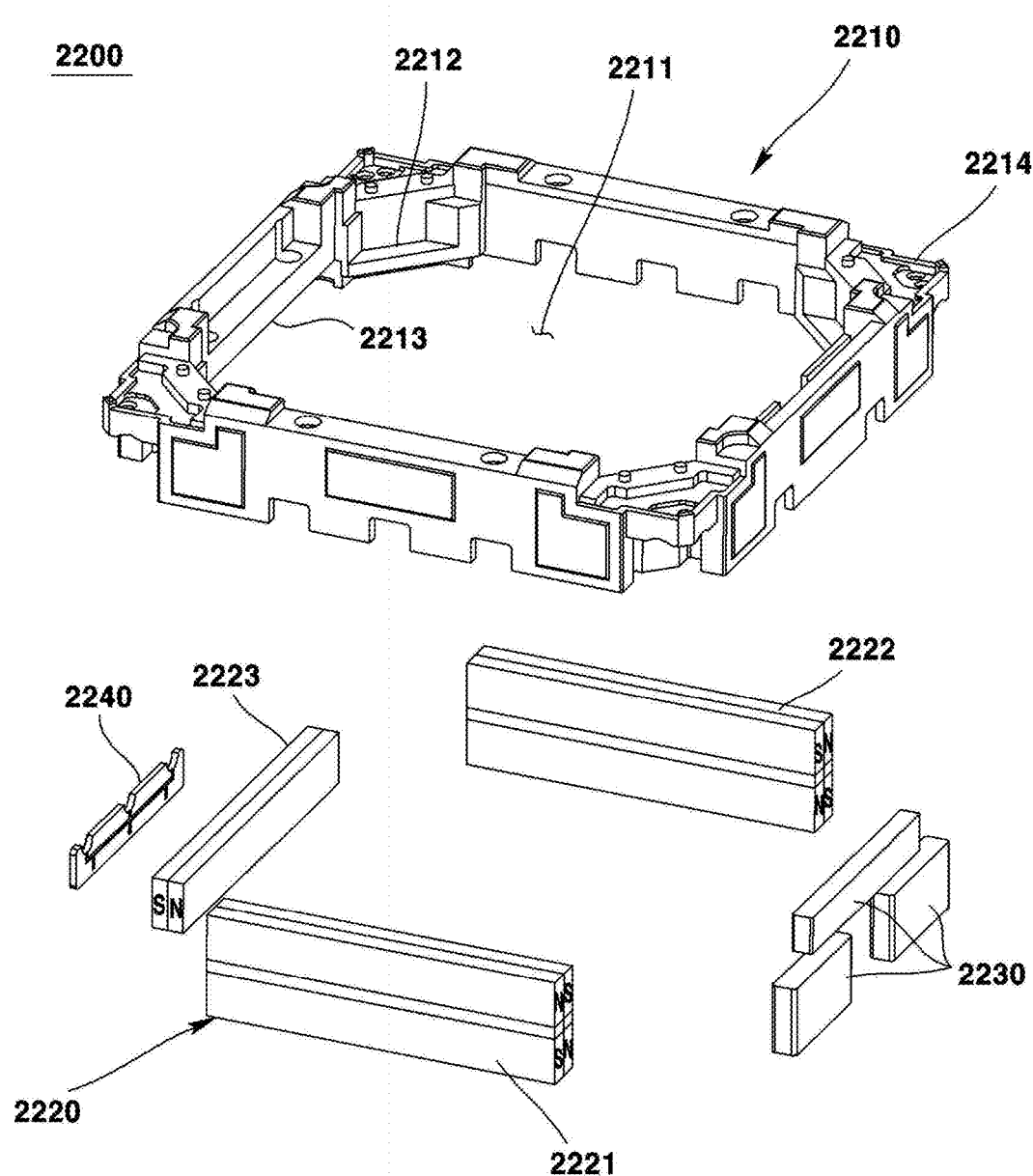
FIG. 31 is an exploded perspective view of a second mover of a second lens driving device according to a second embodiment of present embodiment.
Figure 32:
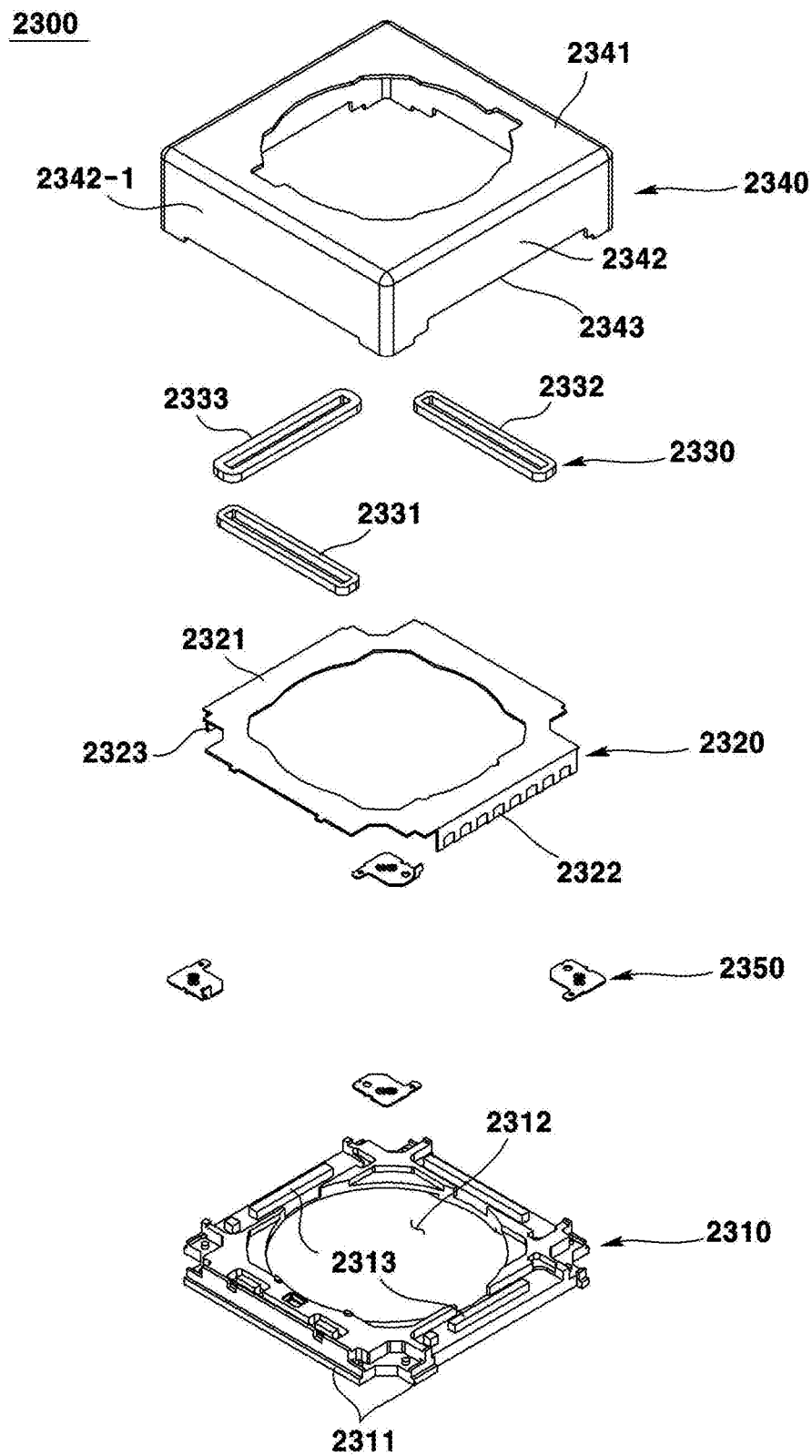
FIG. 32 is an exploded perspective view of a stator of a second lens driving device according to a second embodiment of present embodiment.
Figure 33:
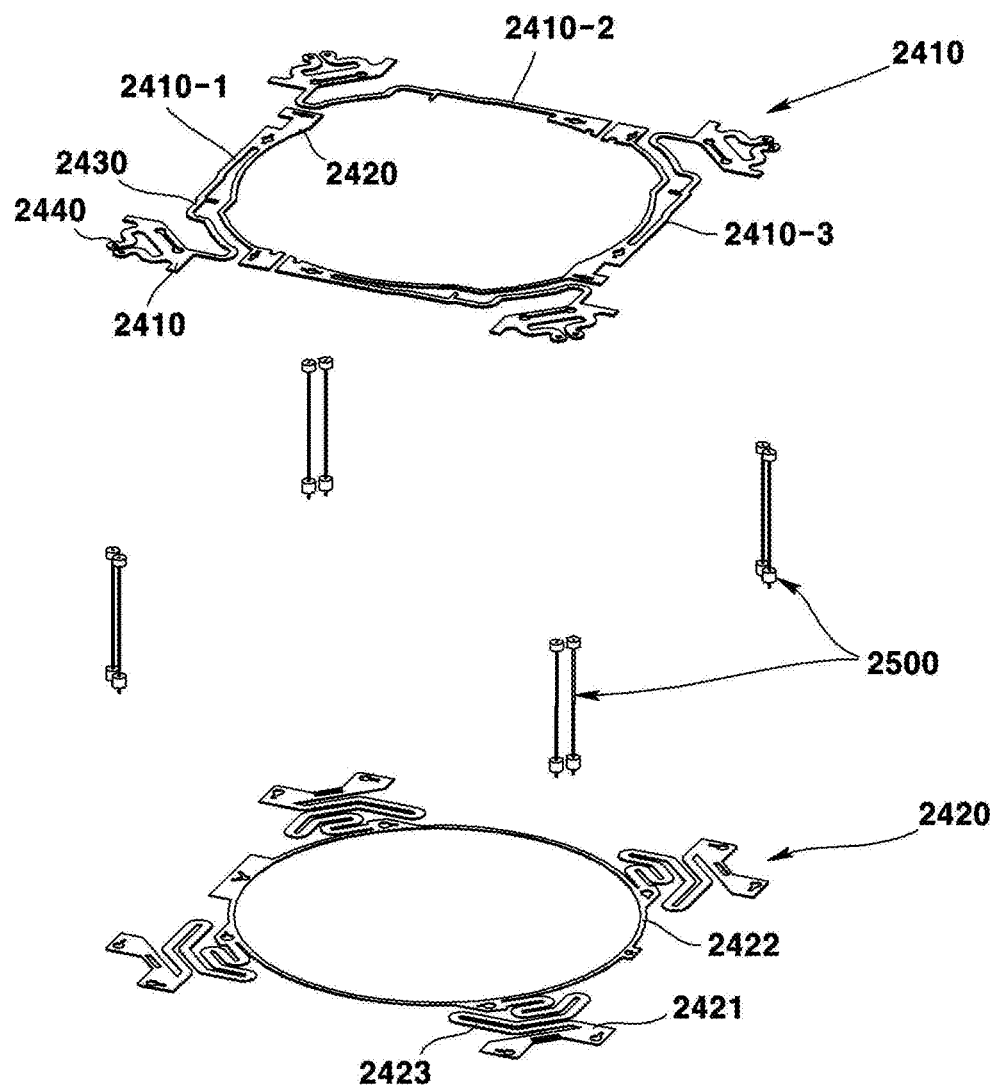
FIG. 33 is an exploded perspective view of an elastic member and a support member of a second lens driving device according to a second embodiment of the present embodiment.

FIG. 28 is a perspective view of a second lens driving device according to a second embodiment of present embodiment; FIG. 29 is an exploded perspective view of a second lens driving device according to a second embodiment of present embodiment; FIG. 30 is an exploded perspective view of a first mover of a second lens driving device according to a second embodiment of present embodiment; FIG. 31 is an exploded perspective view of a second mover of a second lens driving device according to a second embodiment of present embodiment; FIG. 32 is an exploded perspective view of a stator of a second lens driving device according to a second embodiment of present embodiment; and FIG. 33 is an exploded perspective view of an elastic member and a support member of a second lens driving device according to a second embodiment of the present embodiment.

The camera device 2 may comprise a second lens driving device 20. The second lens driving device 20 may be a voice coil motor (VCM). The second lens driving device 20 may be a lens driving motor. The second lens driving device 20 may be a lens driving actuator. The second lens driving device 20 may comprise an AF module. The second lens driving device 20 may comprise an OIS module. The second lens driving device 20 may be disposed on a printed circuit board 30. The second lens driving device 20 may be disposed on a first surface of printed circuit board 30. At this time, the first surface may be an upper surface.

The second lens driving device 20 may comprise a first mover 2100. The first mover 2100 may be coupled to the second lens 42. The first mover 2100 may be connected to the second mover 2200 through the first elastic member 2410 and/or the second elastic member 2420. The first mover 2100 may move through interaction with the second mover 2200. At this time, the first mover 2100 can move integrally with the second lens 42. Meanwhile, the first mover 2100 may move during AF driving. At this time, the first mover 2100 may be referred to as an 'AF mover'. However, the first mover 2100 may move together with the second mover even during OIS driving.

The second lens driving device 20 may comprise a second bobbin 2110. The first mover 2100 may comprise a second bobbin 2110. A second bobbin 2110 may be disposed inside the second housing 2210. The second bobbin 2110 may be disposed in a hole 2211 in the second housing 2210. The second bobbin 2110 may be movably coupled to the second housing 2210. The second bobbin 2110 is movable against the second housing 2210 in an optical axis direction. A second lens 42 may be coupled to the second bobbin 2110. The second bobbin 2110 and the second lens 42 may be coupled by screw-coupling and/or an adhesive. A third coil 2120 may be coupled to the second bobbin 2110. A first elastic member 2410 may be coupled to an upper portion or upper surface of the second bobbin 2110. A second elastic member 2420 may be coupled to a lower portion or lower surface of the second bobbin 2110. The second bobbin 2110 may be coupled to the first elastic member 2410 and/or the second elastic member 2420 by thermal fusion and/or an adhesive. The adhesive for coupling the second bobbin 2110 and the second lens 42 and the second bobbin 2110 and the elastic member 2400 may be an epoxy cured by at least one among ultraviolet (UV) light, heat, and laser.

The second bobbin 2110 may comprise a hole 2111. The hole 2111 may be hollow. The hole 2111 may penetrate through the second bobbin 2110 in an optical axis direction. The second lens 42 may be accommodated in the hole 2111. For example, a screw thread corresponding to a screw thread being formed on an outer circumferential surface of the second lens 42 may be disposed on an inner circumferential surface of the hole 2111 of the second bobbin 2110.

The second bobbin 2110 may comprise a groove 2112. The groove 2112 may be a sensing magnet accommodating groove. The groove 2112 may be a recess. A sensing magnet 2130 may be disposed in the groove 2112. The groove 2112 of the second bobbin 2110 may be formed on an outer circumferential surface of the second bobbin 2110. At least a portion of the groove 2112 of the second bobbin 2110 may be formed to correspond to the shape and size of the sensing magnet 2130. The groove 2112 may be open downward.

The second bobbin 2110 may comprise a protrusion 2113. A third coil 2120 may be disposed in the protrusion 2113. The protrusion 2113 may be formed on an outer circumferential surface of the second bobbin 2110. The protrusion 2113 may be protruded from the outer circumferential surface of the second bobbin 2110. A third coil 2120 may be wound and fixed to the protrusion 2113.

The second bobbin 2110 may comprise a lower stopper 2114. A downward stroke of the second bobbin 2110 may be restricted through the lower stopper 2114. The lower stopper 2114 may be formed on an outer circumferential surface of the second bobbin 2110. The lower stopper 2114 may be in contact with the second housing 2210 when the second bobbin 2110 moves downward.

The second lens driving device 20 may comprise a third coil 2120. The first mover 2100 may comprise a third coil 2120. The third coil 2120 may be an 'AF driving coil' used for AF driving. The third coil 2120 may be disposed in the second bobbin 2110. The third coil 2120 may move the second bobbin 2110. The third coil 2120 may be disposed between the second bobbin 2110 and the second housing 2210. The third coil 2120 may be disposed on an outer lateral surface or an outer circumferential surface of the second bobbin 2110. The third coil 2120 may be directly wound around the second bobbin 2110. Or, the third coil 2120 may be coupled to the second bobbin 2110 in a directly wound state. The third coil 2120 may face the second magnet 2220. The third coil 2120 may be disposed to face the second magnet 2220. The third coil 2120 may interact with the second magnet 2220 electromagnetically. In this case, when a current is supplied to the third coil 2120 and an electromagnetic field is formed around the third coil 2120, the third coil 2120 may move against the second magnet 2220 by the electromagnetic interaction between the third coil 2120 and the second magnet 2220.

The third coil 2120 may comprise a plurality of coils. The third coil 2120 may comprise two coils. The third coil 2120 may comprise a third-first and third-second coils 2221 and 2122. A third-first coil 2121 may be disposed at a position corresponding to the third lateral plate 2342-3 of the second cover 2340. The third-first coil 2121 may be disposed to face the third lateral plate 2342-3 of the second cover 2340. The third-second coil 2122 may be disposed at a position corresponding to the fourth lateral plate 2342-4 of the second cover 2340. The third-second coil 2122 may be disposed to face the fourth lateral plate 2342-4 of the second cover 2340.

In a second embodiment of the present embodiment, the third coil 2120 and the second magnet 2220 may move the second bobbin 2110 against the second housing 2210 in an optical axis direction. The third coil 2120 and the second magnet 2220 may move the second bobbin 2110 in an optical axis direction through electromagnetic interaction. The third coil 2120 and the second magnet 2220 may be used for AF driving.

The second lens driving device 20 may comprise a coil. The coil may move the second bobbin 2110. The coil may comprise a third coil 2120 that moves the second bobbin 2110 in an optical axis direction and a fourth coil 2330 that moves the second bobbin 2110 in a direction perpendicular to the optical axis direction.

The second lens driving device 20 may comprise a sensing magnet 2130. The first mover 2100 may comprise a sensing magnet 2130. The sensing magnet 2130 may be disposed in the second bobbin 2110. The sensing magnet 2130 may be detected through the first sensor 2610. In addition, the second lens driving device 20 may comprise a compensation magnet. The first mover 2100 may comprise a compensation magnet. The compensation magnet may be disposed to achieve magnetic force balance with the sensing magnet 2130. The compensation magnet may have a weight corresponding to that of the sensing magnet 2130. The compensation magnet may be disposed symmetrically with the sensing magnet 2130 with respect to an optical axis.

The second lens driving device 20 may comprise a second mover 2200. The second mover 2200 may be movably coupled to the stator 2300 through a support member 2500. The second mover 2200 may support the first mover 2100 through the first and second elastic members 2410 and 2420. The second mover 2200 may move the first mover 2100 or may move together with the first mover 2100. The second mover 2200 may move through interaction with the stator 2300. The second mover 2200 may move during OIS driving. At this time, the second mover 2200 may be referred to as an 'OIS mover'. The second mover 2200 may move integrally with the first mover 2100 during OIS driving.

The second lens driving device 20 may comprise a second housing 2210. The second mover 2200 may comprise a second housing 2210. The second housing 2210 may be spaced apart from the second base 2310. The second housing 2210 may be disposed outside the second bobbin 2110. The second housing 2210 may accommodate at least a portion of the second bobbin 2110. The second housing 2210 may be disposed inside the second cover 2340. The second housing 2210 may be disposed between the second cover 2340 and the second bobbin 2110. The second housing 2210 may be formed of a material different from that of the second cover 2340. The second housing 2210 may be formed of an insulating material. The second housing 2210 may be formed of an injection molding material. An outer side surface of the second housing 2210 may be spaced apart from an inner surface of the lateral plate 2342 of the second cover 2340. Through the separation space between the second housing 2210 and the second cover 2340, the second housing 2210 may move for OIS driving. A second magnet 2220 may be disposed in the second housing 2210. The second housing 2210 and the second magnet 2220 may be coupled by an adhesive. The first elastic member 2410 may be coupled to an upper portion or upper surface of the second housing 2210. A second elastic member 2420 may be coupled to a lower portion or lower surface of the second housing 2210. The second housing 2210 may be coupled to an upper portion and the second elastic members 2410 and 2420 by thermal fusion and/or an adhesive. The adhesive that couples the second housing 2210 and the second magnet 2220 and the second housing 2210 and the elastic member 2400 may be an epoxy cured by at least one among ultraviolet (UV), heat, and laser.

The second housing 2210 may comprise four side portions and four corner portions being disposed between the four side portions. The side portion of the second housing 2210 may comprise: a first side portion; a second side portion being disposed at an opposite side of the first side portion; a third side portion and a fourth side portion being disposed at an opposite side to each other between the first side portion and the second side portion. The corner portion of the second housing 2210 may comprise: a first corner portion being disposed between a first side portion and a third side portion; a second corner portion being disposed between a first side portion and a fourth side portion; a third corner portion being disposed between a second side portion and a third side portion; and a fourth corner portion being disposed between a second side portion and a fourth side portion. A side portion of the second housing 2210 may comprise a 'lateral wall'. The first side portion of the second housing 2210 may be disposed at a position corresponding to the first lateral plate 2342-1 of the second cover 2340. The second side portion of the second housing 2210 may be disposed at a position corresponding to the second lateral plate 2342-2 of the second cover 2340. The third side portion of the second housing 2210 may be disposed at a position corresponding to the third lateral plate 2342-3 of the second cover 2340. The fourth side portion of the second housing 2210 may be disposed at a position corresponding to the fourth lateral plate 2342-4 of the second cover 2340.

The second housing 2210 may comprise a hole 2211. The hole 2211 may be hollow. The hole 2211 may be formed in the second housing 2210. The hole 2211 may be formed to penetrate through the second housing 2210 in an optical axis direction. A second bobbin 2110 may be disposed in the hole 2211. At least a portion of the hole 2211 may be formed in a shape corresponding to that of the second bobbin 2110. An inner circumferential surface or an inner lateral surface of the second housing 2210 forming the hole 2211 may be spaced apart from an outer circumferential surface of the second bobbin 2110. However, at least a portion of the second housing 2210 and the second bobbin 2110 is overlapped in an optical axis direction, so that the moving stroke distance of the second bobbin 2110 in an optical axis direction may be restricted.

The second housing 2210 may comprise a groove 2212. The groove 2212 may accommodate at least a portion of the lower stopper 2114 of the second bobbin 2110. The bottom surface of the groove 2212 may be overlapped with the lower stopper 2114 of the second bobbin 2110 in an optical axis direction. When the second bobbin 2110 moves downward, the lower stopper 2114 of the second bobbin 2110 may come into contact with the bottom surface of the groove 2212 of the second housing 2210.

The second housing 2210 may comprise a hole 2213. The hole 2213 may be a magnet accommodating groove. A second magnet 2220 may be coupled to the groove 2213. The groove 2213 may be formed as a portion of an inner circumferential surface and/or a lower surface of the second housing 2210 is being recessed. The groove 2213 may be formed in each of the three side portions of the second housing 2210. The groove 2213 may be formed in a second, third and fourth side portions of the second housing 2210. The groove 2213 may be formed in a shape corresponding to the first side portion of the second housing 2210, but in the groove 2213 being formed in a first side portion of the second housing 2210, a dummy member 2230 other than the second magnet 2220 may be disposed.

The second housing 2210 may comprise a hole 2214. The hole 2214 may be a through hole of a support member. The hole 2214 may be formed in a corner portion of the second housing 2210. The hole 2214 may be formed to penetrate through the second housing 2210 in an optical axis direction. A support member 2500 may be disposed in the hole 2214 of the second housing 2210. The support member 2500 may pass through the hole 2214 of the second housing 2210.

The second lens driving device 20 may comprise a second magnet 2220. The second mover 2200 may comprise a second magnet 2220. The second magnet 2220 may be disposed in the second housing 2210. The second magnet 2220 may be disposed inside the second cover 2340. The second magnet 2220 may be fixed to the second housing 2210 by an adhesive. The second magnet 2220 may be disposed between the second bobbin 2110 and the second housing 2210. The second magnet 2220 may face the third coil 2120. The second magnet 2220 may interact with the third coil 2120 electromagnetically. The second magnet 2220 may move the second bobbin 2110 in an optical axis direction through interaction with the third coil 2120. The second magnet 2220 may be used for AF driving. The second magnet 2220 may face the fourth coil 2330. The second magnet 2220 may interact with the fourth coil 2330 electromagnetically. The second magnet 2220 may move the second bobbin 2110 and the second housing 2210 in a direction perpendicular to the optical axis direction through interaction with the fourth coil 2330. The second magnet 2220 may be used for OIS driving. The second magnet 2220 may be disposed in a plurality of side portions of the second housing 2210. The second magnet 2220 may be a flat magnet having a flat plate shape.

The second magnet 2220 may not be disposed between the second bobbin 2110 and the first lateral plate 2342-1 of the second cover 2340. Through this, magnetic field interference of the second magnet 2220 affecting the first lens driving device 10 can be minimized.

The second magnet 2220 may comprise a plurality of magnets. The second magnet 2220 may comprise three magnets. The second magnet 2220 may comprise a second-first to second-third magnets 2221, 2222, and 2223. The second-first magnet 2221 may be disposed at the first side portion of the second housing 2210. The second magnet 2221 may be disposed at the second side portion of the second housing 2210. The third magnet 2221 may be disposed at the fourth side portion of the second housing 2210. A dummy member 2230 may be disposed at the third side portion of the second housing 2210.

The second-first magnet 2221 may face the third-first coil 2121. The second-second magnet 2222 may face the third-second coil 2122. The second-first and second-second magnets 2221 and 2222 may be used during AF driving. The second magnet 2220 comprises the second-first magnet 2221 being disposed at a position corresponding to the third lateral plate 2342-3 of the second cover 2340 and the fourth lateral plate 2342-4. A second-second magnet 2222 being disposed at a corresponding position and second-third magnets 2223 being disposed at a position corresponding to the second lateral plate 2342-2 may be comprised.

The second-first magnet 2221 may face the fourth-first coil 2331. The second-second magnet 2222 may face the fourth-second coil 2332. The second-first and second-second magnets 2221 and 2222 may be used when driving in an OIS-x-axis direction. The second-third magnets 2223 may face the fourth-third coil 2333. The second-third magnets 2223 may be used when driving in an OIS-y-axis direction. The area of a lower surface of the second-third magnet 2223 may be larger than the area of a lower surface of each of the second-first magnet 2221 and the second-second magnet 2222.

The second-first magnet 2221 and the second-second magnet 2222 may be 4-pole magnetized magnets. The second-first magnet 2221 and the second-second magnet 2222 may be 4-pole magnets. The 4-pole magnetized magnet may comprise a neutral portion being disposed horizontally in the central portion. Here, the neutral portion may be a void. The second-first magnet 2221 and the second-second magnet 2222 may be 2-pole magnetized. As the second-first magnet 2221 and the second-second magnet 2222 are 2-pole magnetized, the AF electromagnetic force can be maximized. Each of the second-first magnet 2221 and the second-second magnet 2222 may be a 4-pole magnet in which the polarity of an upper surface of an inner surface is different from that of a lower surface of an inner surface and an upper surface of an outer surface, and the polarity of a lower surface of an outer surface is the same.

The second-third magnet 2223 may be a 2-pole magnetized magnet. The second-third magnet 2223 may be a 2-pole magnet. The second-third magnet 2223 may be a 2-pole magnet having different inner and outer polarities. For an example, an inner surface of the second-third magnet 2223 may have an N pole and an outer surface of the second-third magnet 2223 may have an S pole. Conversely, an inner surface of the second-third magnet 2223 may be an S pole and an outer surface of the second-third magnet 2223 may be an N pole. However, as a modified embodiment, the second-third magnet 2223 may be a 4-pole magnet. The second-third magnet 2223 may be formed larger than each of the second-first magnet 2221 and the second-second magnet 2222.

The second lens driving device 20 may comprise a dummy member 2230. The second mover 2200 may comprise a dummy member 2230. The dummy member 2230 may be disposed in the second housing 2210. The dummy member 2230 may be disposed in a first side portion of the second housing 2210. The dummy member 2230 may be disposed adjacent to the first lens driving device 10. Through this, magnetic force interference between the second lens driving device 20 and the first lens driving device 10 can be minimized. The dummy member 2230 may be disposed at a position corresponding to the first lateral plate 2342-1 of the second cover 2340.

The dummy member 2230 may have a weight corresponding to that of the second-third magnet 2223. The dummy member 2230 may have weaker magnetic force than the second-third magnet 2223 or may not have magnetic force. The dummy member 2230 may be disposed at an opposite side of the second-third magnet 2223 in the second housing 2210. The weight of the dummy member 2230 may correspond to the weight of the second-third magnet 2223. However, the dummy member 2230 may have a weight lighter than that of the second-third magnet 2223. Or, the dummy member 2230 may have a weight heavier than that of the second-third magnet 2223. The dummy member 2230 may be within 80% of the weight of the second-third magnet 2223 to 120% of the weight of the second-third magnet 2223. If the weight of the dummy member 2230 is less than the lower limit or exceeds the upper limit of the above-mentioned numerical value, the weight balancing of the OIS driving unit may collapse.

The dummy member 2230 may be a non-magnetic material. The dummy member 2230 may comprise a non-magnetic material. The magnetic strength of the dummy member 2230 may be weaker than that of the second-third magnet 2223. The dummy member 2230 may be disposed at an opposite side of the second-third magnet 2223 to align the center of gravity. The dummy member 2230 may be made of tungsten at least 95%. That is, the dummy member 2230 may be a tungsten alloy. For example, the specific gravity of the dummy member 2230 may be 18000 or more. The dummy member 2230 may be disposed at a position symmetrical to the second-third magnet 2223 with respect to the central axis of the second housing 2210. At this time, the central axis of the second housing 2210 may correspond to an optical axis. The dummy member 2230 may have a thickness corresponding to that of the second-third magnet 2223 in a direction perpendicular to the optical axis.

The second lens driving device 20 may comprise a yoke 2240. The second mover 2200 may comprise a yoke 2240. The yoke 1240 may be disposed in the first housing 2210. The yoke 2240 may be disposed in a first side portion of the first housing 2210. The yoke 2240 may be disposed adjacent to the first lens driving device 10. Through this, magnetic force interference between the first lens driving device 10 and the second lens driving device 20 can be minimized.

The second lens driving device 20 may comprise a stator 2300. The stator 2300 may be disposed below the first and second movers 2100 and 2200. The stator 2300 may movably support the second mover 2200. The stator 2300 may move the second mover 2200. At this time, the first mover 2100 can also move together with the second mover 2200.

The first lens driving device 10 may comprise a first base 1310. The stator 1300 may comprise a first base 1310. The first base 1310 may be disposed below the first housing 1210. The first base 1310 may be disposed below the first substrate 1320. The first substrate 1320 may be disposed on an upper surface of the first base 1310. The first base 1310 may be coupled to the first cover 1340. The first base 1310 may be disposed on the printed circuit board 30.

The second base 2310 may comprise a step 2311. The step 2311 may be formed on a side surface of the second base 2310. The step 2311 may be formed around an outer circumferential surface of the second base 2310. The step 2311 may be formed as a portion of a side surface of the second base 2310 is protruded or recessed. A lower end of the lateral plate 2342 of the cover member 2340 may be disposed at the step 2311.

The second base 2310 may comprise a hole 2312. The hole 2312 may be hollow. The hole 2312 may penetrate through the second base 2310 in an optical axis direction. A light passing through the second lens 42 through the hole 2312 may be incident to an image sensor.

The second base 2310 may comprise a protrusion 2313. The protrusion 2313 may be formed on an upper surface of the second base 2310. The protrusion 2313 may be protruded from an upper surface of the second base 2310. A fourth coil 2330 may be disposed in the protrusion 2313. The fourth coil 2330 may be wound around the protrusion 2313 and disposed.

The second lens driving device 20 may comprise a second substrate 2320. The stator 2300 may comprise a second substrate 2320. The second substrate 2320 may be disposed in the second base 2310. The second substrate 2320 may be disposed at one side of the second housing 2210. The second substrate 2320 may be disposed between the second base 2310 and the second housing 2210. The second substrate 2320 may be disposed at an upper surface of the second base 2310. The support member 2500 may be coupled to the second substrate 2320. The second substrate 2320 may be electrically connected to the support member 2500. One end of the support member 2500 may be fixed to the second substrate 2320. The second substrate 2320 may be coupled to the printed circuit board 30 being disposed below the second base 2310 by soldering. The second substrate 2320 may comprise a flexible printed circuit board (FPCB). The second substrate 2320 may be partially bent.

The second substrate 2320 may comprise a body part 2321. A hole may be formed in the body part 2321. The hole may be hollow penetrating the second substrate 2320 in an optical axis direction. The second substrate 2320 may comprise a hole. A support member 2500 may be disposed in the hole of the second substrate 2320. The support member 2500 may pass through the hole of the second substrate 2320.

The second substrate 2320 may comprise a terminal unit. The terminal unit may be extended from an edge of the body part 2321. The terminal unit may comprise a terminal electrically connected to the printed circuit board. The terminal unit may comprise a terminal being coupled to the printed circuit board. The terminal unit may comprise a plurality of terminal units.

The second substrate 2320 may comprise a first terminal unit 2322. The first terminal unit 2322 may be extended downward from the body part 2321 of the second substrate 2320. The first terminal unit 2322 may be formed by bending a part of the second substrate 2320. At least a portion of the first terminal unit 2322 may be exposed to the outside. The first terminal unit 2322 may be coupled to the printed circuit board 30 being disposed below the second base 2310 by soldering. The first terminal unit 2322 may be disposed in a groove of the first base 2310. The first terminal unit 2322 may comprise a plurality of terminals.

The second substrate 2320 may comprise a first terminal unit 2322 and a plurality of terminals being disposed in the first terminal unit 2322 and electrically connected to the printed circuit board 30. The first terminal unit 2322 of the second substrate 2320 may be disposed at a position corresponding to the first lateral plate 2342-1 of the second cover 2340. The first terminal unit 2322 of the second substrate 2320 may be disposed closest to the first lateral plate 2342-1 among the first to fourth lateral plates 2342-1, 2342-2, 2342-3, and 2342-4 of the second cover 2340.

The second substrate 2320 may comprise a second terminal unit 2323. The second terminal unit 2323 may be disposed at an opposite side of the first terminal unit 2322. The second terminal unit 2323 of the second substrate 2320 may be disposed at a position corresponding to the second lateral plate 2342-2 of the second cover 2340.

The second lens driving device 20 may comprise a fourth coil 2330. The stator 2300 may comprise a fourth coil 2330. The fourth coil 2330 may be an 'OIS coil'. The fourth coil 2330 may move the second bobbin 2110. The fourth coil 2330 may be disposed in the second base 2310. The fourth coil 2330 may be disposed in the second substrate 2320. The fourth coil 2330 may face the second magnet 2220. The fourth coil 2330 may interact with the second magnet 2220 electromagnetically. In this case, when a current is supplied to the fourth coil 2330 and a magnetic field is formed around the fourth coil 2330, the second magnet 2220 may move against the fourth coil 2330 due to electromagnetic interaction between the fourth coil 2330 and the second magnet 2220. The fourth coil 2330 may move the second housing 2210 and the second bobbin 2110 in a direction perpendicular to the optical axis with respect to the second base 2310 through electromagnetic interaction with the second magnet 2220. The second substrate 2320 may comprise a fourth coil 2330. That is, the fourth coil 2330 may be a configuration of the second substrate 2320. The fourth coil 2330 may be formed as a fine pattern coil (FP coil) in a substrate separate from the second substrate 2320.

The fourth coil 2330 may comprise a plurality of coils. The fourth coil 2330 may comprise a number of coils corresponding to those of the second magnet 2220. The fourth coil 2330 may comprise three coils. The fourth coil 2330 may comprise a fourth-first coil 2331, a fourth-second coil 2332, and a fourth-third coil 2333. The fourth-first coil 2331 may face the second-first magnet 2221. The fourth-second coil 2332 may face the second-second magnet 2222. The fourth-third coil 2333 may face the second-third magnet 2223.

The number of windings of the fourth-first coil 2331 may be greater than the number of windings of the fourth-second coil 2332 and the fourth-third coil 2333. The number of windings of the fourth-second coil 2332 may correspond to the number of windings of the fourth-third coil 2333. In a second embodiment of the present embodiment, during OIS driving, the movement in an X-axis direction is performed through the fourth-first coil 2331 and fourth-second coil 2332, and the movement in a Y-axis direction may be performed through the fourth-third coil 2333. Therefore, in a second embodiment of the present embodiment, the number of turns of the fourth-third coil 2333 may be higher than the number of turns of the fourth-first coil 2331 and the fourth-second coil 2332 to compensate for insufficient driving force in a Y-axis direction. For example, a ratio between the number of turns of the fourth-third coil 2333 and the number of turns of the fourth-first and fourth-second coil 2331 and 2332 may be 1.5:2.0 to 1:1. Ideally, the ratio of the number of turns of the fourth-third coil 2333 to the number of turns of the fourth-first and fourth-second coil 2331 and 2332 is 1:1, but it can be disposed up to 1.5:2.0 due to space constraints.

The second lens driving device 20 may comprise a second cover 2340. The stator 2300 may comprise a second cover 2340. The second cover 2340 may comprise a 'cover can'. The second cover 2340 may comprise a yoke. The second cover 2340 may be disposed outside the second housing 2210. The second cover 2340 may be coupled to the second base 2310. The second cover 2340 may accommodate the second housing 2210 therein. The second cover 2340 may form the outer appearance of the second lens driving device 20. The second cover 2340 may have a hexahedral shape with an open lower surface. The second cover 2340 may be made of a non-magnetic material. The second cover 2340 may be formed of a metal material. The second cover 2340 may be formed of a metal plate. The second cover 2340 may be connected to the ground portion of the printed circuit board 30. Through this, the second cover 2340 may be grounded. The second cover 2340 may block electromagnetic interference (EMI). At this time, the second cover 2340 may be referred to as an 'EMI shield can'.

The second cover 2340 may comprise an upper plate 2341 and a lateral plate 2342. The second cover 2340 may comprise an upper plate 2341 comprising a hole and a lateral plate 2342 being extended downward from an outer circumference or edge of the upper plate 2341. The lower end of the lateral plate 2342 of the second cover 2340 may be disposed in the step 2311 of the second base 2310. An inner surface of the lateral plate 2342 of the second cover 2340 may be fixed to the second base 2310 by an adhesive.

The lateral plate 2342 of the second cover 2340 may comprise a plurality of lateral plates. The lateral plate 2342 may comprise four lateral plates. The lateral plate 2342 of the second cover 2340 may comprise: a first lateral plate 2342-1 and a second lateral plate 2342-2 being disposed at an opposite side to each other; and a third lateral plate 2342-3 and a fourth lateral plate 2342-4 being disposed at an opposite side to each other. The first terminal unit 2322 of the second substrate 2320 may be disposed at a position corresponding to the first lateral plate 2342-1 of the second cover 2340. The second terminal unit 2323 of the second substrate 2320 may be disposed at a position corresponding to the second lateral plate 2342-2 of the second cover 2340.

The second cover 2340 may comprise a groove 2343. The groove 2343 may be formed in the lateral plate 2342 of the second cover 2340. The groove 2343 may be formed at a lower end of the lateral plate 2342. The groove 2343 may be formed at a position corresponding to at least one of the first terminal unit 2322 and the second terminal unit 2323. The groove 2343 may be formed to expose at least one of the first terminal unit 2322 and the second terminal unit 2323 to the outside.

The second lens driving device 20 may comprise a terminal 2350. The stator 2300 may comprise a terminal 2350. The terminal 2350 may be disposed in the second base 2310. The terminal 2350 may be electrically connected to the second substrate 2320. The terminal 2350 may be coupled to the support member 2500. The terminal 2350 may electrically connect the support member 2500 and the second substrate 2320.

The second lens driving device 20 may comprise an elastic member 2400. The elastic member 2400 may be an 'AF support member'. At least a portion of the elastic member 2400 may have elasticity. The elastic member 2400 may be formed of metal. The elastic member 2400 may be formed of a conductive material. The elastic member 2400 may connect the second bobbin 2110 and the second housing 2210. The elastic member 2400 may elastically connect the second bobbin 2110 and the second housing 2210. The elastic member 2400 may be coupled to the second bobbin 2110 and the second housing 2210. The elastic member 2400 may elastically support the second bobbin 2110. The elastic member 2400 may movably support the second bobbin 2110. The elastic member 2400 may support the movement of the second bobbin 2110 during AF driving.

The elastic member 2400 may comprise a first elastic member 2410. The first elastic member 2410 may be an 'upper elastic member'. The first elastic member 2410 may connect the second housing 2210 and the second bobbin 2110. The first elastic member 2410 may be coupled to an upper portion of the second bobbin 2110 and an upper portion of the second housing 2210. The first elastic member 2410 may be coupled to an upper surface of the second bobbin 2110. The first elastic member 2410 may be coupled to an upper surface of the second housing 2210. The first elastic member 2410 may be coupled to the support member 2500. The first elastic member 2410 may be formed of a leaf spring. The first elastic member 2410 can be separated and used as a power line for electrical or communication signal.

The first elastic member 2410 may comprise a plurality of elastic units. The first elastic member 2410 may comprise three elastic units. The first elastic member 2410 may comprise first to third elastic units 2410-1, 2410-2, and 2410-3. The first elastic unit 2410-1 may connect the support member 2500 and one end of the third-first coil 2121. The second elastic unit 2410-2 may connect the other end of the third-first coil 2121 and one end of the third-second coil 2122. The third elastic unit 2410-3 may connect the other end of the third-second coil 2122 and the support member 2500. The first elastic member 2410 may be electrically connected to the third coil 2120. The first elastic member 2410 may electrically connect the third coil 2120 and the support member 2500.

The first elastic member 2410 may comprise an outer side portion 2411. The outer side portion 2411 may be coupled to the second housing 2210. The outer side portion 2411 may be coupled to an upper surface of the second housing 2210. The outer side portion 2411 may comprise a hole or groove coupled to the protrusion of the second housing 2210. The outer side portion 2411 may be fixed to the second housing 2210 by an adhesive.

The first elastic member 2410 may comprise an inner side portion 2412. The inner side portion 2412 may be coupled to the second bobbin 2110. The inner side portion 2412 may be coupled to an upper surface of the second bobbin 2110. The inner side portion 2412 may comprise a hole or groove being coupled to a protrusion of the second bobbin 2110. The inner side portion 2412 may be fixed to the second bobbin 2110 by an adhesive.

The first elastic member 2410 may comprise a connecting portion 2413. The connecting portion 2413 may connect the inner side portion 2412 and the outer side portion 2411. The connecting portion 2413 may have elasticity. At this time, the connecting portion 2413 may be referred to as an 'elastic portion'. The connecting portion 2413 may comprise a shape bent two or more times.

The first elastic member 2410 may comprise a connecting portion 2414. The connecting portion 2414 may be extended from the outer side portion 2411. The connecting portion 2414 may be coupled to the support member 2500. The connecting portion 2414 and the support member 2500 may be coupled by soldering.

The elastic member 2400 may comprise a second elastic member 2420. The second elastic member 2420 may be a 'lower elastic member'. The second elastic member 2420 may be disposed below the first elastic member 2410. The second elastic member 2420 may be disposed on one side of the first elastic member 2410. The second elastic member 2420 may connect the second housing 2210 and the second bobbin 2110. The second elastic member 2420 may be disposed below the second bobbin 2110. The second elastic member 2420 may be coupled to the second bobbin 2110 and the second housing 2210. The second elastic member 2420 may be coupled to a lower surface of the second bobbin 2110. The second elastic member 2420 may be coupled to a lower surface of the second housing 2210. The second elastic member 2420 may be formed of a leaf spring. The second elastic member 2420 may be integrally formed.

The second elastic member 2420 may comprise an outer side portion 2421. The outer side portion 2421 may be coupled to the second housing 2210. The outer side portion 2421 may be coupled to a lower surface of the second housing 2210. The outer side portion 2421 may comprise a hole or groove being coupled to a protrusion of the second housing 2210. The outer side portion 2421 may be fixed to the second housing 2210 by an adhesive.

The second elastic member 2420 may comprise an inner side portion 2422. The inner side portion 2422 may be coupled to the second bobbin 2110. The inner side portion 2422 may be coupled to a lower surface of the second bobbin 2110. The inner side portion 2422 may comprise a hole or groove being coupled to a protrusion of the second bobbin 2110. The inner side portion 2422 may be fixed to the second bobbin 2110 by an adhesive.

The second elastic member 2420 may comprise a connecting portion 2423. The connecting portion 2423 may connect the inner side portion 2422 and the outer side portion 2421. The connecting portion 2423 may have elasticity. At this time, the connecting portion 2423 may be referred to as an 'elastic portion'. The connecting portion 2423 may comprise a shape bent two or more times.

The second lens driving device 20 may comprise a support member 2500. The support member 2500 may be an 'OIS support member'. The support member 2500 may connect the first elastic member 2410 and the second substrate 2320 or the first elastic member 2410 and the terminal 2350. The support member 2500 may be coupled to an upper surface of the first elastic member 2410 and the terminal 2350. The support member 2500 may movably support the second housing 2210. The support member 2500 may elastically support the second housing 2210. At least a portion of the support member 2500 may have elasticity. The support member 2500 may elastically support the movement of the second housing 2210 and the second bobbin 2110 during OIS driving. One end portion of the support member 2500 may be coupled to the first elastic member 2410 by soldering. The other end portion of the support member 2500 may be coupled to the terminal 2350 by soldering.

The support member 2500 may comprise a plurality of wires. The support member 2500 may comprise 4 wires. The plurality of wires may comprise four wires connecting the three first elastic units 410-1, 410-2, and 410-3 and the second substrate 2320. As a modified embodiment, support member 2500 may be formed as a leaf spring.

The second lens driving device 20 may comprise a first sensor 2610. The first sensor 2610 may be disposed in the second base 2310. The first sensor 2610 may detect the sensing magnet 2130. The first sensor 2610 may be disposed in the second substrate 2320. The first sensor 2610 may be coupled to a lower surface of the second substrate 2320. The first sensor 2610 may be spaced apart from the second housing 2210. The first sensor 2610 may be spaced apart from the second bobbin 2110. The first sensor 2610 may be overlapped with the sensing magnet 2130 in an optical axis direction. The first sensor 2610 may detect the position of the sensing magnet 2130 for AF feedback control. The first sensor 2610 may be a Hall IC, a Hall element, or a Hall sensor. The first sensor 2610 may detect the magnetic force of the sensing magnet 2130.

The second lens driving device 20 may comprise a second sensor 2620. The second sensor 2620 may be disposed between the second base 2310 and the second substrate 2320. The second sensor 2620 may detect the movement of the second mover 2300. The second sensor 2620 may detect the movement of the second housing 2210 and the second magnet 2220 by detecting the magnetic force of the second magnet 2220. A detection value detected by the second sensor 2620 may be used for OIS feedback control. The second sensor 2620 may comprise a plurality of Hall sensors. The second sensor 2620 may comprise two Hall sensors. The second sensor 2620 may comprise a first Hall sensor for detecting the movement in an x-axis direction in the horizontal direction and a second Hall sensor for detecting movement in a y-axis direction in the horizontal direction.

The second lens driving device 20 may comprise a damper. The damper may be disposed in the support member 2500. The damper may be disposed in the support member 2500 and the second housing 2210. The damper may be disposed in the elastic member. The damper may be disposed in the elastic member 2400 and/or the support member 2500 to prevent a resonance phenomenon generated in the elastic member 2400 and/or the support member 2500.

Hereinafter, a configuration of a camera device according to a modified embodiment will be described with reference to drawings. Hereinafter, differences from the second embodiment of the present embodiment will be mainly described, and the description of the second embodiment of the present embodiment can be applied in analogy to the parts that has not been explained.

Figure 34:
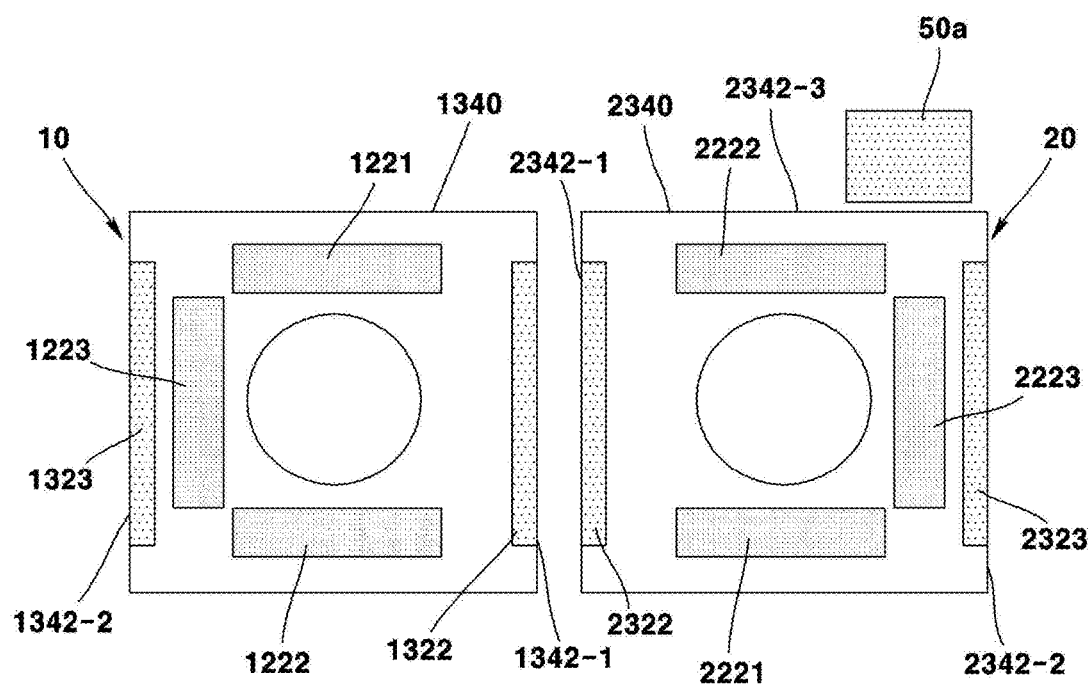
FIG. 34 is a schematic diagram of a camera device according to a first modified embodiment.

FIG. 34 is a schematic diagram of a camera device according to a first modified embodiment.

In a first modified embodiment, the gyro sensor 50a may be disposed adjacent to the second lens driving device 20. The gyro sensor 50a may be disposed adjacent to the third lateral plate 2342-3 of the second cover 2340 of the second lens driving device 20. The gyro sensor 50a may be disposed closer to the second lens driving device 20 than to the first lens driving device 10. The gyro sensor 50a may be disposed to be closest to the third lateral plate 2342-3 among the first to fourth lateral plates 2342-1, 2342-2, 2342-3, and 2342-4 of the second cover 2340. The gyro sensor 50a may be disposed to be closer to the second lateral plate 2342-2 than to the first lateral plate 2342-1.

Figure 35:
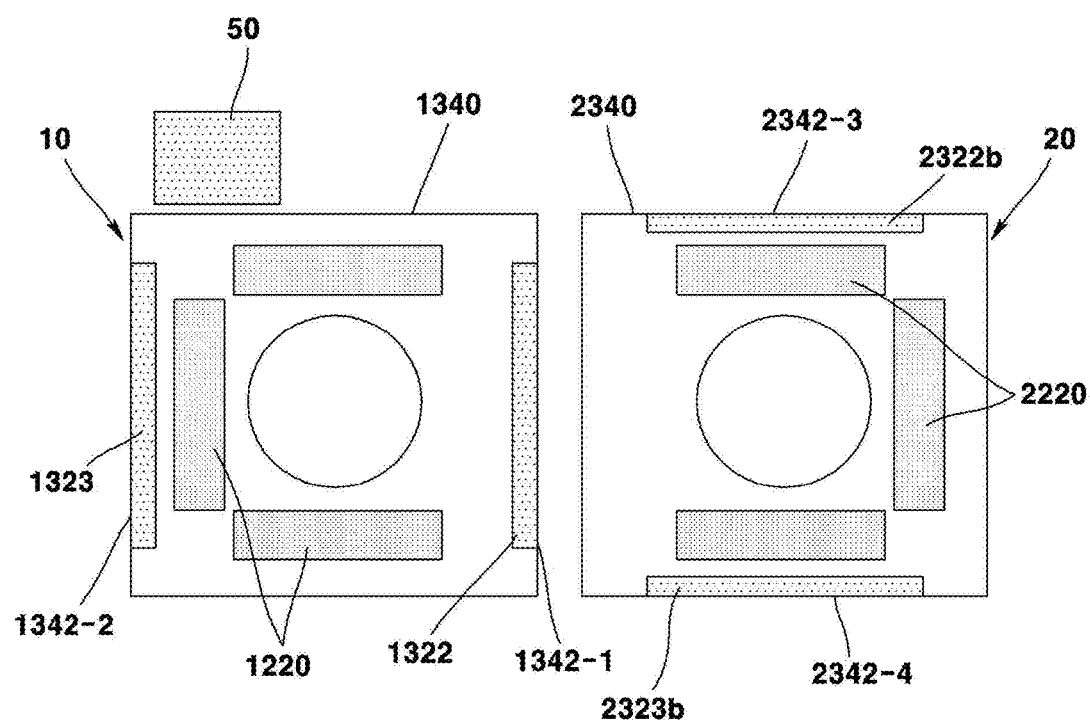
FIG. 35 is a schematic diagram of a camera device according to a second modified embodiment.

FIG. 35 is a schematic diagram of a camera device according to a second modified embodiment.

In a second modified embodiment, the second substrate 2320 may comprise a first terminal unit 2322b being disposed at a position corresponding to the third lateral plate 2342-3 of the second cover 2340. The first terminal unit 2322b may be disposed to be closest to the third lateral plate 2342-3 among the first to fourth lateral plates 2342-1, 2342-2, 2342-3, and 2342-4 of the second cover 2340. The first terminal unit 2322b may be disposed in a third side surface of the second base 2310. The first terminal unit 2322b may be extended from an edge of the third region of the body part 2321 of the second substrate 2320.

The second substrate 2320 may comprise a second terminal unit 2323b being disposed at a position corresponding to the fourth lateral plate 2342-4 of the second cover 2340. The second terminal unit 2323b may be disposed to be closest to the fourth lateral plate 2342-4 among the first to fourth lateral plates 2342-1, 2342-2, 2342-3, and 2342-4 of the second cover 2340. The second terminal unit 2323b may be disposed on a fourth side surface of the second base 2310. The second terminal unit 2323b may be extended from an edge of a fourth region of the body part 2321 of the second substrate 2320.

Figure 36:
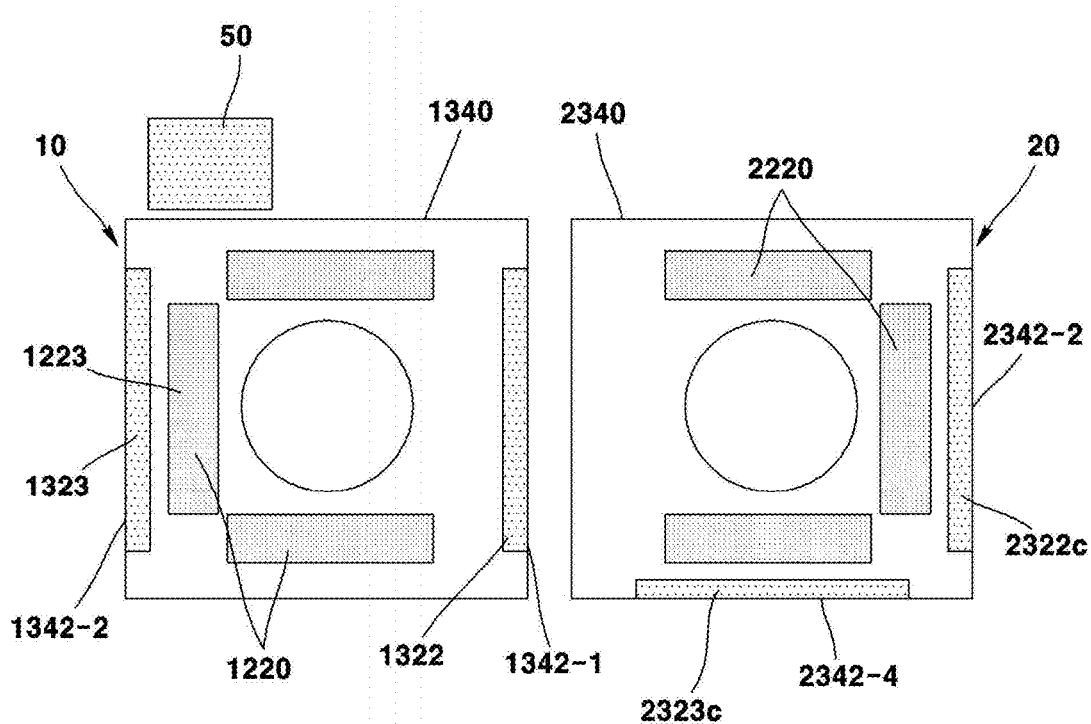
FIG. 36 is a schematic diagram of a camera device according to a third modified embodiment.

FIG. 36 is a schematic diagram of a camera device according to a third modified embodiment.

In a second modified embodiment, the second substrate 2320 may comprise a first terminal unit 2322c being disposed at a position corresponding to the second lateral plate 2342-2 of the second cover 2340. The first terminal unit 2322c may be disposed to be closest to the second lateral plate 2342-2 among the first to fourth lateral plates 2342-1, 2342-2, 2342-3, and 2342-4 of the second cover 2340. The first terminal unit 2322c may be disposed on a second side surface of the second base 2310. The first terminal unit 2322c may be extended from an edge of a second region of the body part 2321 of the second substrate 2320.

The second substrate 2320 may comprise a second terminal unit 2323c being disposed at a position corresponding to the fourth lateral plate 2342-4 of the second cover 2340. The second terminal unit 2323c may be disposed to be closest to the fourth lateral plate 2342-4 among the first to fourth lateral plates 2342-1, 2342-2, 2342-3, and 2342-4 of the second cover 2340. The second terminal unit 2323c may be disposed on the fourth side surface of the second base 2310. The second terminal unit 2323c may be extended from an edge of a fourth region of the body part 2321 of the second substrate 2320.

Figure 37:
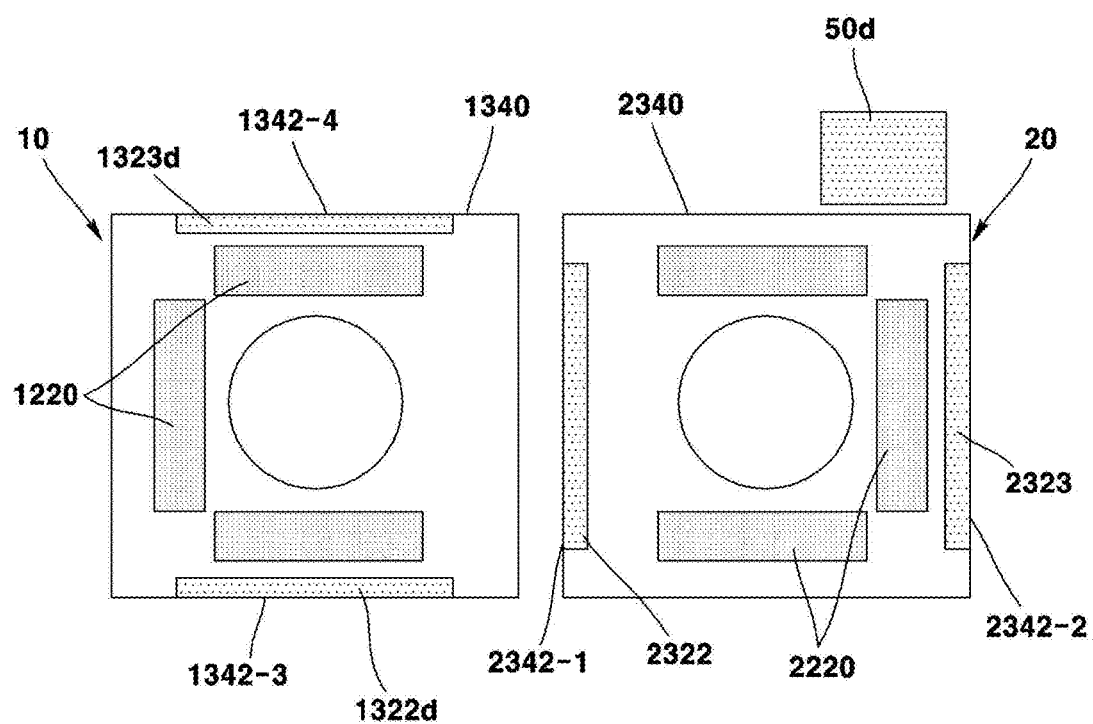
FIG. 37 is a schematic diagram of a camera device according to a fourth modified embodiment.

FIG. 37 is a schematic diagram of a camera device according to a fourth modified embodiment.

In a fourth modified embodiment, the gyro sensor 50d may be disposed adjacent to the second lens driving device 20. The gyro sensor 50d may be disposed adjacent to the third lateral plate 2342-3 of the second cover 2340 of the second lens driving device 20. The gyro sensor 50d may be disposed to be closer to the second lens driving device 20 than to the first lens driving device 10. The gyro sensor 50d may be disposed to be closest to the third lateral plate 2342-3 among the first to fourth lateral plates 2342-1, 2342-2, 2342-3, and 2342-4 of the second cover 2340. The gyro sensor 50d may be disposed to be closer to the second lateral plate 2342-2 than to the first lateral plate 2342-1.

The first substrate 1320 may comprise a first terminal unit 1322d being disposed at a position corresponding to the third lateral plate 1342-3 of the first cover 1340. The first terminal unit 1322d may be disposed closest to the third lateral plate 1342-3 among the first to fourth lateral plates 1342-1, 1342-2, 1342-3, and 1342-4 of the first cover 1340. The first terminal unit 1322d may be disposed on a third side surface of the first base 1310. The first terminal unit 1322d may be extended from an edge of a third region of the body part 1321 of the first substrate 1320.

The first substrate 1320 may comprise a second terminal unit 1323d being disposed at a position corresponding to the fourth lateral plate 1342-4 of the first cover 1340. The second terminal unit 1323d may be disposed to be closest to the fourth lateral plate 1342-4 among the first to fourth lateral plates 1342-1, 1342-2, 1342-3, and 1342-4 of the first cover 1340. The second terminal unit 1323d may be disposed on a fourth side surface of the first base 1310. The second terminal unit 1323d may be extended from an edge of a fourth region of the body part 1321 of the first substrate 1320.

Figure 38:
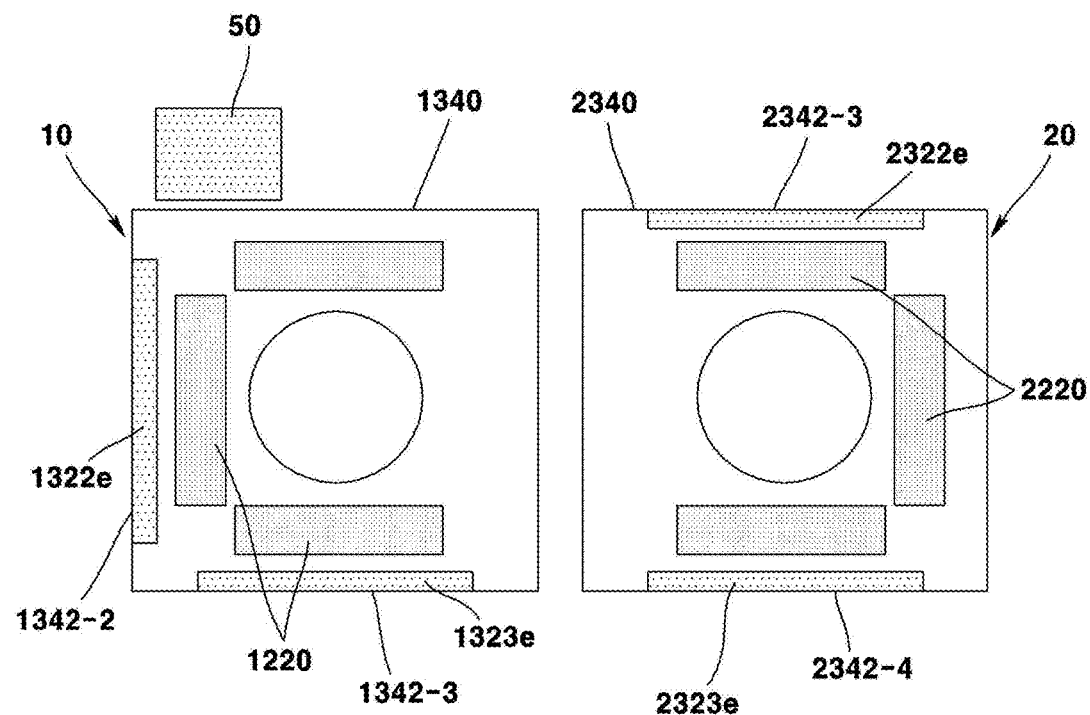
FIG. 38 is a schematic diagram of a camera device according to a fifth modified embodiment.

FIG. 38 is a schematic diagram of a camera device according to a fifth modified embodiment.

In a fifth modified embodiment, the first substrate 1320 may comprise a first terminal unit 1322e being disposed at a position corresponding to the second lateral plate 1342-2 of the first cover 1340. The first substrate 1320 may comprise a second terminal unit 1323e being disposed at a position corresponding to the third lateral plate 1342-3 of the first cover 1340. The second substrate 2320 may comprise a first terminal unit 2322e being disposed at a position corresponding to the third lateral plate 2342-3 of the second cover 2340. The second substrate 2320 may comprise a second terminal unit 2323e being disposed at a position corresponding to the fourth lateral plate 2342-4 of the second cover 2340.

Figure 39:
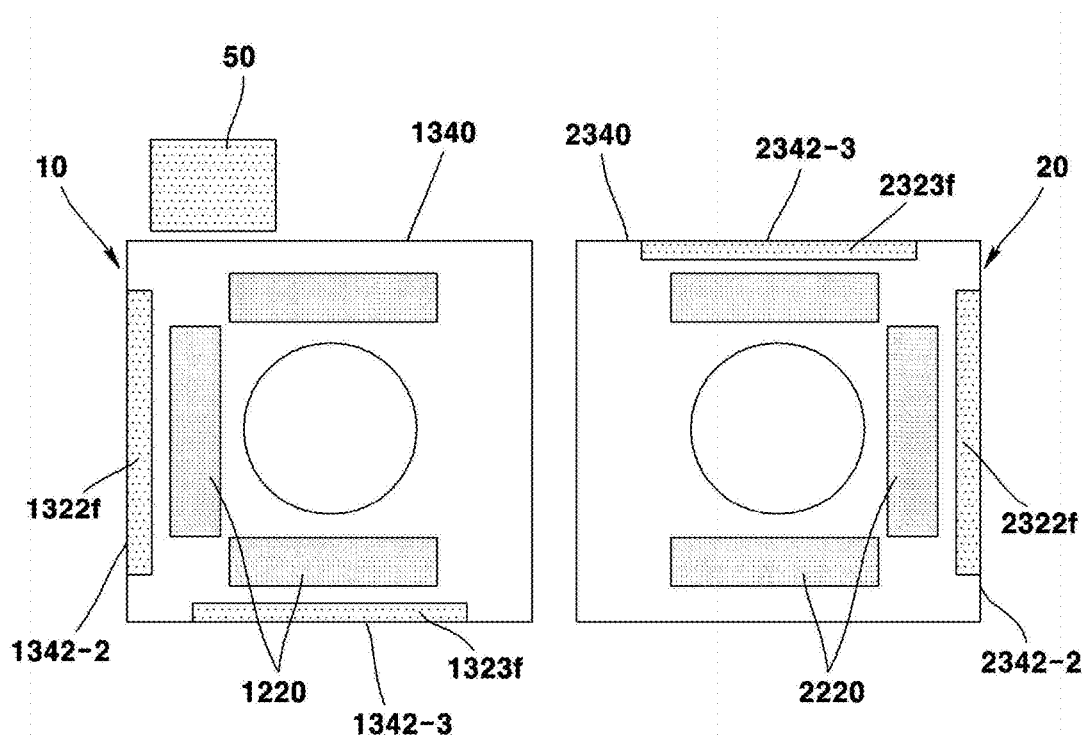
FIG. 39 is a schematic diagram of a camera device according to a sixth modified embodiment.

FIG. 39 is a schematic diagram of a camera device according to a sixth modified embodiment.

In a sixth modified embodiment, the first substrate 1320 may comprise a first terminal unit 1322f being disposed at a position corresponding to the second lateral plate 1342-2 of the first cover 1340. The first substrate 1320 may comprise a second terminal unit 1323f being disposed at a position corresponding to the third lateral plate 1342-3 of the first cover 1340. The second substrate 2320 may comprise a first terminal unit 2322f being disposed at a position corresponding to the second lateral plate 2342-2 of the second cover 2340. The second substrate 2320 may comprise a second terminal unit 2323f being disposed at a position corresponding to the third lateral plate 2342-3 of the second cover 2340.

Figure 40:
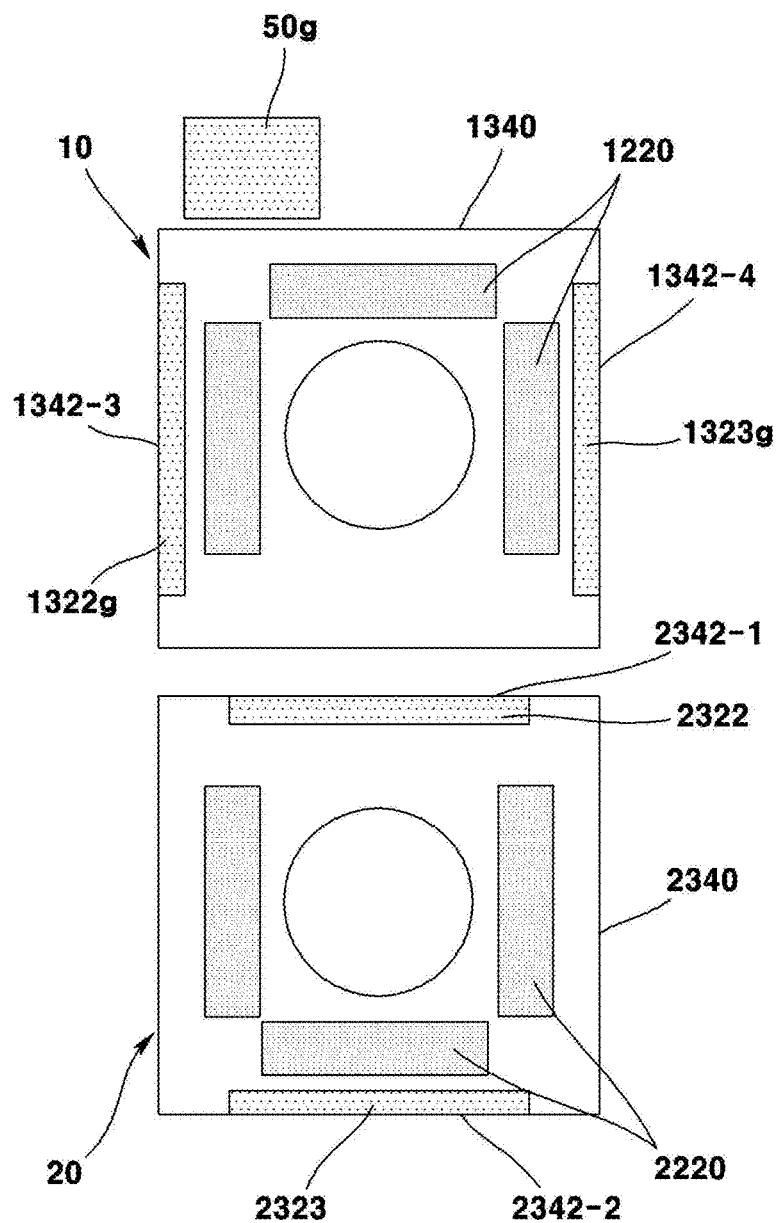
FIG. 40 is a schematic diagram of a camera device according to a seventh modified embodiment.

FIG. 40 is a schematic diagram of a camera device according to a seventh modified embodiment.

In a seventh modified embodiment, the gyro sensor 50g may be disposed adjacent to the second lateral plate 2342-2 of the first cover 1340 of the first lens driving device 10. The gyro sensor 50g may be disposed to be closest to the second lateral plate 2342-2 among the first to fourth lateral plates 1342-1, 1342-2, 1342-3, and 1342-4 of the first cover 1340. The gyro sensor 50g may be disposed to be closer to the third lateral plate 2342-3 than to the fourth lateral plate 2342-4.

The first substrate 1320 may comprise a first terminal unit 1322g being disposed at a position corresponding to the third lateral plate 1342-3 of the first cover 1340. The first substrate 1320 may comprise a second terminal unit 1323g being disposed at a position corresponding to the fourth lateral plate 1342-4 of the first cover 1340. The second substrate 2320 may comprise a first terminal unit 2322g being disposed at a position corresponding to the first lateral plate 2342-1 of the second cover 2340. The second substrate 2320 may comprise a second terminal unit 2323g being disposed at a position corresponding to the second lateral plate 2342-2 of the second cover 2340.

Figure 41:
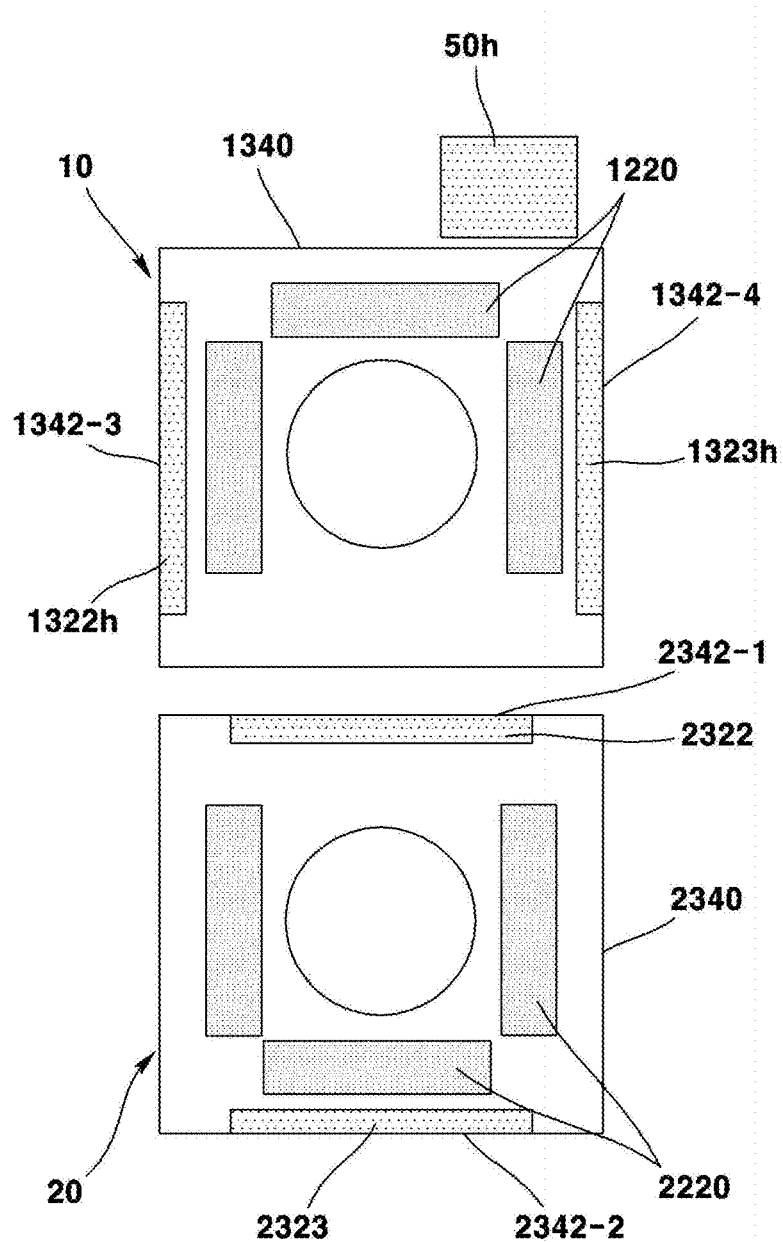
FIG. 41 is a schematic diagram of a camera device according to an eighth modified embodiment.

FIG. 41 is a schematic diagram of a camera device according to an eighth modified embodiment.

In an eighth modified embodiment, the gyro sensor 50h may be disposed adjacent to the second lateral plate 2342-2 of the first cover 1340 of the first lens driving device 10. The gyro sensor 50h may be disposed to be closest to the second lateral plate 2342-2 among the first to fourth lateral plates 1342-1, 1342-2, 1342-3, and 1342-4 of the first cover 1340. The gyro sensor 50h may be disposed to be closer to the fourth lateral plate 2342-4 than to the third lateral plate 2342-3.

The first substrate 1320 may comprise a first terminal unit 1322h being disposed at a position corresponding to the third lateral plate 1342-3 of the first cover 1340. The first substrate 1320 may comprise a second terminal unit 1323h being disposed at a position corresponding to the fourth lateral plate 1342-4 of the first cover 1340. The second substrate 2320 may comprise a first terminal unit 2322h being disposed at a position corresponding to the first lateral plate 2342-1 of the second cover 2340. The second substrate 2320 may comprise a second terminal unit 2323h being disposed at a position corresponding to the second lateral plate 2342-2 of the second cover 2340.

Figure 42:
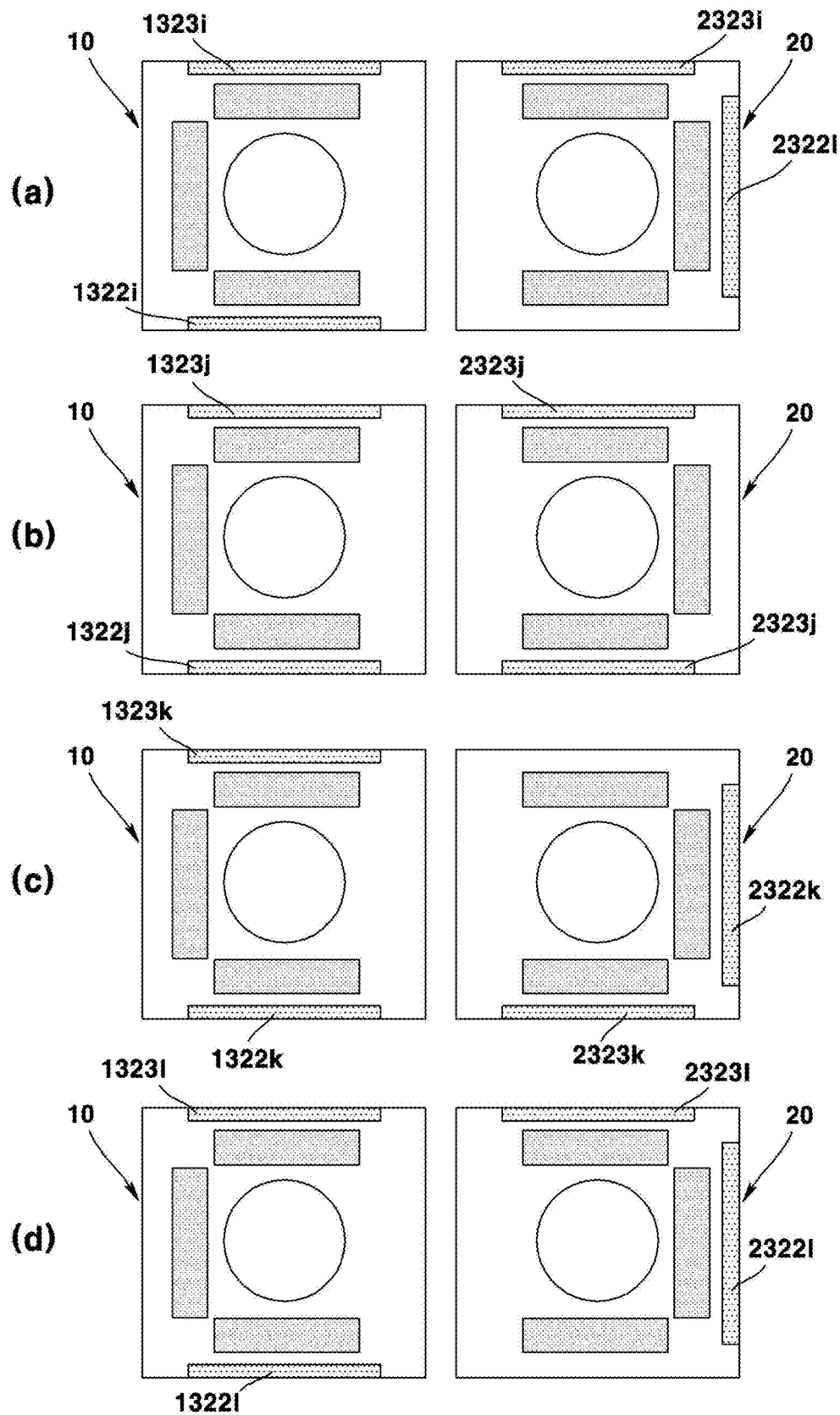
FIGS. 42 (*a*) to (*d*), 43 (*a*) to (*d*) and 44 (*a*) to (*d*) are schematic diagrams of camera devices according to other modified embodiments.
Figure 43:
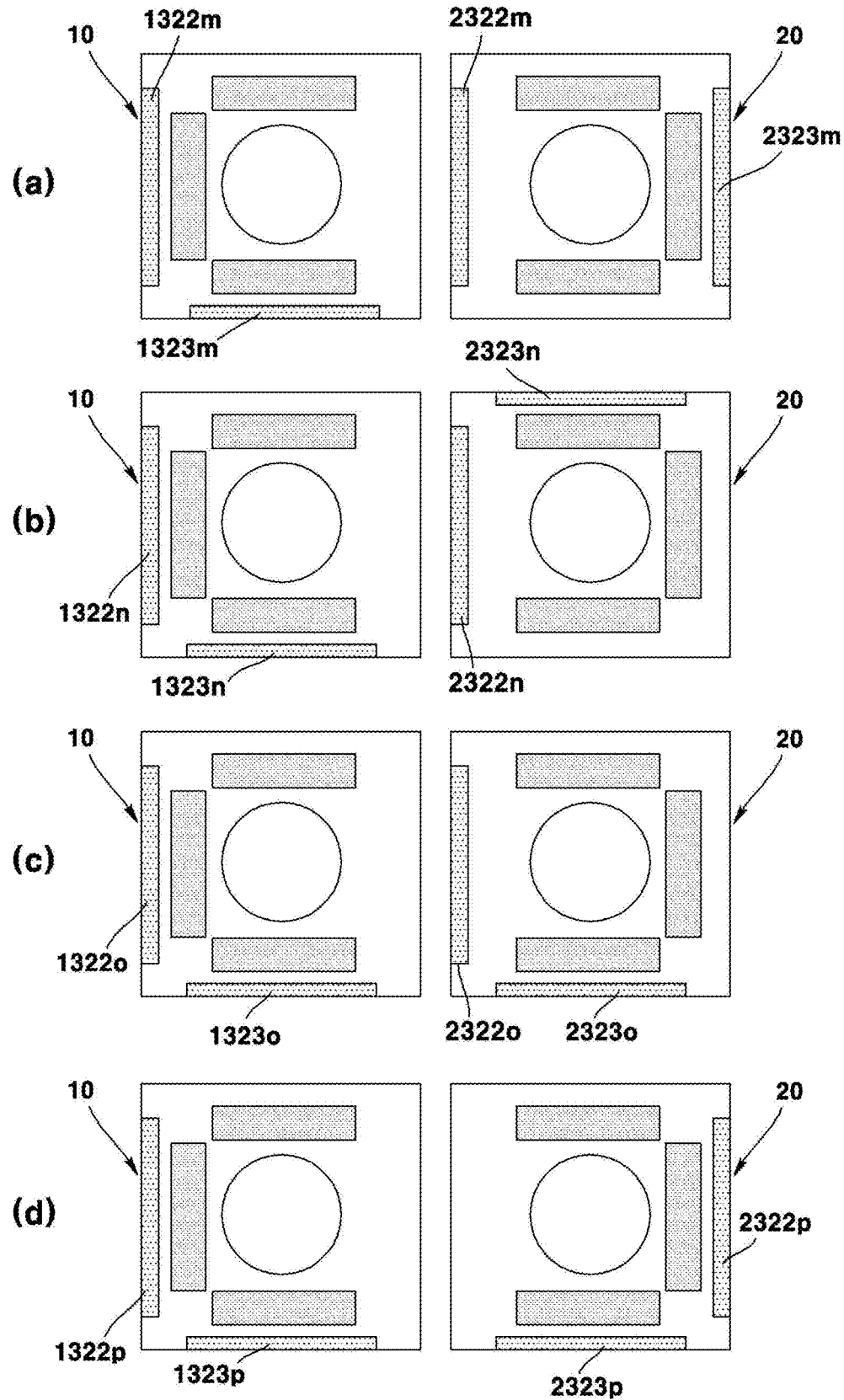
Figure 44:
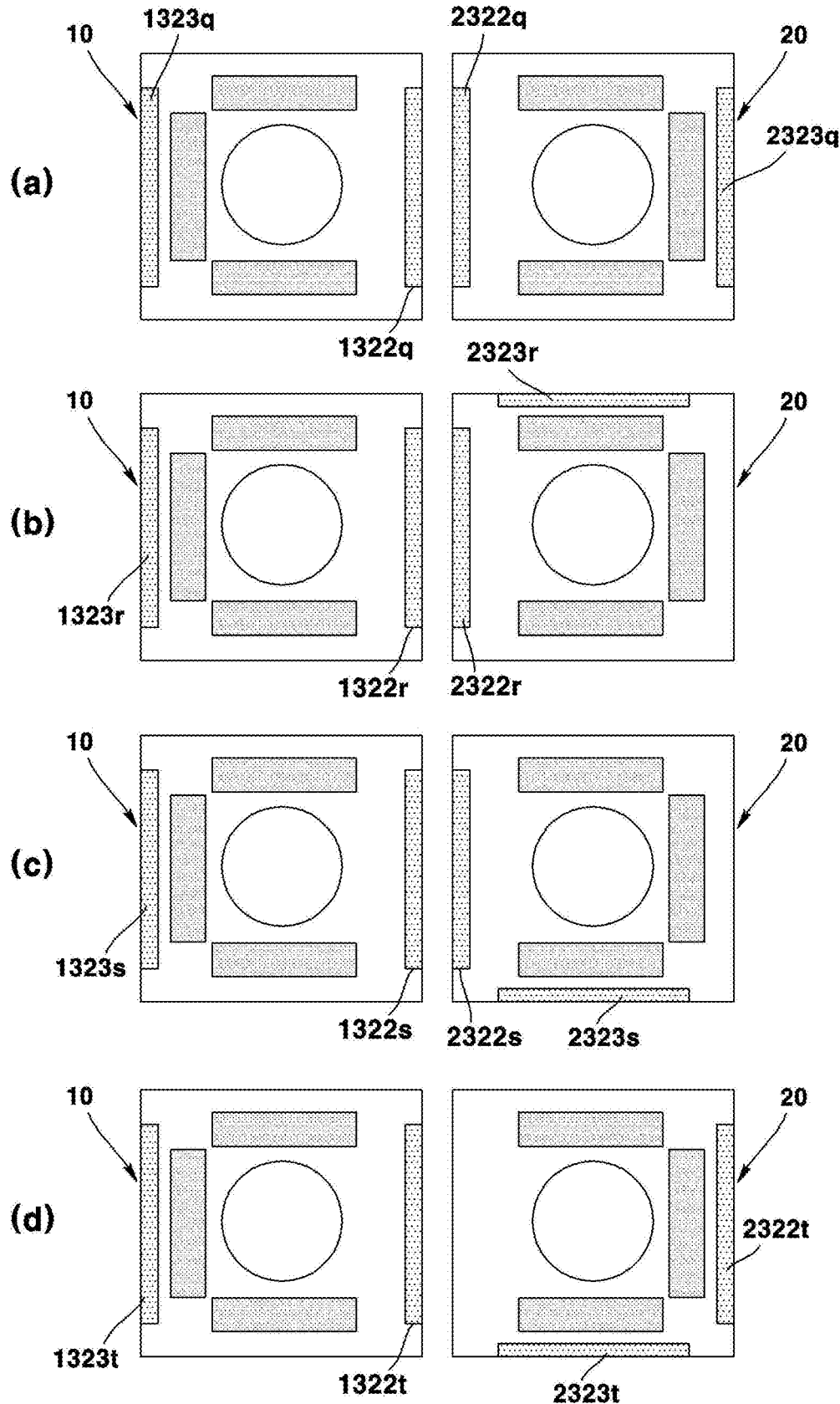

FIGS. 42, 43 and 44 are schematic diagrams of a camera device according to other modified embodiments.

In FIG. 42 (a), in the first lens driving device 10, the first terminal unit 1322i is disposed at a position corresponding to the third lateral plate 1342-3 of the first cover 1340, and the second terminal unit 1323i may be disposed at a position corresponding to the fourth lateral plate 1342-4 of the first cover 1340. In the second lens driving device 20, the first terminal unit 2322i is disposed at a position corresponding to the second lateral plate 2342-2 of the second cover 2340, and the second terminal unit 2323i may be disposed at a position corresponding to the third lateral plate 2342-3 of the second cover 2340.

In FIG. 42 (b), in the first lens driving device 10, the first terminal unit 1322j is disposed at a position corresponding to the third lateral plate 1342-3 of the first cover 1340, and the second terminal unit 1323j may be disposed at a position corresponding to the fourth lateral plate 1342-4 of the first cover 1340. In the second lens driving device 20, the first terminal unit 2322j is disposed at a position corresponding to the third lateral plate 2342-3 of the second cover 2340, and the second terminal unit 2323j may be disposed at a position corresponding to the fourth lateral plate 2342-4 of the second cover 2340.

In FIG. 42 (c), in the first lens driving device 10, the first terminal unit 1322k is disposed at a position corresponding to the third lateral plate 1342-3 of the first cover 1340, and the second terminal unit 1323k may be disposed at a position corresponding to the fourth lateral plate 1342-4 of the first cover 1340. In the second lens driving device 20, the first terminal unit 2322k is disposed at a position corresponding to the second lateral plate 2342-2 of the second cover 2340, and the second terminal unit 2323k may be disposed at a position corresponding to the fourth lateral plate 2342-4 of the second cover 2340.

In FIG. 42 (d), in the first lens driving device 10, the first terminal unit 1322l is disposed at a position corresponding to the third lateral plate 1342-3 of the first cover 1340, and the second terminal unit 1323l may be disposed at a position corresponding to the fourth lateral plate 1342-4 of the first cover 1340. In the second lens driving device 20, the first terminal unit 2322l is disposed at a position corresponding to the second lateral plate 2342-2 of the second cover 2340, and the second terminal unit 2323l may be disposed at a position corresponding to the third lateral plate 2342-3 of the second cover 2340.

In FIG. 43 (a), in the first lens driving device 10, the first terminal unit 1322m is disposed at a position corresponding to the second lateral plate 1342-2 of the first cover 1340, and the second terminal unit 1323m may be disposed at a position corresponding to the third lateral plate 1342-3 of the first cover 1340. In the second lens driving device 20, the first terminal unit 2322m is disposed at a position corresponding to the first lateral plate 2342-1 of the second cover 2340, and the second terminal unit 2323m may be disposed at a position corresponding to the second lateral plate 2342-2 of the second cover 2340.

In FIG. 43 (b), in the first lens driving device 10, the first terminal unit 1322n is disposed at a position corresponding to the second lateral plate 1342-2 of the first cover 1340, and the second terminal unit 1323n may be disposed at a position corresponding to the third lateral plate 1342-3 of the first cover 1340. In the second lens driving device 20, the first terminal unit 2322n is disposed at a position corresponding to the first lateral plate 2342-1 of the second cover 2340, and the second terminal unit 2323n may be disposed at a position corresponding to the third lateral plate 2342-3 of the second cover 2340.

In FIG. 43 (c), in the first lens driving device 10, the first terminal unit 1322o is disposed at a position corresponding to the second lateral plate 1342-2 of the first cover 1340, and the second terminal unit 1323o may be disposed at a position corresponding to the third lateral plate 1342-3 of the first cover 1340. In the second lens driving device 20, the first terminal unit 2322o is disposed at a position corresponding to the first lateral plate 2342-1 of the second cover 2340, and the second terminal unit 2323o may be disposed at a position corresponding to the fourth lateral plate 2342-4 of the second cover 2340.

In FIG. 43 (d), in the first lens driving device 10, the first terminal unit 1322p is disposed at a position corresponding to the second lateral plate 1342-2 of the first cover 1340, and the second terminal unit 1323p may be disposed at a position corresponding to the third lateral plate 1342-3 of the first cover 1340. In the second lens driving device 20, the first terminal unit 2322p is disposed at a position corresponding to the second lateral plate 2342-2 of the second cover 2340, and the second terminal unit 2323*p* may be disposed at a position corresponding to the fourth lateral plate 2342-4 of the second cover 2340.

In FIG. 29 (*a*), in the first lens driving device 10, the first terminal unit 1322*q* is disposed at a position corresponding to the first lateral plate 1342-1 of the first cover 1340, and the second terminal unit 1323*q* may be disposed at a position corresponding to the second lateral plate 1342-2 of the first cover 1340. In the second lens driving device 20, the first terminal unit 2322*q* is disposed at a position corresponding to the first lateral plate 2342-1 of the second cover 2340, and the second terminal unit 2323*q* may be disposed at a position corresponding to the second lateral plate 2342-2 of the second cover 2340.

In FIG. 29 (*b*), in the first lens driving device 10, the first terminal unit 1322*r* is disposed at a position corresponding to the first lateral plate 1342-1 of the first cover 1340, and the second terminal unit 1323*r* may be disposed at a position corresponding to the second lateral plate 1342-2 of the first cover 1340. In the second lens driving device 20, the first terminal unit 2322*r* is disposed at a position corresponding to the first lateral plate 2342-1 of the second cover 2340, and the second terminal unit 2323*r* may be disposed at a position corresponding to the third lateral plate 2342-3 of the second cover 2340.

In FIG. 29 (*c*), in the first lens driving device 10, the first terminal unit 1322*s* is disposed at a position corresponding to the first lateral plate 1342-1 of the first cover 1340, and the second terminal unit 1323*s* may be disposed at a position corresponding to the second lateral plate 1342-2 of the first cover 1340. In the second lens driving device 20, the first terminal unit 2322*s* is disposed at a position corresponding to the first lateral plate 2342-1 of the second cover 2340, and the second terminal unit 2323*s* may be disposed at a position corresponding to the fourth lateral plate 2342-4 of the second cover 2340.

In FIG. 29 (*d*), in the first lens driving device 10, the first terminal unit 1322*t* is disposed at a position corresponding to the first lateral plate 1342-1 of the first cover 1340, and the second terminal unit 1323*t* may be disposed at a position corresponding to the second lateral plate 1342-2 of the first cover 1340. In the second lens driving device 20, the first terminal unit 2322*t* is disposed at a position corresponding to the second lateral plate 2342-2 of the second cover 2340, and the second terminal unit 2323*t* may be disposed at a position corresponding to the fourth lateral plate 2342-4 of the second cover 2340.

Hereinafter, an optical device according to a second embodiment of the present invention will be described with reference to the drawings.

Figure 45:
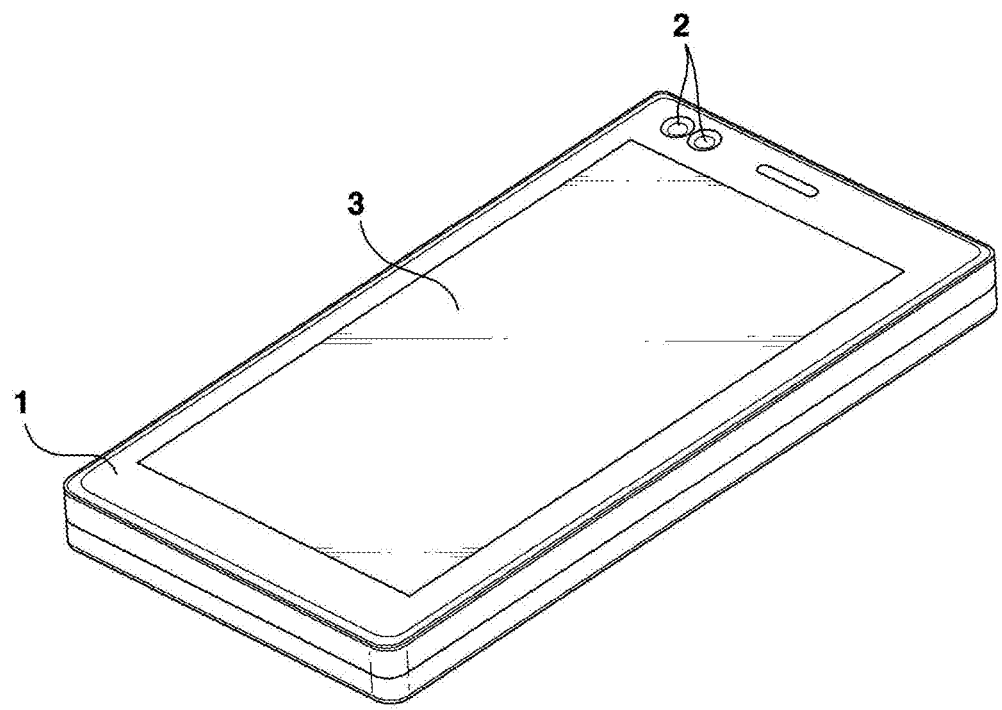
FIG. 45 is a perspective view of an optical device according to a second embodiment of the present embodiment.

FIG. 45 is a perspective view of an optical device according to a second embodiment of the present embodiment.

Optical devices comprise cell phones, portable phones, smart phones, portable communication devices, portable smart devices, portable terminals, digital cameras, computers, laptop computers, digital broadcasting terminals, personal digital assistants (PDAs), portable multimedia players (PMPs) and navigation. However, the type of optical device is not limited thereto, and any device for photographing a video or photo may be comprised in the optical device.

The optical device may comprise a main body 1. The main body 1 may form the outer appearance of an optical device. The main body 1 can accommodate the camera device 2. A display 3 may be disposed at a first surface of the main body 1. For example, the display 3 and the camera device 2 are disposed at a first surface of the main body 1, and a camera device 2 may be additionally disposed at a second surface at an opposite side of the first surface of the main body 1.

The optical device may comprise a camera device 2. The camera device 2 may be disposed in the main body 1. At least a portion of the camera device 2 may be accommodated inside the main body 1. The camera device 2 may be provided in plurality. The camera device 2 may comprise dual, triple or more camera devices. The camera device 2 may be disposed at each of the first surface of the main body 1 and the second surface at an opposite side of the first surface of the main body 1. The camera device 2 may photograph an image and/or video of a subject.

The optical device may comprise a display 3. The display 3 may be disposed in the main body 1. The display 3 may be disposed at a first surface of the main body 1. The display 3 may output images and/or videos photographed by the camera device 2.

The third embodiment of the present embodiment may comprise some configurations of the first embodiment of the present embodiment and some configurations of the second embodiment of the present embodiment. That is, the third embodiment of the present embodiment may be an embodiment in which some configurations of the first embodiment are replaced with corresponding configurations of the second embodiment. Or, the third embodiment of the present embodiment may be an embodiment in which some configurations of the second embodiment are replaced with corresponding configurations of the first embodiment.

Although the embodiment of the present invention has been described above with reference to the accompanying drawings, those of ordinary skill in the art to which the present invention belongs will understand that the present invention may be embodied in other specific forms without changing the technical spirit or essential features thereof. Therefore, it should be understood that the embodiments described above are illustrative in all respects and not restrictive.

The invention claimed is:

1. A camera device comprising:
a printed circuit board;
a gyro sensor disposed on a first surface of the printed circuit board; and
a first lens driving device disposed on the first surface of the printed circuit board,
wherein the first lens driving device comprises:
a cover member comprising an upper plate and a lateral plate extending from the upper plate;
a bobbin disposed in the cover member;
a first magnet disposed in the cover member;
a first coil configured to move the bobbin; and
a substrate electrically connected with the first coil,
wherein the lateral plate of the cover member comprises a first lateral plate and a second lateral plate disposed opposite to each other, and a third lateral plate and a fourth lateral plate disposed opposite to each other,
wherein the gyro sensor is disposed closest to the first lateral plate among the first to fourth lateral plates,
wherein the substrate comprises a first terminal unit comprising a plurality of terminals electrically connected with the printed circuit board,
wherein the first terminal unit of the substrate is disposed at a position corresponding with the first lateral plate of the cover member,
wherein the plurality of terminals of the first terminal unit are overlapped with each other in a direction parallel to the first lateral plate of the cover member, and wherein a shortest distance between the gyro sensor and the first lateral plate of the cover member is shorter than a size of the gyro sensor in a corresponding direction.

2. The camera device of claim 1, wherein the first lens driving device comprises a base coupled with the lateral plate of the cover member and a housing disposed between the bobbin and the cover member, and wherein the substrate is disposed on the base.

3. The camera device of claim 2, wherein the gyro sensor is spaced apart from the cover member, the base, and the substrate.

4. The camera device of claim 1, wherein the first terminal unit is not overlapped with the gyro sensor in a direction in which the second lateral plate faces the first lateral plate, and wherein when viewed from above, the first terminal unit is hidden by the cover member and is not visible.

5. The camera device of claim 1, wherein the substrate comprises a second terminal unit disposed at an opposite side of the first terminal unit, and wherein the second terminal unit of the substrate is disposed at a position corresponding with the second lateral plate of the cover member.

6. The camera device of claim 5, wherein a length of the first terminal unit is shorter than a length of the second terminal unit in a direction in which the third lateral plate faces the fourth lateral plate.

7. The camera device of claim 6, wherein seven or less terminals are disposed on the first terminal unit, and wherein ten or more terminals are disposed on the second terminal unit.

8. The camera device of claim 1, wherein the first lateral plate of the cover member comprises a first region close to one corner among both side corners, and a second region close to the other corner among the both side corners, wherein the first terminal unit is disposed at a position corresponding to the first region of the first lateral plate, and wherein the gyro sensor is disposed at a position corresponding to the second region of the first lateral plate.

9. The camera device of claim 1, wherein the first terminal unit of the substrate is omitted at a position corresponding to the gyro sensor.

10. The camera device of claim 1, wherein the first terminal unit of the substrate is disposed closest to the first lateral plate among the first to fourth lateral plates.

11. The camera device of claim 1, wherein the first coil is configured to move the bobbin in an optical axis direction, and wherein the first lens driving device comprises a second coil configured to move the bobbin in a direction perpendicular to the optical axis direction.

12. The camera device of claim 1, comprising a second lens driving device disposed on the first surface of the printed circuit board, wherein the second lens driving device is disposed closest to the third lateral plate among the first to fourth lateral plates.

13. The camera device of claim 12, wherein the first magnet is disposed at a position corresponding to the first lateral plate, wherein the first lens driving device comprises a dummy member disposed at a position corresponding to the third lateral plate, a second magnet disposed at a position corresponding to the second lateral plate, and a third magnet disposed at a position corresponding to the fourth lateral plate, and wherein the dummy member has a weight corresponding with the third magnet and has a magnetic force weaker than the third magnet or no magnetic force.

14. The camera device of claim 12, wherein the first terminal unit is disposed between the gyro sensor and the second lens driving device.

15. The camera device of claim 1, wherein the printed circuit board comprises a first portion disposed with the first lens driving device, a second portion disposed with a connector, and a third portion connecting the first portion and the second portion, and wherein the third portion is disposed closest to the second lateral plate among the first to fourth lateral plates.

16. The camera device of claim 1, comprising:
an image sensor disposed on the printed circuit board; and
a lens coupled to the bobbin.

17. An optical device comprising:
a main body;
the camera device of claim 1 disposed on the main body; and
a display disposed on the main body and configured to output an image by the camera device.

18. A camera device comprising:
a printed circuit board;
an image sensor disposed on the printed circuit board;
a gyro sensor disposed on a first surface of the printed circuit board;
a first lens driving device disposed on the first surface of the printed circuit board; and
a second lens driving device disposed on the first surface of the printed circuit board, wherein the first lens driving device comprises:
a cover member comprising an upper plate and a lateral plate extending from the upper plate;
a first magnet disposed in the cover member;
a first coil disposed in the cover member; and
a substrate electrically connected with the first coil, wherein the lateral plate of the cover member comprises a first lateral plate and a second lateral plate disposed opposite to each other, and a third lateral plate and a fourth lateral plate disposed opposite to each other, wherein the second lens driving device is disposed closest to the third lateral plate among the first to fourth lateral plates, wherein the gyro sensor is disposed closest to the first lateral plate among the first to fourth lateral plates, wherein the substrate comprises a first terminal unit disposed closest to the first lateral plate among the first to fourth lateral plates, wherein the first terminal unit comprises a plurality of terminals electrically connected with the printed circuit board, wherein the plurality of terminals of the first terminal unit are overlapped with each other in a direction parallel to the first lateral plate of the cover member, and wherein a shortest distance between the gyro sensor and the first lateral plate of the cover member is shorter than a size of the gyro sensor in a corresponding direction.

19. The camera device of claim 18, wherein the first terminal unit is not overlapped with the gyro sensor in a direction in which the second lateral plate faces the first lateral plate, and wherein when viewed from above, the first terminal unit is hidden by the cover member and is not visible.

20. The camera device of claim 18, wherein the substrate comprises a second terminal unit disposed at an opposite side of the first terminal unit, wherein the second terminal unit of the substrate is disposed closest to the second lateral plate among the first to fourth lateral plates, and wherein a length of the first terminal unit is shorter than a length of the second terminal unit in a direction in which the third lateral plate faces the fourth lateral plate.

* * * * *